US010613351B2

(12) United States Patent
Floyd

(10) Patent No.: US 10,613,351 B2
(45) Date of Patent: Apr. 7, 2020

(54) VARIABLE POWER FLUID CELL OPTICS FOR COUNTERING PRESBYOPIA AND/OR ASTIGMATISM

(71) Applicant: Johnnie E. Floyd, Austin, TX (US)

(72) Inventor: Johnnie E. Floyd, Austin, TX (US)

( * ) Notice: Subject to any disclaimer, the term of this patent is extended or adjusted under 35 U.S.C. 154(b) by 28 days.

(21) Appl. No.: 15/764,831

(22) PCT Filed: Jul. 20, 2017

(86) PCT No.: PCT/US2017/043098
§ 371 (c)(1),
(2) Date: Mar. 29, 2018

(87) PCT Pub. No.: WO2018/022426
PCT Pub. Date: Feb. 1, 2018

(65) Prior Publication Data
US 2018/0284483 A1    Oct. 4, 2018

Related U.S. Application Data

(60) Provisional application No. 62/368,616, filed on Jul. 29, 2016.

(51) Int. Cl.
| | | |
|---|---|---|
| *G02C 7/02* | (2006.01) | |
| *G02B 3/12* | (2006.01) | |
| *G02C 7/08* | (2006.01) | |
| *G02B 3/14* | (2006.01) | |
| *G02B 1/06* | (2006.01) | |

(52) U.S. Cl.
CPC ............... *G02C 7/085* (2013.01); *G02B 3/14* (2013.01); *G02C 7/02* (2013.01); *G02B 1/06* (2013.01); *G02C 2202/18* (2013.01)

(58) Field of Classification Search
CPC ... G02B 3/12; G02B 3/14; G02B 1/06; G02C 7/085; G02C 7/02
USPC ................ 359/665–667; 351/159.34, 159.68
See application file for complete search history.

(56) References Cited

U.S. PATENT DOCUMENTS

| | | | | |
|---|---|---|---|---|
| 6,698,882 | B1* | 3/2004 | Wu ........................ | G02C 5/045 |
| | | | | 351/124 |
| 2003/0095336 | A1* | 5/2003 | Floyd ...................... | G02B 3/14 |
| | | | | 359/665 |
| 2006/0164731 | A1* | 7/2006 | Wu .......................... | G02B 3/14 |
| | | | | 359/666 |
| 2010/0208195 | A1* | 8/2010 | Gupta .................... | G02C 7/085 |
| | | | | 351/159.68 |
| 2012/0127062 | A1* | 5/2012 | Bar-Zeev ................ | G02B 3/14 |
| | | | | 345/6 |
| 2017/0017019 | A1* | 1/2017 | Bolis .................... | G02B 26/004 |

* cited by examiner

*Primary Examiner* — Darryl J Collins
(74) *Attorney, Agent, or Firm* — Brian F. Russell; Russell Ng PLLC

(57) ABSTRACT

Eyewear referred to herein as Lnzwear includes fluid-filled optical cell(s) providing variable focal length, variable cylindrical lens power, and/or variable astigmatic angle, with all three variables being independently controllable by the user in real time. Lnzwear is analog in nature, has tall and wide fields of view, and omits from its lenses any lines or zones producing aberrations. Visual, verbal, and/or tactile control inputs can be provided by the user. Lnzwear does not require prescription optics and is preferably configured so that it can be mass produced. Multiple embodiments are disclosed to satisfy the needs of presbyopes with (or without) astigmatism around the world.

20 Claims, 50 Drawing Sheets

VARIABLE POWER FLUID CELL OPTICS FOR COUNTERING PRESBYOPIA AND/OR ASTIGMATISM

BACKGROUND

Two U.S. patents (U.S. Pat. Nos. 6,715,876 and 5,684,637) issued to inventor Johnnie E. Floyd precede this invention and attest to the effort, research, designs, and engineering pertaining to non-invasive correction of refractive errors (specifically for presbyopia) by this inventor.

A human vision limitation termed presbyopia is characterized by the inability to focus on objects nearby due to refractive errors. The ability to focus on objects far away may be diminished as well. The ratio of the far distance ability of the unaided eye divided by the near distance ability, is defined herein as the presbyopic ratio (PR). For an individual with presbyopia, PR generally decreases over time.

Correction of refractive errors can be achieved through invasive, semi-invasive, or non-invasive methods. Invasive methods include surgery to the cornea, replacement of the cornea, and/or replacement of the human internal lens with a man-made semi-rigid plastic lens. Semi-invasive methods include use of contact lenses, which are film-like flexible membranes that float on the fluids of the cornea. Contact lenses, which are usually employed for people from age 18 to 40, can provide up to three fixed focal lengths and a fixed astigmatic correction. Non-invasive methods of correcting refractive errors include traditional fixed focal length eyewear comprising frames holding a pair of fixed focal length lenses. Other non-invasive methods of correcting refractive errors include use of variable focal length eyewear employing a multitude of different technologies.

The lenses of traditional fixed focal length eyewear are typically made from relatively thick and rigid materials, namely, plastics exhibiting high impact resistance. Such lenses are generally capable of including up to three vertically stacked segments, where each segment provides corrected vision at a different focal length. Because potentially multiple segments must share the vertical height of the eyewear, each segment may have only a short height, thus requiring the user to employ both gross rapid and minute fine head rotation to place the appropriate segment between the user's eye and the object of interest and to maintain the position.

In standard industry practice, there is a repertoire of 1360 prescriptions formed from 17 cylindrical powers and 80 spherical powers (i.e., 17×80=1360) based on about 12 base curves. The ophthalmic practitioner chooses one cylindrical correction and one, two, or three spherical corrections, by testing, by interviewing the user, and/or by determining the needs of the patient in their daily life. In present practice, the anterior surfaces of the lenses contain the spherical correction(s), and the posterior surfaces contains the astigmatic (cylindrical) correction, with the axis of the cylindrical correction being oriented 90 degrees from the axis of the astigmatic error of the eye. Once manufactured these surfaces cannot be altered. After manufacture of the lenses, the surrounding lens border, called the contour, is edge ground and beveled to fit into a selected frame.

Refractive correction at three different fixed distances is universally claimed and advertised by the optical industry to be as good as can be provided. When the object of interest is located at the focal length of an optic and the person physically rotates their head to place the optic between the eye and the object, then the object will appear to the user to be in focus. But when that alignment is not possible and the distance to the object is not at the focal distance of one of the segments and accommodation is small (low P/R), the image will not be in focus, and the user and others can be put at risk. It should be appreciated that this lack of ability of a presbyope to focus has both static and dynamic aspects. The static component is the inability of the user to form sharp images at all distances. The dynamic component is the inability of the user to form sharp images continuously while the distance from an observed object to optics is changing (such as when driving an automobile). Traditional rigid lenses for advanced presbyopes do not adequately address either the static or dynamic aspects of presbyopia.

SUMMARY OF THE INVENTION

In various embodiments, the variable focal length optical assemblies described herein (generally referred to herein as Lnzwear when realized as eyewear) can provide focus at any distance (one distance at a time) using a variable focal length spherical lens fluid cell and/or correction of astigmatism using a cylindrical lens fluid cell. In some embodiments, a fixed focal length bias lens (which is preferably not a prescription lens) can be employed to bias the focal length in order to offset the large differences in range location from one individual to another. In preferred embodiments, none of the optics has lines or unproductive zones, and all are single segment. In at least one preferred embodiment, the distance to the object of interest and focus of the spherical cell is determined automatically by a detecting system. Alternatively or additionally, focus may be directed by voice or manual manipulation of a control. Correction of astigmatism can be provided by the variable focal length cylindrical lens fluid cell's ability to rotate about the X axis. Lnzwear can provide a complete solution to both the static and dynamic components of the problem of presbyopia. Lnzwear is preferably configurable (and reconfigurable) fit to any normal face and offset all refractive errors.

In at least some embodiments, Lnzwear can be manufactured by mass production methods. Lnzwear can provide all prescriptions, and because of its analog nature, can provide prescriptions in between those provided by traditional eyewear both in spherical and cylindrical power. Further, spherical and cylindrical correction can be controlled independently. Lnzwear can provide mono-vision either eye dominant, diurnal changes, facilitates physical therapy of eye muscles, and notification that the user should consult with a professional. Lnzwear can be produced in both manual powered or motor-powered embodiments. Lnzwear can enunciate or otherwise present the distance to an observed object.

In one embodiment, an optical cell includes a base optic including a wall defining a periphery of the fluid optical cell, a flexible plate having an peripheral edge disposed within and abutting the wall, a circumferential seal that seals the peripheral edge of the plate against the wall, and a ring including a shoulder that retains the circumferential seal. The base optic includes a fluid passageway formed therein communicating with a volume between the transparent plate and the base optic. An optical focal length of the optical cell can be changed by introducing fluid into the volume under sufficient hydraulic pressure to deform the plate to shape the fluid into a spherical lens.

DETAILED DESCRIPTION OF ILLUSTRATED EMBODIMENTS

Figure 1:
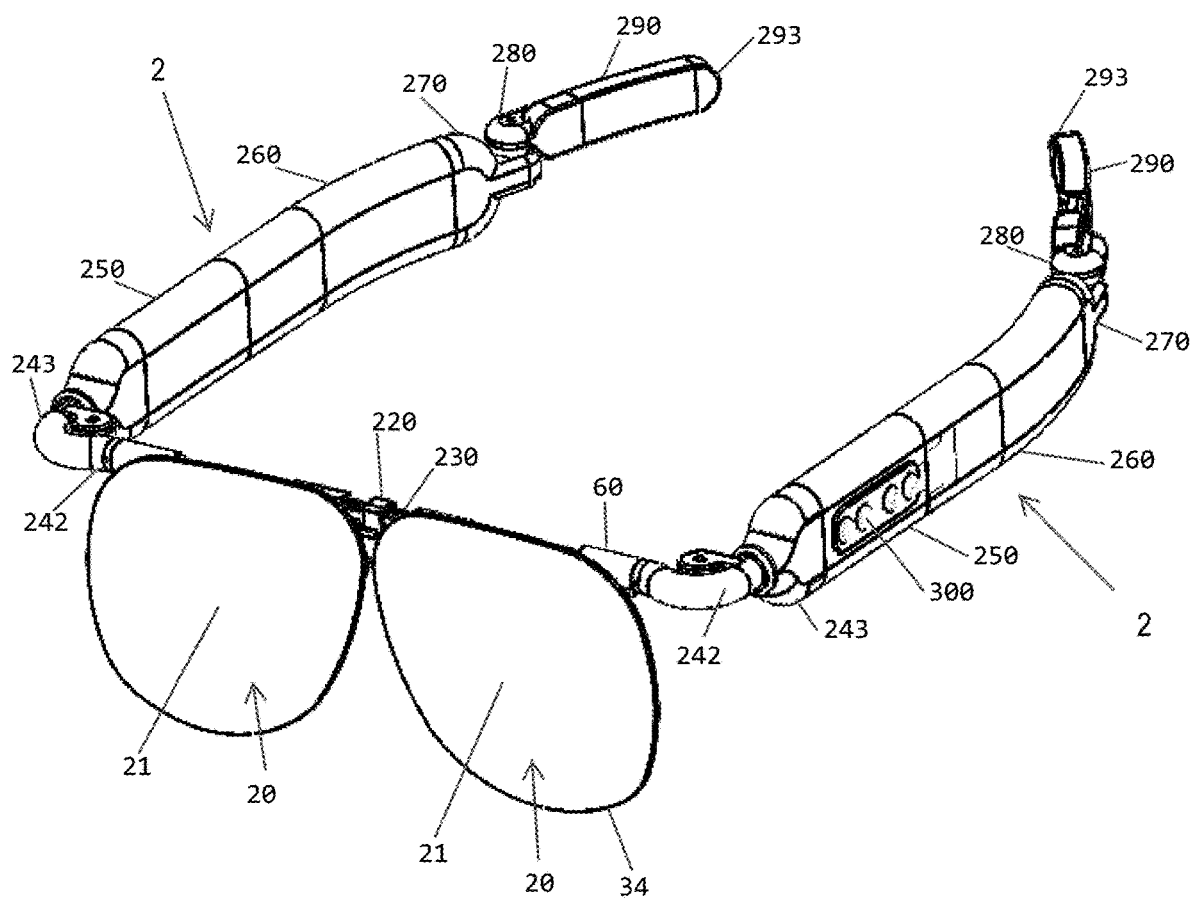
FIG. 1 is an isometric view of an exemplary embodiment of a Lnzwear assembly as seen from above the left front side.

The present inventions relate generally to the field of variable focus length optics. These inventions pertain to optical instruments (e.g., eyewear, binoculars, night vision goggles, microscopes, telescopes, rifle scopes, spotting scopes, camera viewfinders, camera lenses, etc.), which may integrate mechanical, hydraulic, optical, electronic, and/or software systems. In at least some embodiments, the optical instruments are capable of fixed and/or continuously variable focus on objects which may be changing distance with respect to the user.

In various embodiments, the primary ophthalmic optics include fluid-filled optical cells capable of changing focal length. Within an optical cell, a flexible plate is caused to deflect under hydraulic pressure to form the cell fluid into positive, null, or negative lens as the case requires, permitting the user's eyes to focus on the object of interest. In at least one embodiment, one cell forms primarily spherical optics, and a second cell forms primarily cylindrical optics.

The spherical cell of the optical assemblies described herein can preferably counter all refractory errors and completely compensate for presbyopia, and the cylindrical cell can compensate for astigmatism. The cylindrical power and astigmatic angle can be varied in real time by user control. Mono-vision is also available with either eye dominant at the user's discretion and is adjustable in real time by the user. Adjustment to counter diurnal changes can also be provided by programming and/or by the user in real time.

In at least some embodiments, real time user control of focus is implemented via a man-machine interface (e.g., keypads) located on a eyewear earpiece. In at least some other embodiments, continuously variable focusing is accomplished automatically without overt human control or intervention other than directing the eyes to an object of interest. In such embodiments, range is determined by a detector system that does not transmit sound or electromagnetic energy to the object of interest. In some implementations, the user looks at an object of interest, the detector system determines the surface position of both of the user's irises, and a control system determines the azimuthal angle of the eyes. Based on the determined azimuthal angle, the control system controls a pump system to force fluid to and/or from the optical cells as required to achieve the desired focus at the appropriate distance.

The disclosed inventions also address the geometric relationships between the frame, the contours, the prescription lens, detectors, controls and fluid optics, providing functionality not heretofore addressed nor capable of being addressed by traditional eyewear. In at least some embodiments, Lnzwear can fit a majority of faces and align with eyes and ears that are not symmetrically located. In preferred embodiments, the optical assemblies provide enhanced (e.g., maximum) fields of view vertically and horizontally.

The optical elements of "traditional eyewear" (glasses) are prescription lenses (i.e., lenses made to a prescription written by a medical practitioner for an ophthalmic lens) made of relatively thick and rigid transparent plastic fitted into a frame. Because the user's visual needs must be known and the frame selected prior to assembly, traditional eyewear must be made by mass-custom processes. In contrast, the Lnzwear disclosed herein is a new form of eyewear that can differ from traditional eyewear in intent, design, manufacture, distribution, and especially operation. Lnzwear can be made entirely by mass production methods, without the custom steps of traditional eyewear. As a result, all fit variables can be independently changed by the end user, and economies in manufacturing, distribution, and maintenance can be achieved.

As noted above, the optical assemblies described herein can be realized in a variety of different embodiments having different sets of features. For example, features that may be present in at least one embodiment of an optical assembly include:
1) Spherical cell(s),
2) Prescription lens,
3) Cylindrical cell(s) (and optional bias lens),
4) Control system in the earpiece,
5) Detector and controls on frame,
6) Drive motor,
7) Manual drive,
8) 1 pump and 1 valve,
9) 1 pump and 2 valves,
10) 2 pumps and 1 valve, and/or
11) 2 pumps and 2 valves.

A non-exhaustive list of possible embodiments A through R include of the following elements (denoted by the foregoing ten element numbers):
A=1 (this embodiment is useful as a stand-alone unpowered optical element in optical instruments);
B=1+7+8;
C=1+2+7+8 (this embodiment is useful as an OEM product);
D=1+2+4+6+8 (this embodiment is useful as an electrically controlled product);
E=1+2+5+6+8 (this embodiment is useful as a single eye assistance);
F=1+2+4+5+6+8 (this embodiment is referred to as SRxD and is explicitly illustrated herein);
G=3+8 (this embodiment is useful as an auxiliary for other optical instruments);
H=3 (this embodiment is useful as an OEM element);
I=1+3 (this embodiment is useful as an OEM product in other systems);
J=1+3+7+9 (this embodiment is useful as a stand-alone product);
K=1+3+4+7+9 (this embodiment is useful as an electrically controlled product);
L=1+3+4+6+9 (this embodiment is useful as a motor driven stand-alone product drive);
M=1+3+4+5+6+9 (this embodiment is referred to as SCD and is explicitly illustrated herein);
N=1+3+4+5+6+10
O=1 (this embodiment can include two spherical cells which will magnify but not address astigmatism);
P=1+3 (this embodiment can include 2 spherical and 1 cylindrical cell, which both magnify and address astigmatism);
Q=1+3+4+6+7+10; and
R=1+3+7+10.

Embodiments not explicitly illustrated separately are fully enabled herein and included within the scope of the appended claims.

With reference now to the figures, and with particular reference to FIGS. 1 to 6, there is illustrated a first embodiment (referred to herein as the Spherical Prescription Lens Detector (SRxD) embodiment) of eyewear (generally referred to herein as Lnzwear). To promote understanding, the description provided throughout will refer to a three-dimensional Cartesian coordinate system. As shown in FIG. 1, in this Cartesian coordinate system, the X axis is horizontal and positive in the direction from posterior of the user's head to the portion of the nose. The Y axis is horizontal, positive to the user's left, and perpendicular to the X axis. The Z axis is vertical, positive upward, and perpendicular to both the X and Y axes. Given this coordinate system, human eyes, if not damaged, are able to rotate about the Y and Z axes, but not the X axis. The azimuthal angle of the eye will be an angle in the XY plane. The altitudinal angle of the eye will be an angle in the XZ plane.

In the illustrated embodiment, Lnzwear generally includes a frame that supports a set of optics for each eye. As best seen in the front and rear isometric views given in FIGS. 1-2 and the right side elevation view given in FIG. 3, the frame includes right and left earpieces 2.

Each earpiece 2 is coupled by a respective hinge assembly including a stationary hinge 242 and a rotating hinge 243 to a ring 60 supporting the set of optics for an eye. Hinges 242 allow earpieces 2 to fold toward the optics for compact storage and (together with hinges 243) protect, from the elements, the electrical conductors and fluid passageways from the earpieces 2 to the rings 60. Hinges 243 permit rotation of earpieces 2 about the Y axis with respect to ring 60 to allow the earpieces 2 to tilt upward or downward and to allow the earpieces 2 to be adjusted to fit user's ears that are not located at the same height as one another. In addition, rings 60 can be tilted to closely fit the shape of the user's brow and cheeks. Earpieces 2 can also rotate about the X axis with respect to hinges 243 to allow the earpieces 250 to match the slope of the user's temple in plane YZ. A desired tilt and slope of earpieces can thus be accomplished by the user without heating or bending earpieces or enduring labor delays.

Figure 4:
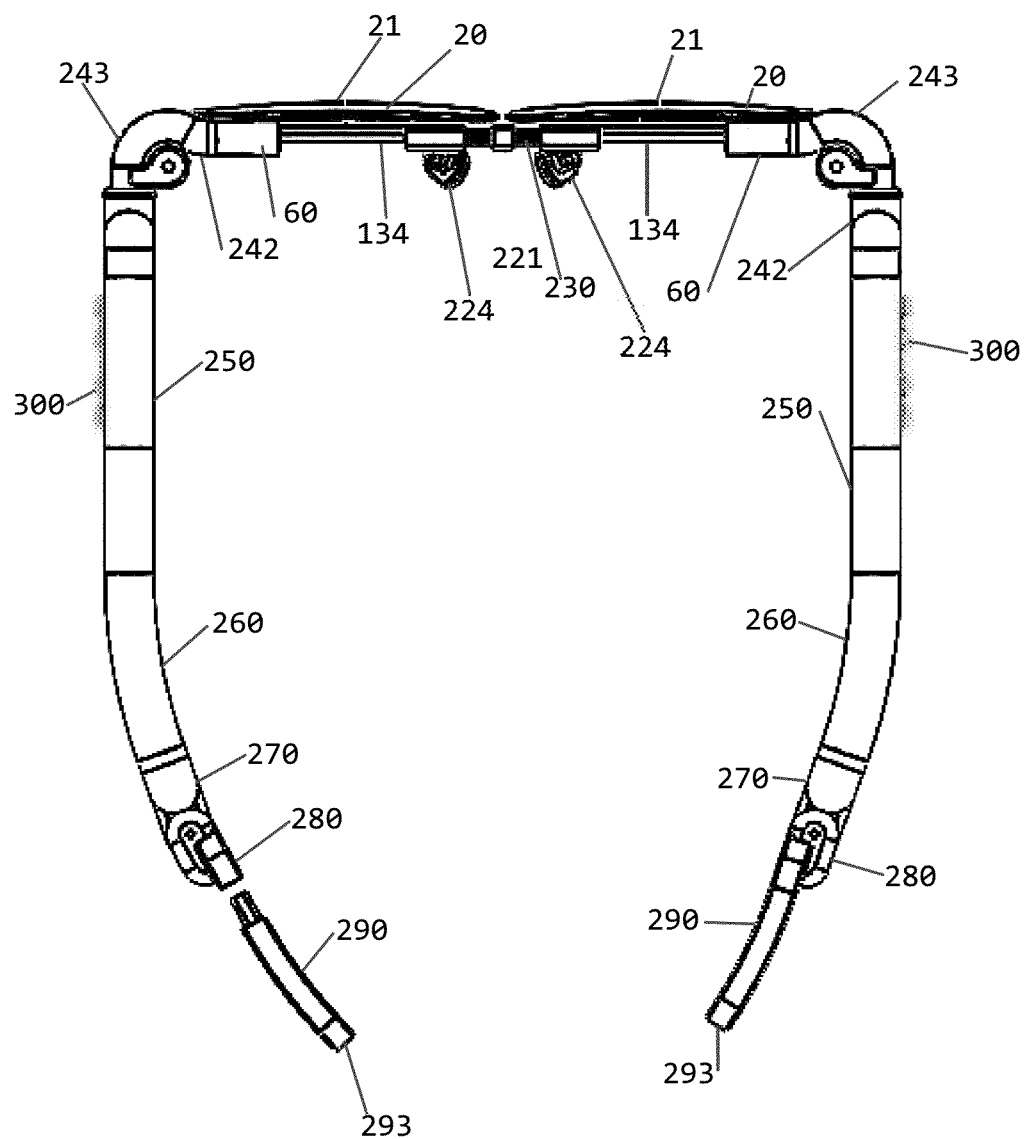
FIG. 4 is a top plan view of an exemplary embodiment of a Lnzwear assembly.

In this embodiment, each earpiece 2 includes a forward section 250 housing a man-machine interface 300 (e.g., a keypad), a control housing section 260, earpiece transition 270, battery hinge 280, and battery box 290 (shown as detachable in FIG. 4). Battery hinge 280 preferably rotates and detents so the associated battery box 290 can be positioned to embrace the mastoid bone area to hold Lnzwear securely on the user's nose. Battery box 290 houses one or more batteries to power to electronic hereinafter described. Battery box 290 has a removable cap 293 to allow batteries in battery box 290 to be exchanged as needed.

Figure 2:
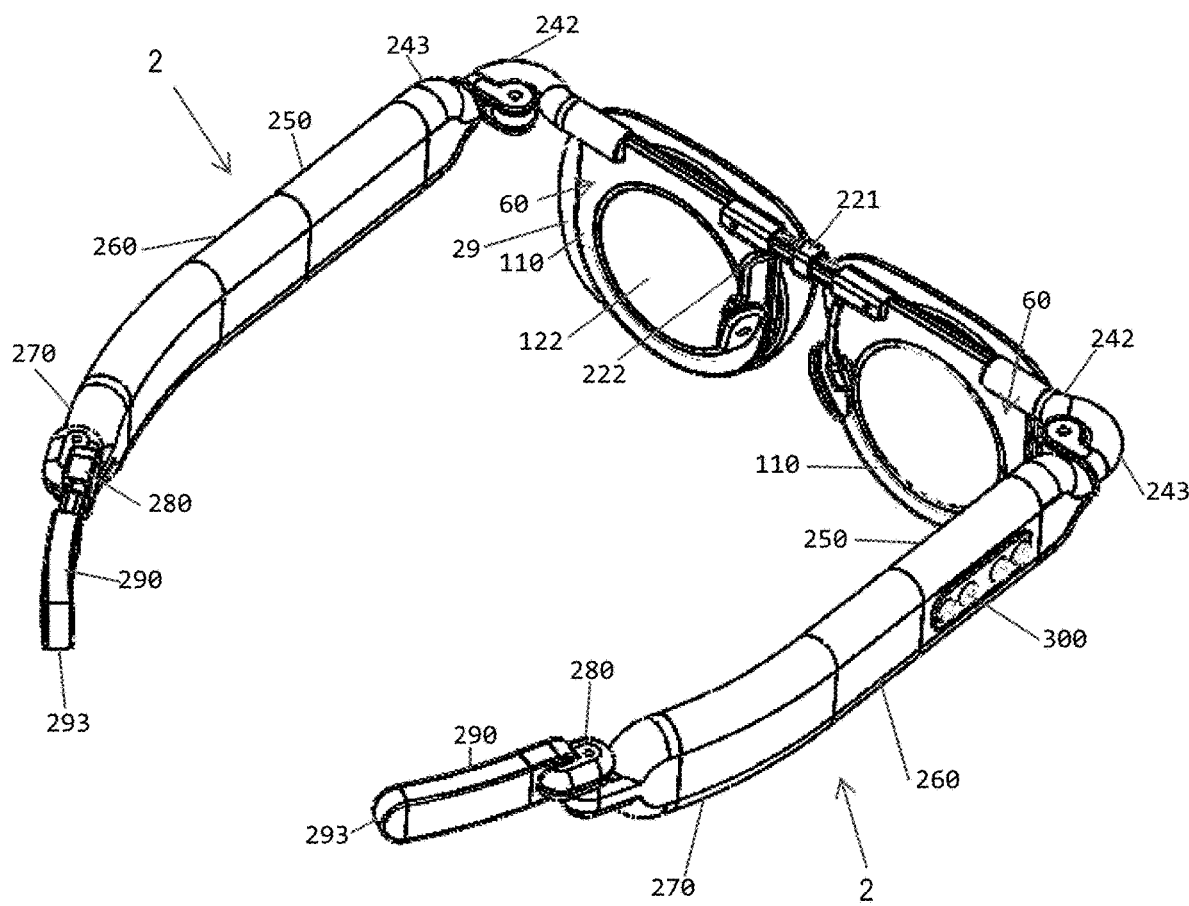
FIG. 2 is an isometric view of an exemplary embodiment of a Lnzwear assembly as seen from the upper rear right side.
Figure 3:
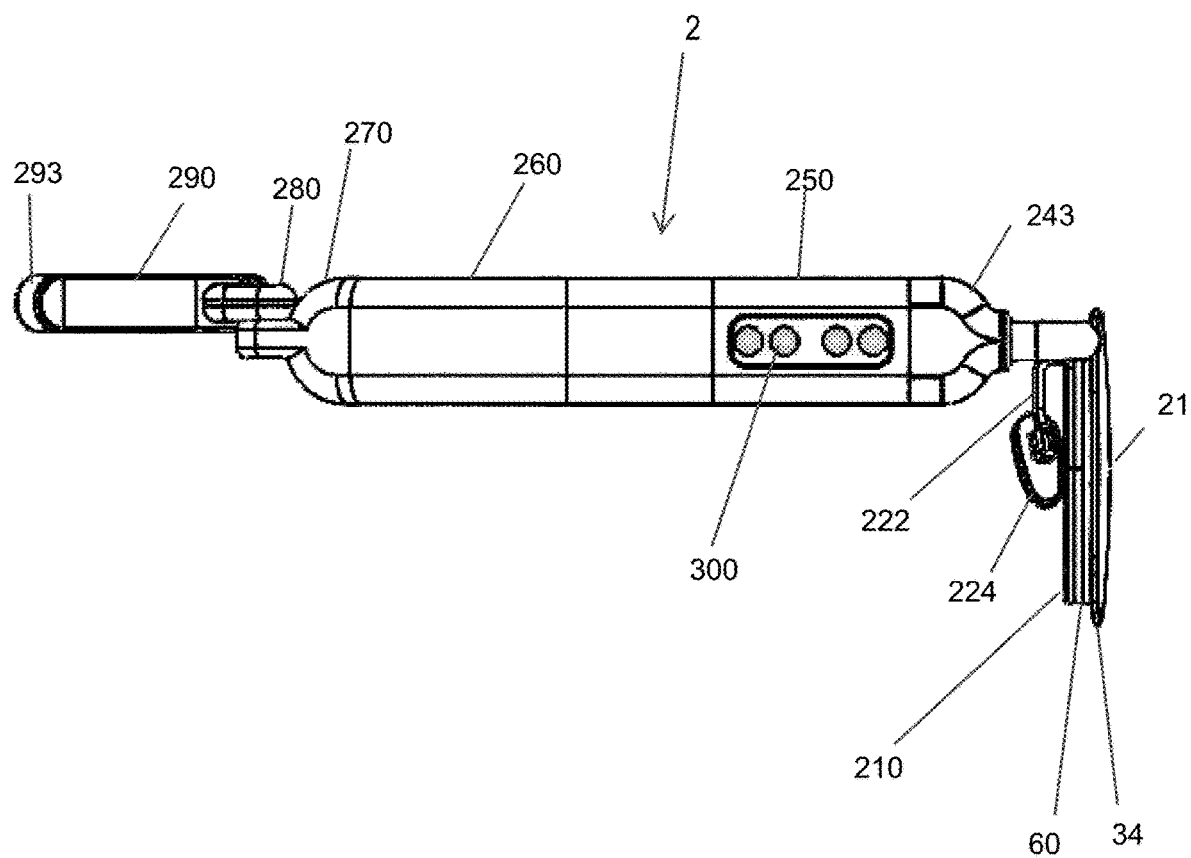
FIG. 3 is a right side elevation view of an exemplary embodiment of a Lnzwear assembly.
Figure 5:
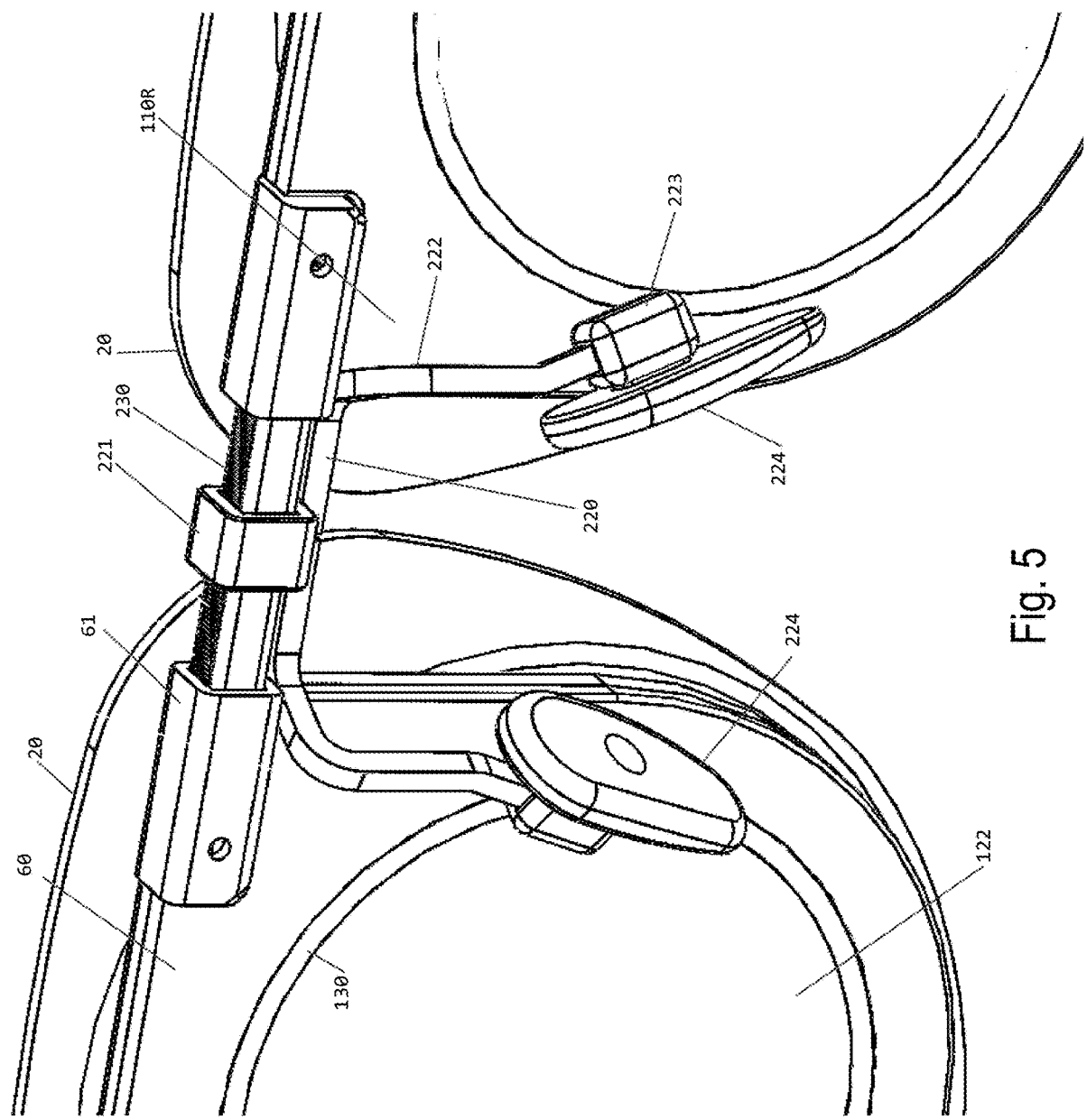
FIG. 5 is a detailed isometric view of a nose tube, nose slide, and nose rest of an exemplary embodiment of a Lnzwear assembly.
Figure 6:
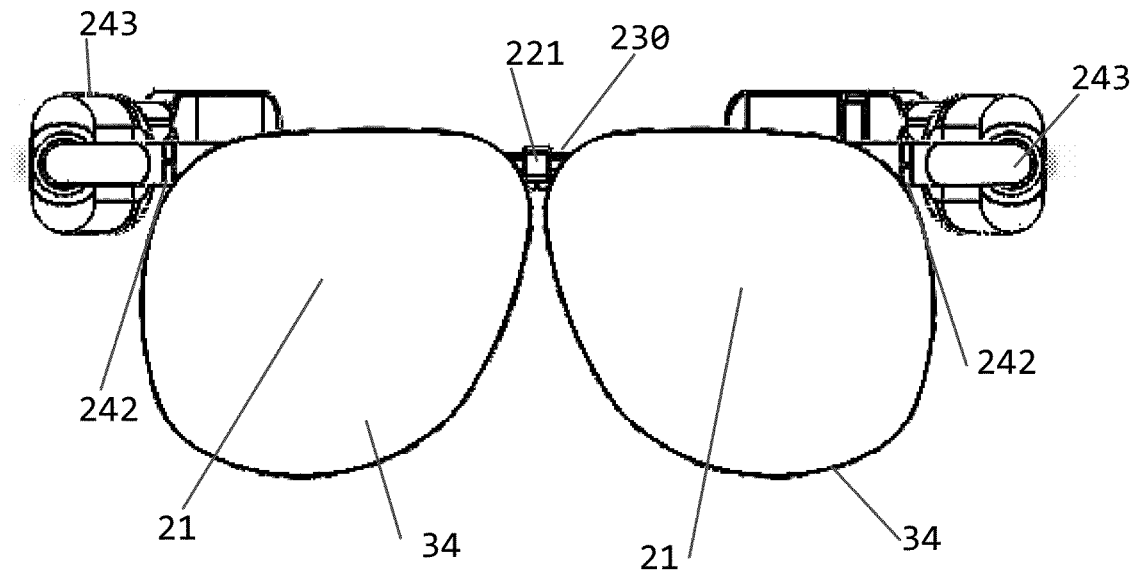
FIG. 6 is a front elevation view of an exemplary embodiment of a Lnzwear assembly showing one exemplary contour.

As best seen in FIGS. 1, 3, 5 and 6, Lnzwear includes a pair of optics sets in side-by-side relation. The optics set for each eye includes a base optic 20, which in this embodiment is a frameless optic (e.g., of plastic or glass) having an anterior surface 21 bordered by a contour 34. As shown in FIGS. 2, 3 and 5, the base optics 20 are supported by a pair of rings 60. As best seen in the detailed view given in FIG. 5, rings are joined by a nose tube 230 received within nose tube housings 61. Nose tube housings 61 and nose tube 230 are preferably configured with corresponding non-circular shapes such that the spacing between nose tube housings 61 along the Y axis can be adjust (e.g., via set screws), but such that the pair of optics sets cannot rotate relative to one another about the Y axis by virtue of their non-circular shapes, Moveably coupled to nose tub 230 is a nose slide 221 that is further coupled to nose rest including stem 220, arms 222, sockets 223, and node pads 224. The lateral spaces between nose slide 221 and nose tube housings 61 allow each ring 60 to be selectively positioned (and repositioned) relative to nose slide 221 so that the optics for each eye are aligned with the user's eye along the Y axis. The individual adjustability of the optics position allows vision to be optimized even if the locations of the user's eyes are not symmetrical with respect to the nose. In at least one embodiment, nose tube 230 has formed thereon a number of visible finely engraved lines that can counted and input into the control system to provide the spacing of the optics. In at least some embodiments, the optics spacing (e.g., from the end of each ring 60 to nose slide 221) can be input to the control system, for example, through MMI 300. The interior shape of rings 60 allow the optics set for each eye to be tilted about the Y axis in plane XZ, if desired.

In preferred embodiments, mechanical, electrical and optical components are generally designed to serve various face widths and both sides of Lnzwear, which significantly reduces the design, tooling, and inventory costs involved in manufacturing and distributing Lnzwear.

Figure 7A:
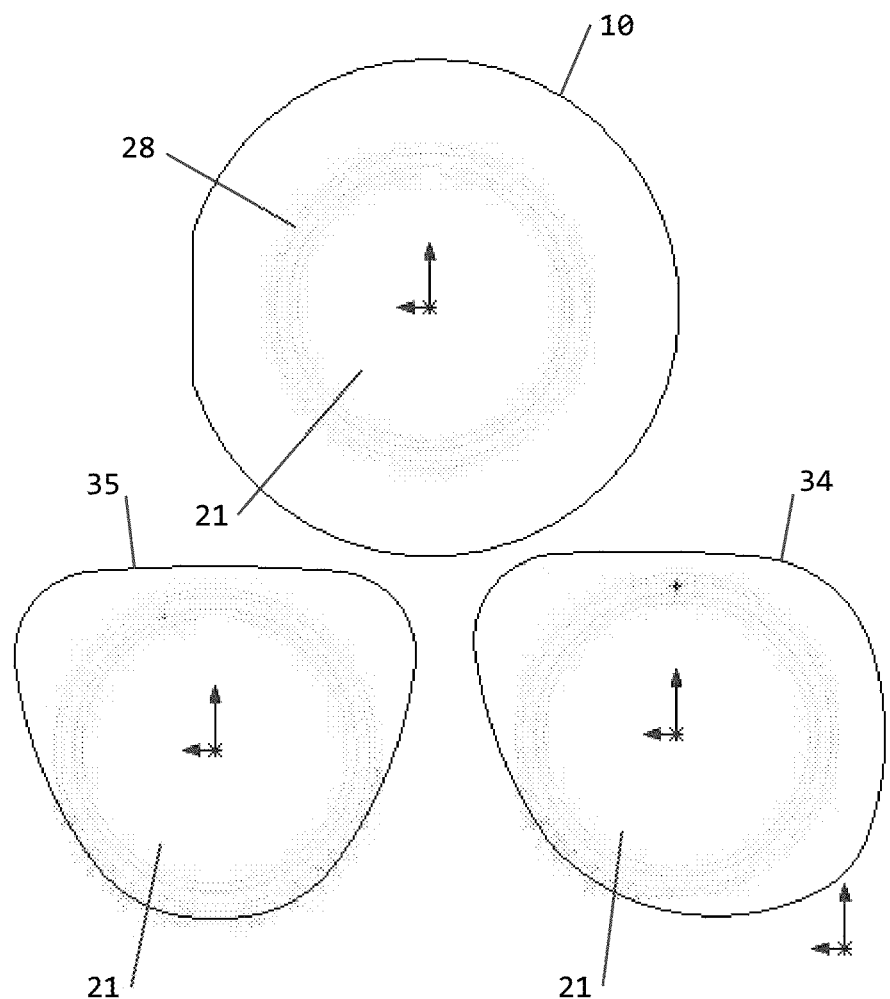
FIG. 7A is an elevation view of a common base optic from which multiple contours can be formed.

With reference now to FIG. 7A, there is illustrated a front elevation view of a base optic blank 10 from which a plurality of different contours can be formed. In general, any shape can be contoured from a base optic blank 10 using the space from the periphery of 10 to the inner reaches of fillet 28. For example, contour 34 illustrated in FIGS. 1-6 as well as different contour 35 can both be manufactured from base optic blank 10.

Figure 7B:
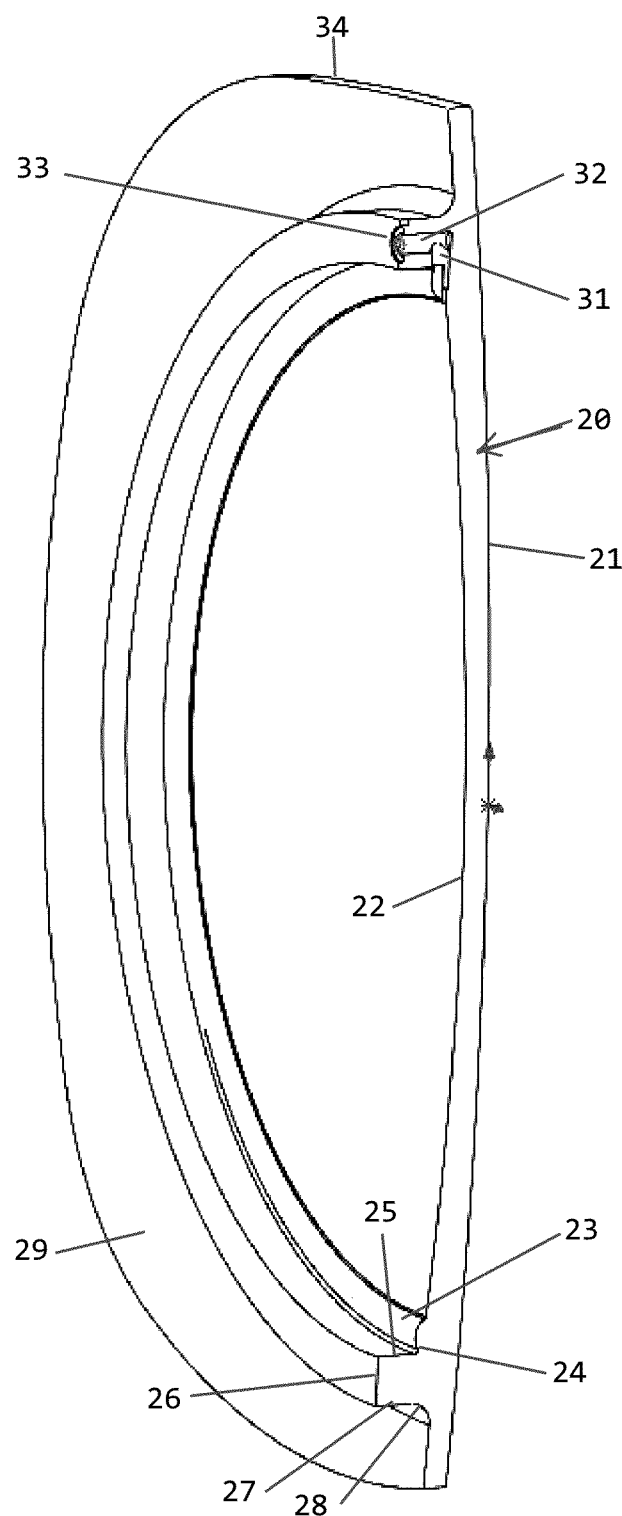
FIG. 7B is an isometric section providing a detailed view of features of the base optic.

FIG. 7B is an isometric section depicting in greater detail the base optic 20 illustrated in FIGS. 1-6. As shown, base optic 20 has a convex anterior surface 21 (as previously seen in FIGS. 1-6) and a concave posterior surface 22. Posterior surface 22 is concentrically surrounded by a torus 23, a groove 24, and an inner wall 25 having a profile generally parallel to the X axis. Inner wall 25 terminates at an interface 26, against which a ring 60 is configured to seat. Interface 26 is bounded by an outer wall 27, which is generally parallel to the inner wall 27. At its base, outer wall 27 transitions via a fillet 28 to a peripheral surface 29.

As further illustrated in FIG. 7B, base optic 20 has formed therein passageways 31 and 32, which allow a volume of liquid fluid to be forced into and withdrawn from an enclosed volume posterior to surface 22 of base optic 20. A seal 33 prevents fluid leakage from passageway 32.

Figure 7C:
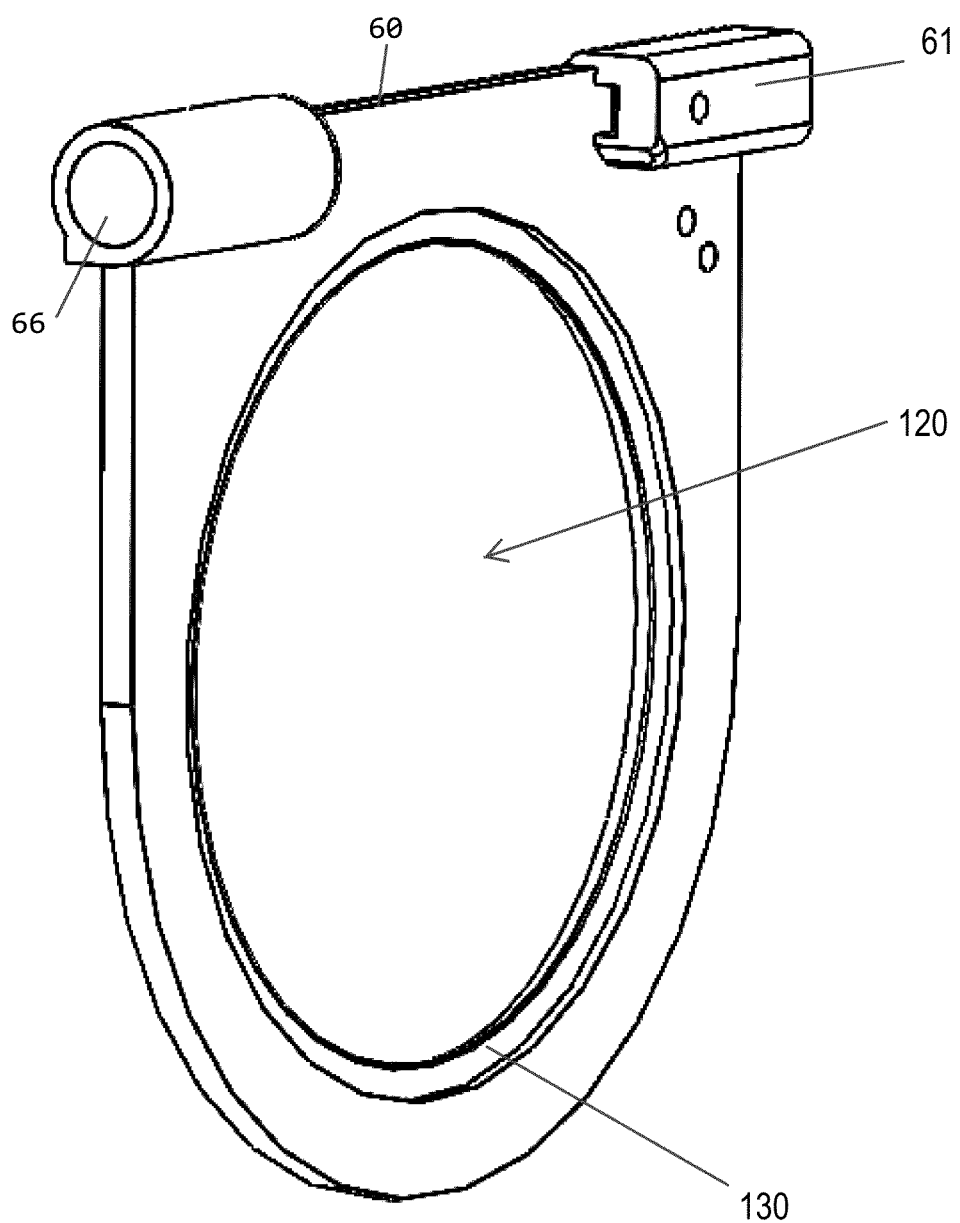
FIG. 7C illustrates the ring of an exemplary Lnzwear SRxD embodiment.

FIG. 7C depicts in isolation the ring 60 of one side (in this case the left side) of an exemplary Lnzwear SRxD embodiment. Ring 60, which has a generally planar form, includes a hinge housing 66 for receiving one end of hinge 242 and a nose tube housing 61 for receiving one end of nose tube 230. Ring 60 surrounds and supports a prescription or bias lens 120, which can have any selected default power of spherical and/or cylindrical correction, including a null power. Prescription lens 120 is retained within ring 60 by a lens keeper 130.

Figure 8A:
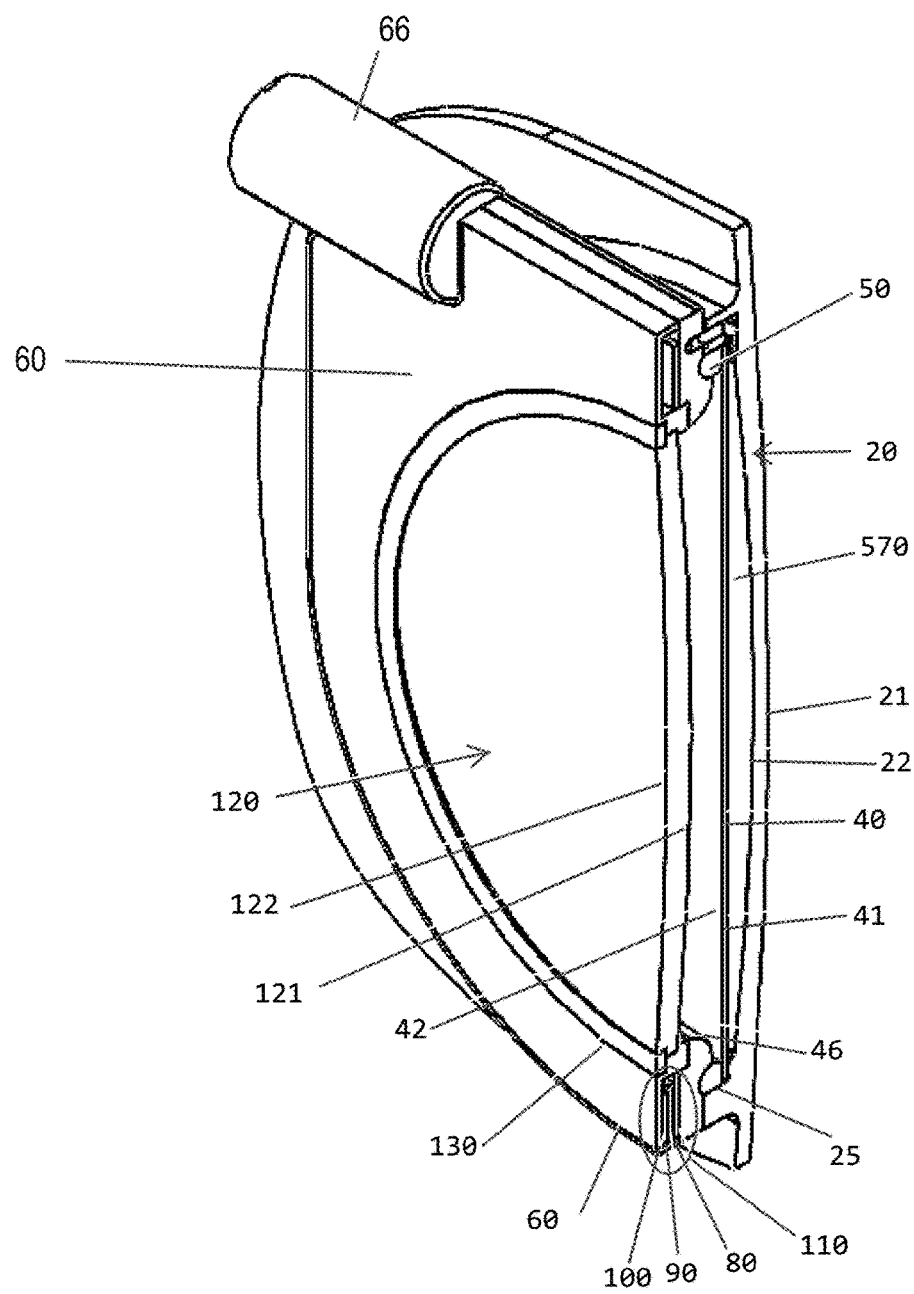
FIG. 8A is an isometric section of the optics set of one side of an exemplary Lnzwear SRxD embodiment.
Figure 8B:
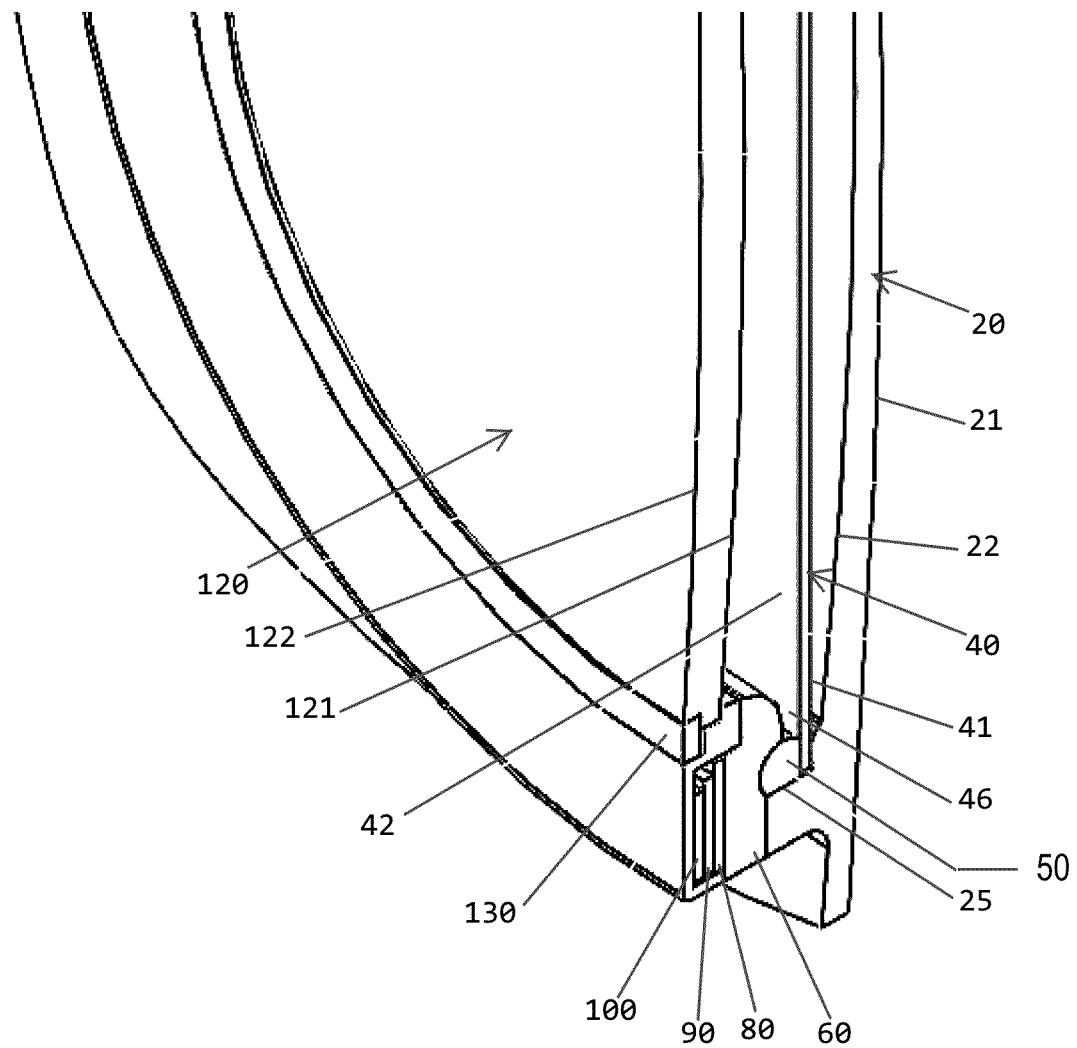
FIG. 8B is an enlarged view of a portion of FIG. 8A.

Referring now to FIGS. 8A-8B, there are depicted isometric section views of the optics set of one side of an exemplary Lnzwear SRxD embodiment. In this embodiment, the optics set forms a compound lens including, from posterior to anterior along the X axis, a prescription (or bias) lens 120 held within ring 60, a spherical plate 40 used to form a spherical fluid cell, and a base optic 20. Prescription lens 120, which includes a posterior surface 122 and an anterior surface 121, is spaced by a small air gap from posterior surface 42 of spherical plate 40. The air gap is preferably of sufficient dimension to accommodate the posterior deflection of spherical plate 40 without contact between posterior surface 42 of spherical plate 40 and anterior surface 121 of prescription lens 120. Similarly, the radius of curvature seen in posterior surface 22 of base optic 20 is preferably chosen to allow for a desired range of anterior deflection of the spherical plate 40 without physical interference with posterior surface 22 of base optic 20. The short distance from the apex of the anterior surface 21 of base optic 20 to the posterior surface 122 of prescription lens 120 attests to the efficiency of the disclosed optics.

Spherical plate 40 is mounted in groove 24 of base optic 20 and rests against torus 23. As an anterior surface of ring 60 contacts interface 26 of base optic 20, a shoulder formed in the anterior surface of ring 60 secures and constrains a peripheral seal 50 in contact with both inner wall 25 of base optic 20 and a peripheral region 46 of spherical plate 40. The sealing of spherical plate 40 within the inner wall 25 of base optic 20 forms a liquid-tight fluid chamber bounded by base optic 20 and spherical plate 40. In use, this fluid chamber holds a generally transparent fluid 570, which by selected variations in the hydraulic pressure applied, deflects spherical plate 40 (and in some embodiments, base optic 20) and forms fluid 570 into a generally spherical lens of a desired power. Spherical plate 40 is preferably sized such that the dimension across the plate (e.g., its diameter, if circular) is slightly less than the corresponding dimension of wall 25, but sufficiently large to maintain the liquid-tight seal of peripheral seal 50 as the periphery of spherical plate 40 moves radially toward the X axis as spherical plate 40 is deflected and moves radially outward from the X axis as spherical plate 40 returns to its undeflected shape. Peripheral seal 50 is preferably restrained by ring 60 so that the volume of peripheral seal 50 is unchanged by changes in hydraulic pressure, simplifying the preferably monotonic relationship between the hydraulic pressure and deflection of spherical plate 40. Peripheral seal 50 preferably exerts a force on spherical plate 40 at all angles about periphery 46 of spherical plate 40 and applies a slight bending moment on periphery of spherical plate 40 when spherical plate 40 deflects positively or negatively, thus causing spherical plate 40 to form not a pure spherical shape, but one that is slightly aspheric and beneficial to human sight. Spherical plate 40 deflects without undue radial or bending stress on plate 40 because plate 40 is not restrained at more than one point radially.

In the illustrated embodiment, there is only one (i.e., a single) peripheral seal 50 for each optics set. Prior art designs have required multiple seals or adhesives to stretch and hold membranes to their frames. Neither of these deficiencies is present in this embodiment. Plate 40, when deflected, is subjected to very mild radial retarding forces whether the plate 40 edge is increasing or decreasing in curvature. There are no excessive stretching forces on plate 40 as in other inventors' designs. Plate 40 is smaller in diameter than wall 25 in which it resides, so the wall 25, while exerting a slight contact stress, does not exert a radially compressive force on plate 40.

The material (e.g., plastic) utilized to form spherical plate 40 and its thickness can vary between embodiments. In a preferred embodiment, spherical plate 40 is transparent and, when not subject to hydraulic pressure, is stress-free and a null optic (e.g., planar). In general, it is desirable if spherical plate 40 is thick enough to negate the gravitational forces of fluid 570 on spherical plate 40, but as thin as is reasonable to reduce the hydraulic force required to deflect it and thus reduce battery usage. It should be noted that some thin membranes (e.g., of plastic film) can exhibit this gravity-induced optical aberration, which is preferably avoided by Lnzwear.

A fail safe aspect of the spherical fluid cell is created by the curvature of anterior surface 21, curvature of posterior surface 22, thickness of base optic 20 at its apex, index of refraction of base optic 20, index of refraction of fluid 570, index of refraction of spherical plate 40, and thickness of spherical plate 40. With loss of hydraulic pressure, the fluid cell preferably forms a null optic equivalent to parallel surfaces of a flat plate. When fluid 570 is absent, the empty cell preferably forms a weak negative lens, which would enhance distance vision (which is valuable, for example, if a presbyope is driving a vehicle at high speed).

Referring specifically to FIG. 8B, in the Lnzwear SRxD embodiment, ring 60 includes an interior chamber 90 housing a line-of-sight detector comprising a ring printed circuit board (PCB) 80 bearing a set of sensors, for example, a plurality of silicon photodiode arrays (SPDAs) 90 and associated transfer optics 100. Chamber 90 is located radially outside the prescription lens 120 and preferably beyond the peripheral vision of the user, but is designed to receive ambient or provided electromagnetic radiation (e.g., visible light or other electromagnetic frequency or frequencies) reflected by the user's lids, lashes, globe, iris, and pupil. As described below with respect to the Lnzwear SCD embodiment, the line-of-sight detector is utilized to detect a vector from the user's eyes to an object that is the subject of focus of the user's eyes.

Figure 8C:
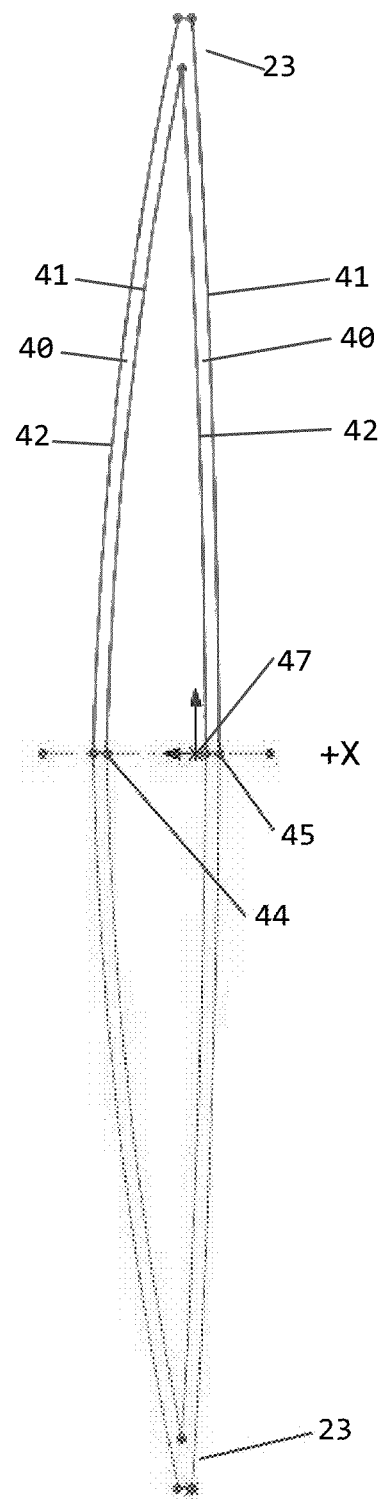
FIG. 8C an elevation section view illustrating the positive and negative deflections of a spherical cell plate.

FIG. 8C is a right side elevation section of spherical plate 40 of FIGS. 8A-8B. In FIG. 8C, anterior and posterior deflections of spherical plate 40 are both illustrated, where anterior deflection (i.e., deflection to the right of origin point 47 under negative pressure (vacuum)) forms fluid 571 into a negative lens and posterior deflection (i.e., deflection to the left of origin point 47 under positive pressure) forms fluid 571 into positive lens. (The concavity of the posterior surface 22 of base optic 20 is preferably great enough to accommodate the desired range of anterior deflection of spherical plate 40 without contact between spherical plate 40 and base optic 20.) When spherical plate 40 is deflected under hydraulic pressure, the periphery 46 of plate 40 is permitted to move and outward relative to the X axis and is permitted to rotate under the influence of edge moments, all while remaining in contact with torus 23 and peripheral seal 50. In a preferred embodiment, the image produced by the spherical fluid cell is of ophthalmic quality and is free from any aberrations detectable by unaided human vision. The ability to produce an ophthalmic quality spherical fluid lens is due at least in part to the strength of spherical plate 40, the compressive forces exerted on spherical plate 40 by peripheral seal 50, the coefficient of friction between spherical plate 40 and torus 23, and the lack of significant constraint of spherical plate 40 in the radial direction. In a preferred embodiment in which spherical plate 40 and inner wall 25 are both circular, spherical plate 40 is restrained in the radial direction at only one point of contact at any given time.

Figure 9A:
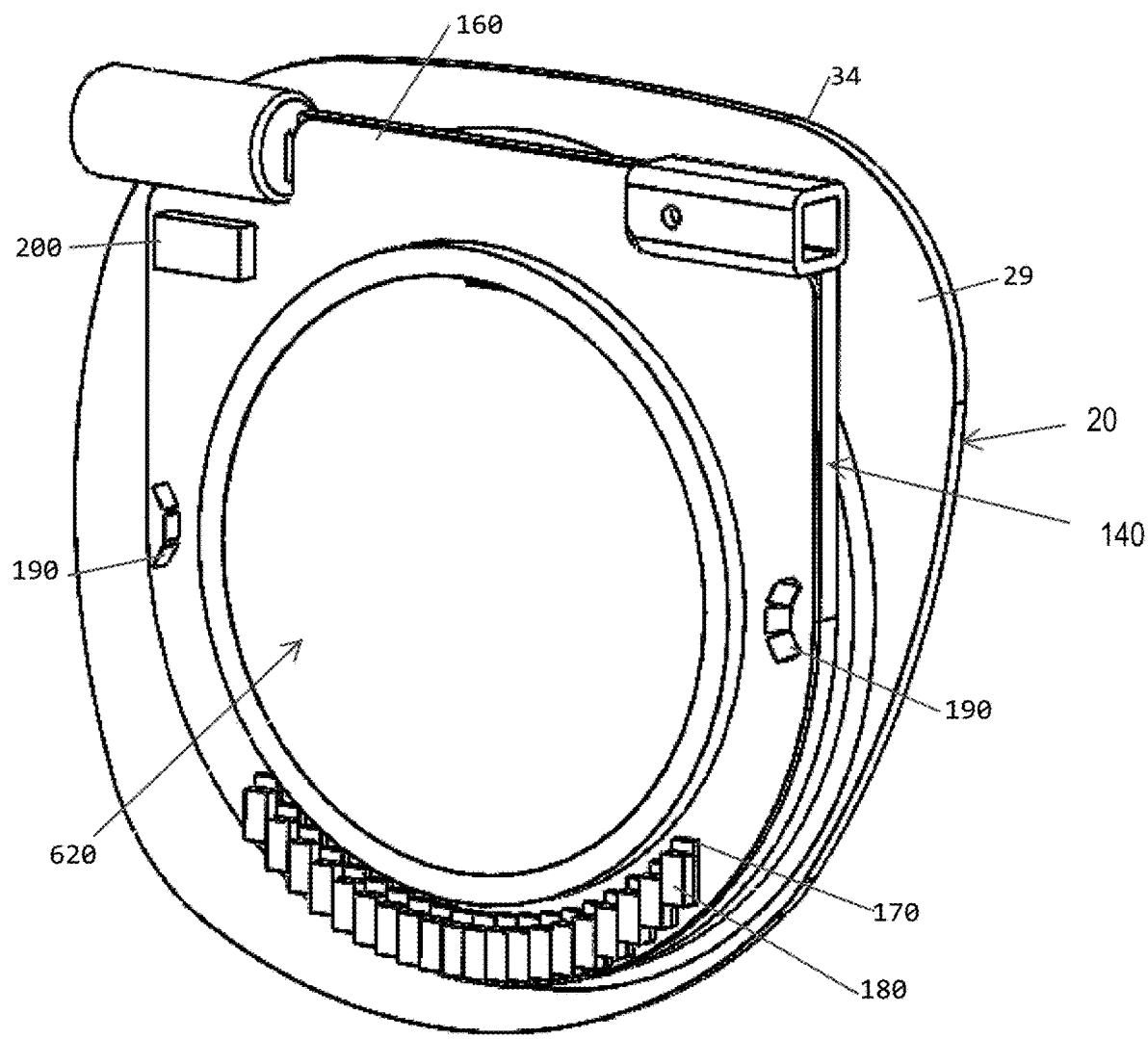
FIG. 9A is an isometric view of the optics set for one eye in an exemplary Lnzwear SCD embodiment as seen from the upper right rear.
Figure 9B:
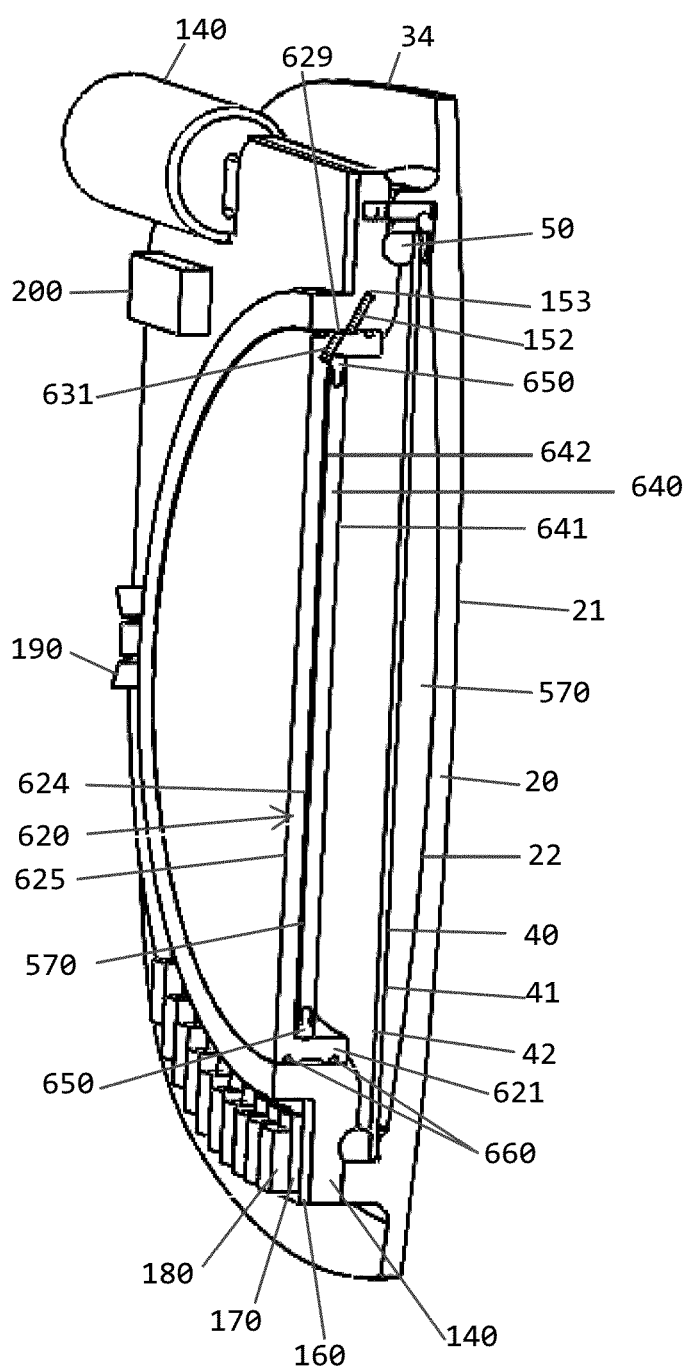
FIG. 9B is an isometric section view of the optics set for one eye in an exemplary Lnzwear SCD embodiment as seen from the upper right rear.

Referring now to FIGS. 9A-9B, there are depicted isometric and section views of the set of optics for one eye in a Lnzwear Spherical-Cylindrical-Detector (SCD) embodiment. As will be appreciated from the following, the SCD embodiment has some commonality in design with the previously described SRxD embodiment, but also provides a cylindrical fluid lens suitable for correction of astigmatic vision.

In this SCD embodiment, the set of optics, a pair of which can be assembled on a frame as previously described, includes a spherical optic as well as a cylindrical optic. As described above with respect to the SRxD embodiment, the spherical optic is formed from base optic 20, a spherical plate 40, and a fluid 570 shaped into a selected spherical lens by the application of hydraulic pressure. The only difference in the spherical optic from that previously described with respect to the SRxD embodiment is that peripheral seal 50 is retained by a frame 140 rather than ring 60. In the SCD embodiment, the cylindrical optic includes frame 140, which holds a cylindrical housing 620 utilized to form a cylindrical fluid cell as described below. Because the point of greatest deflection of the spherical cell is located at its center and the point of greatest deflection of the cylindrical cell is located at its periphery, the two cells can be nested very closely together. In use, the posterior surface of frame 140 is preferably covered with an encapsulation layer 210 shown in FIG. 16B, but omitted from the illustrations given in FIGS. 9A-9B in order to permit clear view of the components of a line-of-sight detector.

In the depicted embodiment, the line-of-sight detector includes a frame PCB 160, which is mounted facing posterior (i.e., facing the user's eyes). Frame PCB 160 provides a physical substrate for the line-of-sight detector, as well as power and communication to all electronic components of the line-of-sight detector. In this exemplary embodiment, multiple lamps 190 angularly directing electromagnetic radiation (e.g., visible light or other electromagnetic frequency or frequencies) rearward are provided on both the left and right sides of cylindrical housing 620. Lamps 190 are located and directed both upward and downward to illuminate different regions of the eye and to produce as much reflected (scattered) light from the eye as possible with minimum overall light. In some embodiments, lamps 190 are illuminated selectively (e.g., when ambient light is insufficient to illuminate the eye), and ambient light is utilized when possible for power efficiency. Lamps 190 are preferably located on frame PCB 160 near the equator of the eye to allow light to proceed to the globe 933 and iris 928 and not be occluded by the upper lid 931 and lower lid 932 and their lashes (see, e.g., FIG. 16B).

Light reflected from the eye is collected by transfer optics 180. (Encapsulation 210 is either transparent to the detected frequency or frequencies of electromagnetic radiation or has ports formed in it to admit the radiation to the transfer optics 180.) Transfer optics 180 are transparent pathways encased in opaque material, which form columns evenly spaced from one XZ plane to an adjacent XZ plane and rows radiating from a working point (line) such that reflected light is sampled from the lids, globe, and iris from the bottom of the eye to the top of the eye. The distance between XZ planes in silicon photodiode array 170 is on the order of microns. Light captured by each transfer optic 180 is transferred to the active sensor plane of a corresponding photodiode in SPDA 170. A microprocessor 200, which in this embodiment is illustrated as located toward the upper left corner of frame PCB 160, interrogates silicon photodiode arrays 170 to determine the pattern of the reflected light, and from this data, the line-of-sight (as described below with reference to FIGS. 21A-21C).

Referring specifically to FIG. 9B, the cylindrical cell includes a cylindrical housing 620 having an anterior surface 624, a posterior surface 625, an exterior circumference bounded by frame 140, a sidewall 621 extending along the X axis, and an interior circumference bounded by sidewall 621. Cylindrical housing 620 can be rotated manually (or with an electric motor) about the X axis while mounted in frame 140, and fluid is retained between frame 140 and cylindrical housing 620 by a pair of circumferential cylindrical housing seals 660 retained in recesses 628 (see, FIGS. 10A-10C) in sidewall 621. The cylindrical cell additionally includes a cylindrical plate 640 (which has an anterior surface 641 and a posterior surface 642) retained within the interior diameter of cylindrical housing 620 and a cylindrical plate seal 650 forming a circumferential fluid-tight seal against the interior circumference of sidewall 621 of cylindrical housing 620. The cylindrical cell forms a cylindrical lens when fluid 570 is pumped into the volume between posterior surface 642 of cylindrical plate 640 and the anterior surface 624 of cylindrical housing 620. The spherical cell and cylindrical cell are preferably provided fluid 570 from the valve section described below via separate fluid passageways.

Figure 10A:
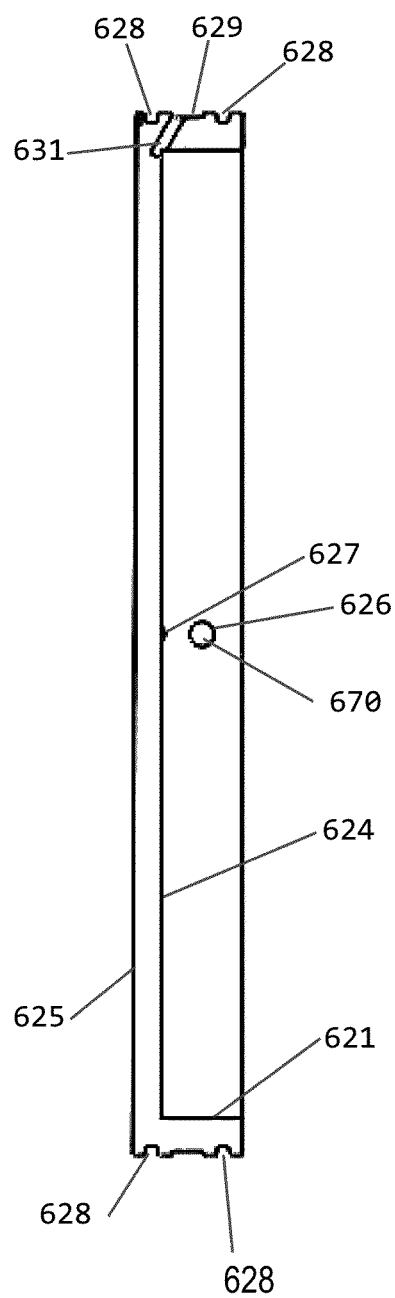
FIG. 10A is a section view of an exemplary cylindrical cell having a null bias lens.
Figure 10B:
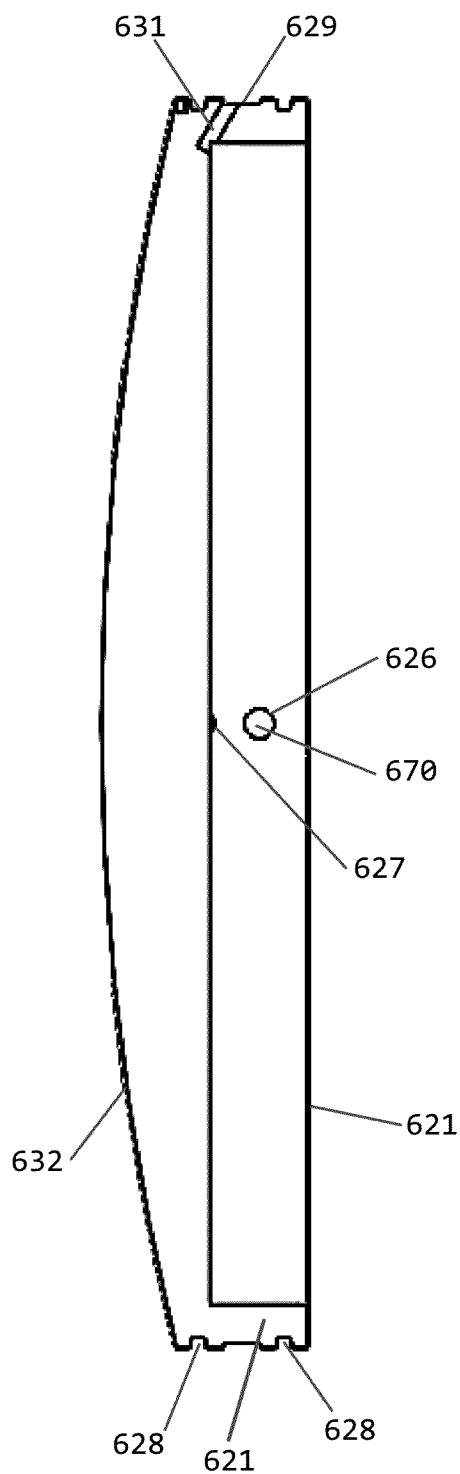
FIG. 10B is a section view of an exemplary cylindrical cell having a positive bias lens.
Figure 10C:
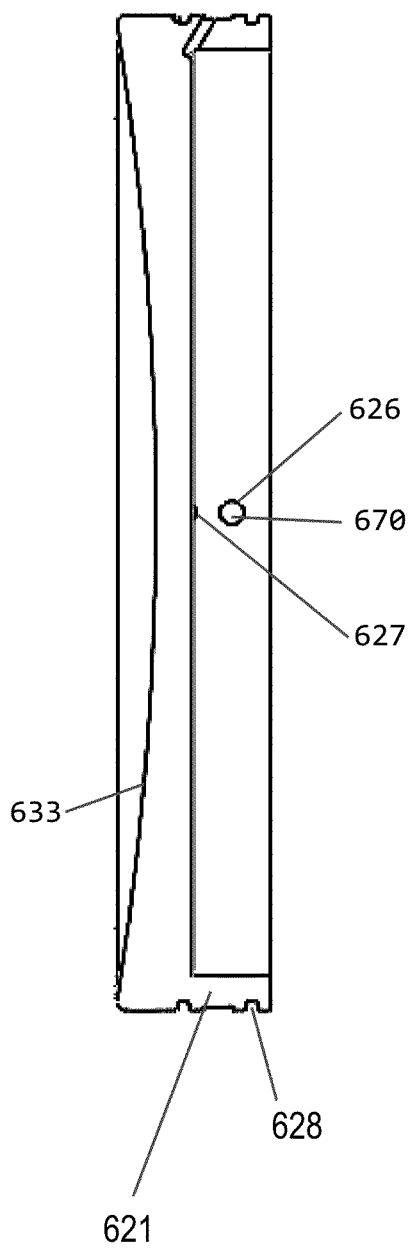
FIG. 10C is a section view of an exemplary cylindrical cell having a negative bias lens.
Figure 11:
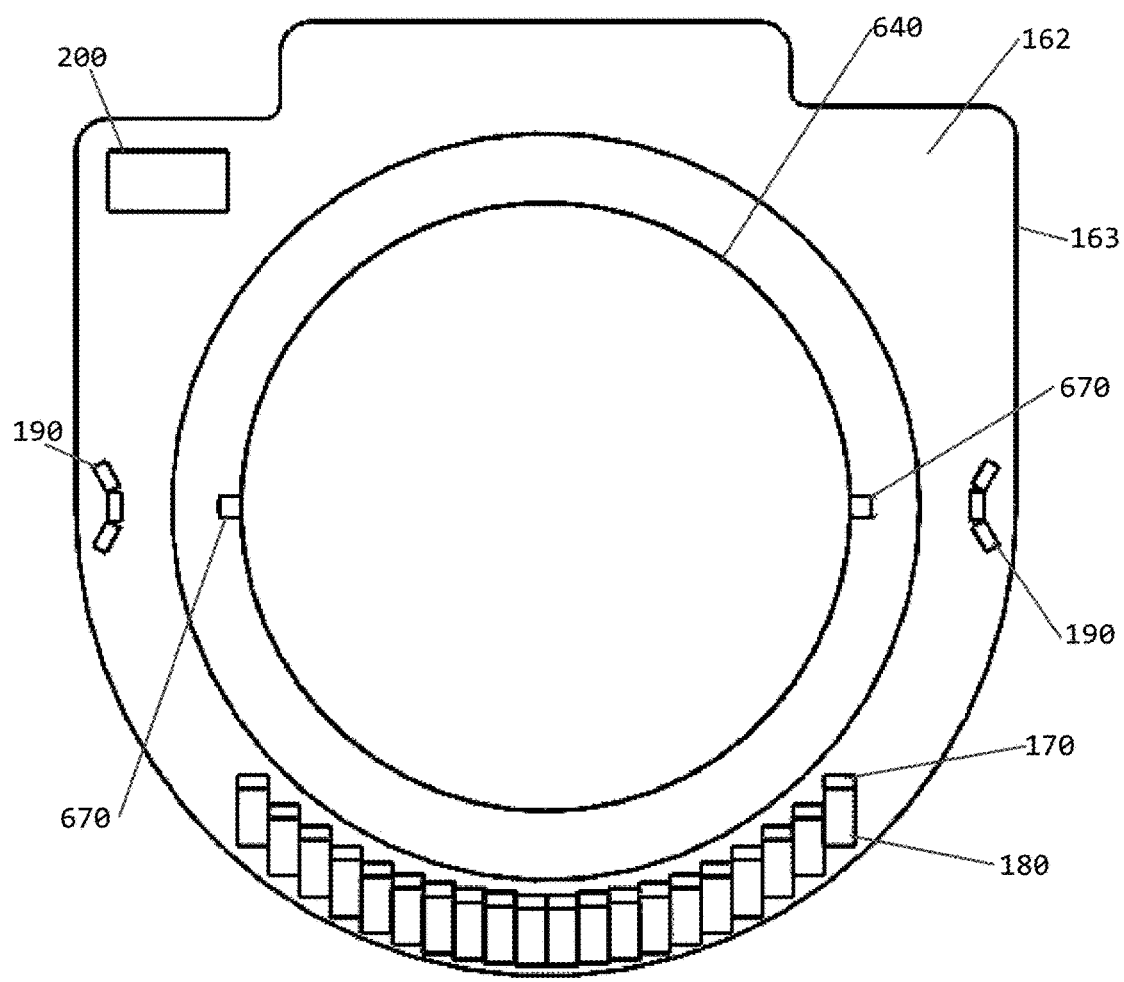
FIG. 11 is a rear elevation view of the transfer optics, silicon photodiode array, lamps, microprocessor, and PCB (printed circuit board) of an exemplary Lnzwear SCD embodiment.

FIGS. 10A-10C provides a section views of embodiments of the cylindrical housing 620 of FIGS. 9A-9B in isolation. As shown, sidewall 621 has a pair of mounting holes 626 formed therein for receiving a corresponding pair of external pivots 670 (see also, the elevation view given in FIG. 11). Mounting holes 626 and external pivots 670 are preferably located at either end of the equator of cylindrical housing (e.g., the diametral line). Cylindrical housing 620 additionally has a pair of internal pivots 627 aligned with and posterior to external pivots 670. In some embodiments, internal pivots 627 can be implemented with pivot pins like external pivots 670. In alternative embodiments illustrated in FIGS. 10A-10C, internal pivots 627 can be implemented with bosses formed integrally with cylindrical housing 620 at the edges of anterior surface 624. External pivots 670 and internal pivots 627 are preferably spaced so that each is in firm contact with a surface of cylindrical plate 640 (not shown in FIGS. 10A-10C for clarity). Thus, when the cylindrical optics are assembled, one external pivot 670 is anterior to cylindrical plate 640 and one internal pivot 627 is posterior to cylindrical plate 640 at each side.

With the described arrangement, cylindrical plate 640 is retained in cylindrical housing 620 by external pivots 670, internal pivots 627, and cylindrical plate seal 650, and is supported at each end of its equator by an internal pivot 627 and external pivot 670. A passageway 631 to the enclosed volume posterior of cylindrical plate 640 is in fluid communication with a groove 629 enclosed by seals 660 disposed in grooves 628. Groove 629 is in turn in communication with a passageway 152 of the frame and it, in turn, with passageway 153 to the hinge. As fluid is forced into the interstitial space between anterior surface 624 of cylindrical housing 620 and posterior surface 642 of cylindrical plate 640, the unconstrained edges of cylindrical plate 640 deflect anteriorly (along the X axis) about the external pivots 670 in a shape much like that of butterfly wings, as shown in the side and front elevation views given in FIGS. 12-13. The deflection of cylindrical plate 640 forms fluid 570 into a cylindrical lens. Given the ability to vary the deflection, that is to vary the power of the cylindrical lens and the ability of cylindrical housing 620 to rotate about the X axis, the cylindrical cell can completely counter the astigmatic error of the eye. Moreover, since the cylindrical cell provides a continuous range of correction rather than discrete increments of correction, the cylindrical cell can provide a more precise correction than the quarter diopter increments which are standard in traditional eyewear. If at any subsequent time, the cylindrical correction is not appropriate, a different correction can be established for the then-existing conditions by the user in real time. No scheduling, appointments, testing, re-prescribing, re-manufacturing, shipping, re-edge grind and beveling, or fitting to frames is required.

In at least some embodiments, cylindrical housing 620 can incorporate a positive bias lens 632, as shown in FIG. 10B, or a negative bias lens 633, as shown in FIG. 10C. To accommodate a variety of users, many different bias lenses (e.g., 12) providing differing focal distances can alternatively be employed within Lnzwear to support users needing differing corrections. In some alternative embodiments, the bias lenses can be a separate lens added to the null powered cylindrical housing posterior to surface 625. It should be appreciated that bias lenses, however implemented, are not prescription lenses and contribute to the ability to mass produce Lnzwear.

The cylindrical fluid cell disclosed herein is unique and unobvious, for example, because it is constrained in the X direction at only two points on the equator of its area in its YZ plane and not otherwise constrained in X around its periphery. The deflected cylindrical plate and the angular position of the cylindrical housing, as indicated by the positions of the pivots about the X axis, determine the cylindrical power and astigmatic axis for countering astigmatism. The tendency of bending materials is to obey Poison's ratio, but by extending the pivots inward along their radial lines a superior stiffness (less deflection) is established in the XY plane perpendicular to the equator such that no visible aberration occurs in forming the fluid into a cylindrical lens. Because the cylindrical fluid cell is controlled independently from the spherical fluid cell, the need for a massive inventory of the 1360 standard prescription lenses is eliminated.

Figures 12, 13:
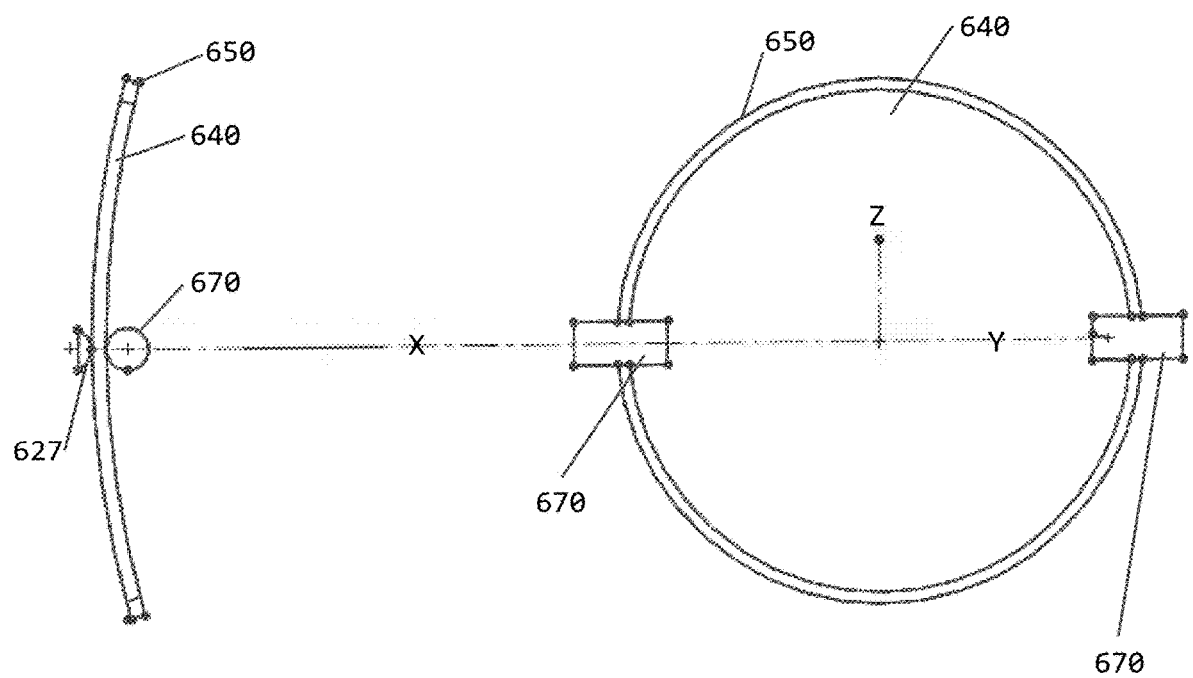
FIGS. 12-13 are side and front elevation views of a deflected cylindrical plate of a cylindrical fluid cell in an exemplary Lnzwear embodiment.

The process by which the appropriate cylindrical correction for countering astigmatism can be found can include the user first determining if any astigmatic correction is needed or desired. In cases in which there is not any human astigmatism, no vision improvement utilizing the cylindrical cell is desirable or necessary. If astigmatism is present in the human user, the search for the appropriate cylindrical correction starts by imbuing the cylindrical fluid cell with a weak (or low) cylindrical power. If there is no improvement in vision, the angle of the cylindrical fluid cell can be moved from a zero degree angle (as shown in FIG. 13) by rotating the cylindrical fluid cell about its X axis, for example, by a small finite angle. If improvement is observed, the cylindrical fluid cell can be moved an additional degree. If improvement is not observed, the angle of the cylindrical fluid cell can be returned to the previous angle and the diopter of the cylindrical fluid cell can be increased. This process of incremental change and/or reversion to a prior diopter and/or angle can be repeated until a preferred cylindrical correction is obtained. It should be appreciated that during this process the cylindrical fluid cell need not be rotated in full one degree increments, which makes a more precise counter to astigmatism. Another advantage is the increased accuracy achieved by virtue of the user using operationally the same optical equipment that was used to detect and counter the astigmatism (i.e., Lnzwear serves both as a phoropter and as eyewear).

Figure 14:
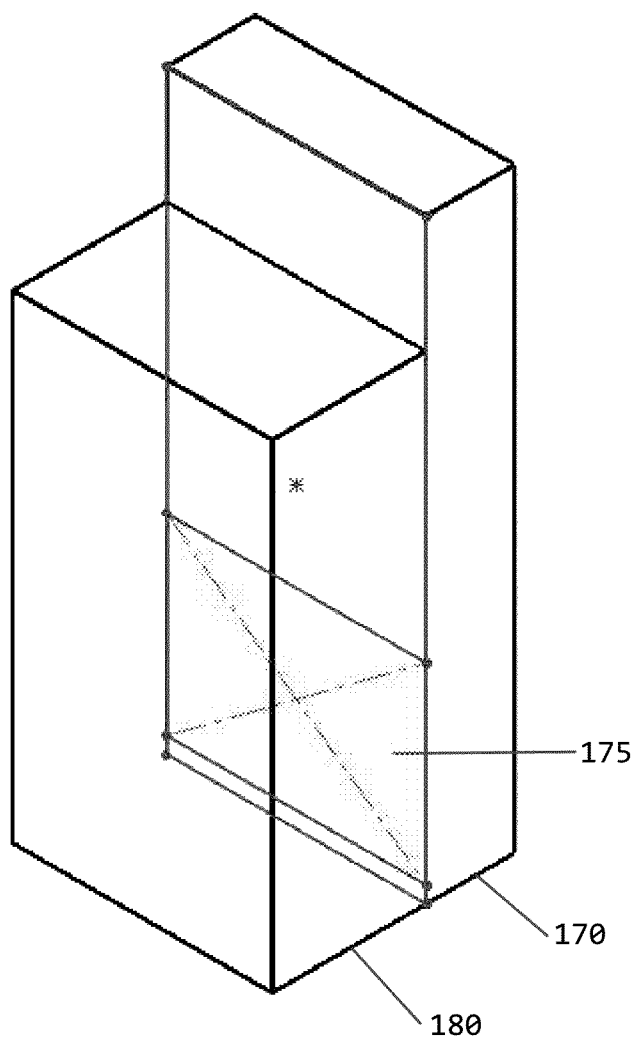
FIG. 14 is an isometric view of the location of the transfer optic and silicon photodiode array sensor pattern of an exemplary Lnzwear SCD embodiment.
Figure 15:
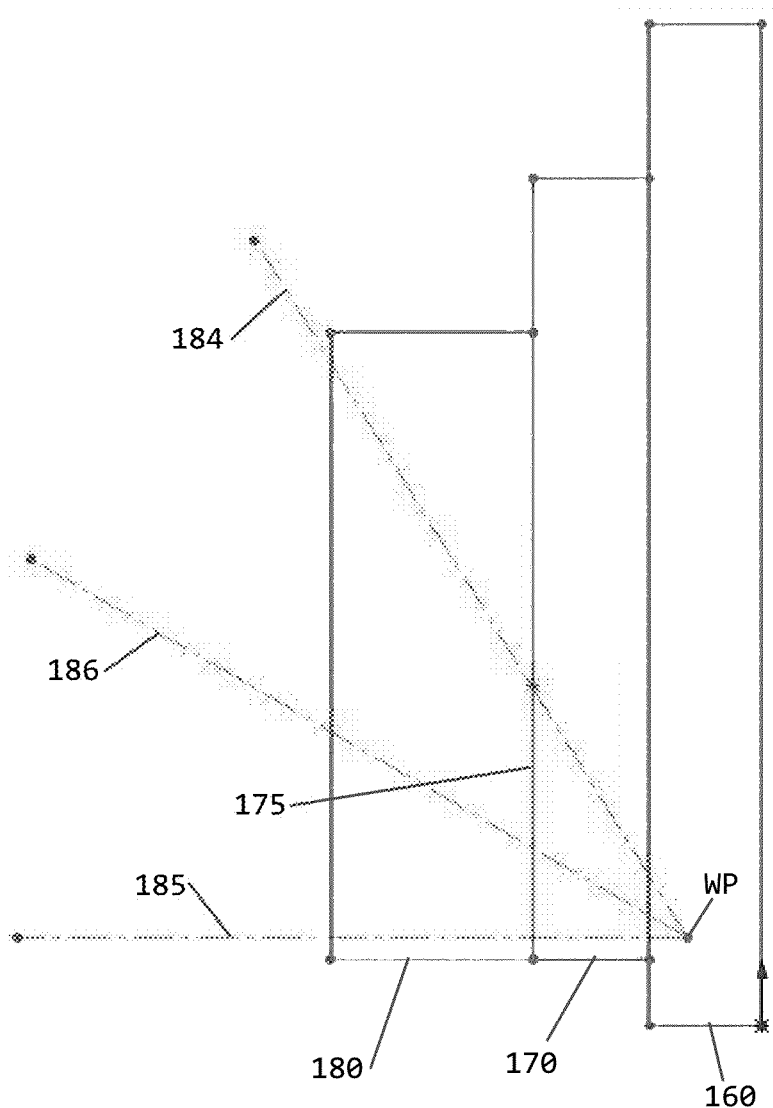
FIG. 15 is a side elevation view of the centerlines of the horizontal, lowest useful, and highest angle light paths of the transfer optics, showing the frame PCB, silicon photodiode array, and transfer optic of an exemplary Lnzwear embodiment.

Referring now to FIGS. 14-15, there are illustrated isometric and elevation views showing a transfer optic 180 and associated SPDA 170 of a line-of-sight detector as if transparent. As best seen in FIG. 14, SPDA 170 includes an active sensor area 175 in which light or other electromagnetic radiation is sensed. Transfer optic 180, which contains a multiplicity of light paths spaced in rows and columns in an opaque support medium, directs light (or other electromagnetic radiation) reflected from areas of the eyes and their environs to active sensor area 175 of SPDA 170. FIG. 15 illustrates that light rays reflected from the lids, globe, and iris of the eye and captured by transfer optic 180 converge toward a working point (WP) representing a reference line that is located anterior to the transfer optic. The depicted geometry can capture all incoming rays in the angle bounded by rays 185 and 186, but not all such rays are needed in line-of-sight detection as incoming rays between rays 184 and 186 include those rays originating from the relevant area of the eye.

Figure 17A:
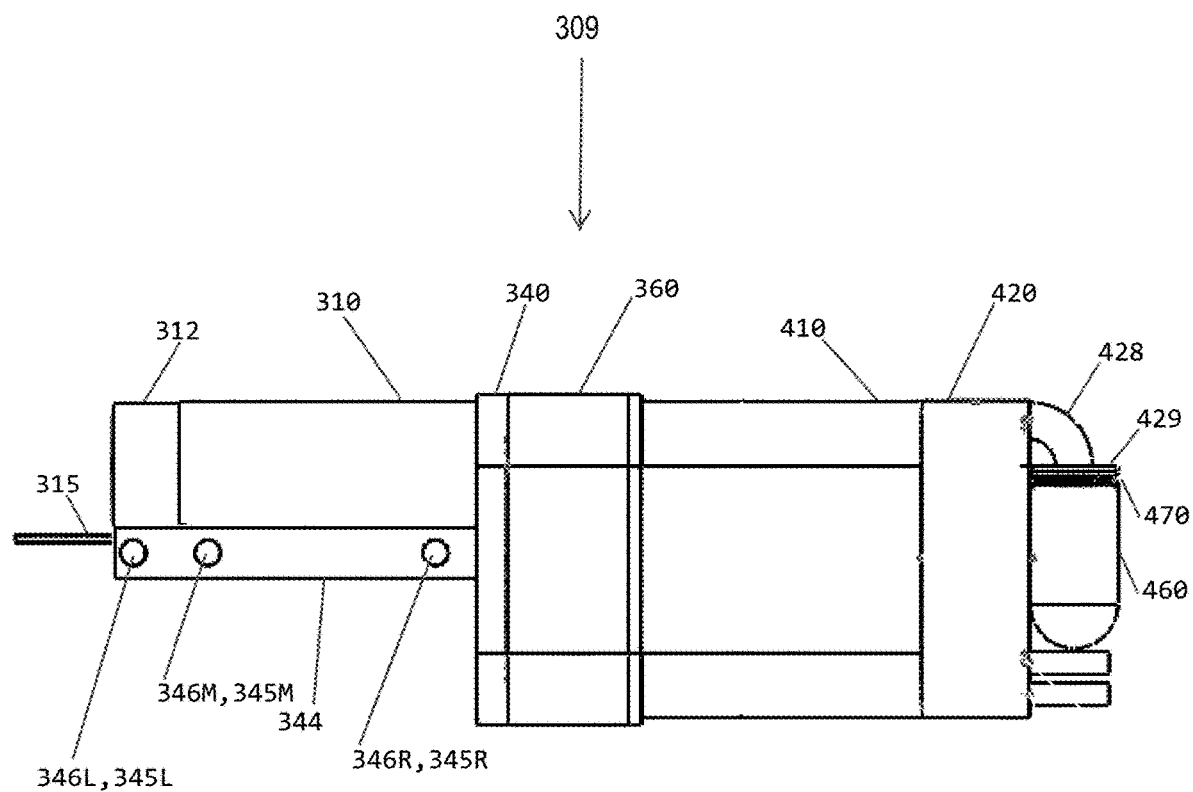
FIGS. 17A-17B are elevation and section views of a drive system in an exemplary Lnzwear embodiment.
Figure 17B:
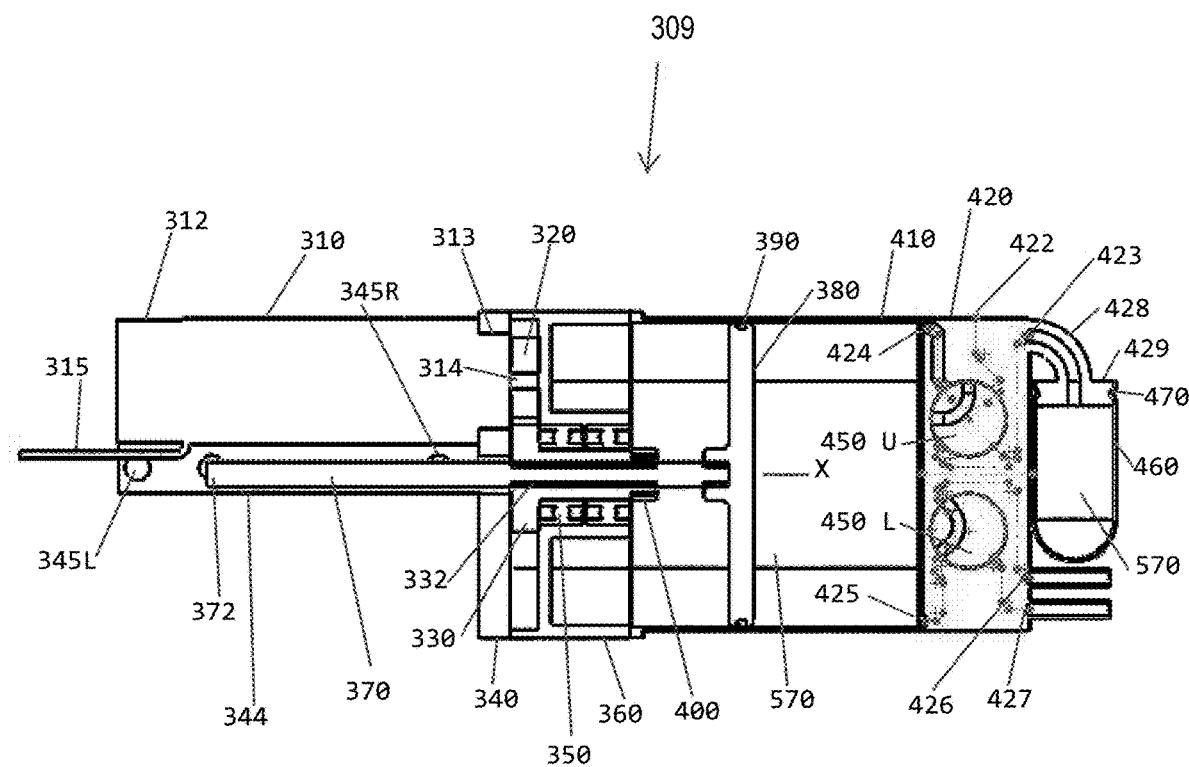

With reference now to FIGS. 17A-17B, there are illustrated a right side elevation view and right side partial section view of an exemplary drive system suitable for use in at least Lnzwear SRxD and SCD embodiments to focus the spherical fluid cells and, if present, determine the power of the cylindrical fluid cell. A similar drive system is preferably disposed in each Lnzwear earpiece.

The illustrated embodiment of drive system 309 includes motor 310 (e.g., a battery-powered electric motor powered by a battery box 290) and associated encoder 312 and motor and encoder leads 315. The drive system 309 further includes bulkheads 340 and 360, a pump body 410 housing a piston 380 driven by motor 310, a reservoir 460 for fluid 570, and a valve section 420 in fluid communication with pump body 410 and reservoir 460 that controls flow of fluid 570 between reservoir 460, pump body 410 and the spherical and/or cylindrical fluid cells. Not apparent in these views is the non-circular (e.g., lozenge or racetrack shape) in plane YZ of pump body 410, piston 380, and piston seal 390. As a result, piston 380 and the threaded piston rod 370 attached thereto translate, but cannot rotate, within pump body 410.

Referring specifically to FIG. 17B, motor 310 has a motor shaft 314 on which a pinion 320 is mounted. Pinion 320 mates with gear nut 330, which is rotatable in bearings 350 mounted in bulkhead 360. Gear nut 330 has a threaded central bore that engages threaded piston screw 370. With this arrangement, piston 380 can be driven forward and backward in the interior of pump body 410. The range of motion of piston 380 under the urging of motor 310 is preferably limited to prevent collision of piston 380 and pump body 410. In the depicted embodiment, piston rod 370 travels within a limit switch body 344 that houses at least two lamps 345L, 345R and at least two corresponding limit sensors 346L, 346R. When limit sensor 346L is occluded from the light of lamp 345L by the end 372 of threaded rod 370 or light from lamp 345R is sensed by sensor 345R, the resulting signal notifies the control system, which responds by halting rotation of motor shaft 314 and thus the travel of piston 380. As shown in FIG. 17A, limit switch body 344 may additionally be provided with one or more intermediate position indicators. For example, limit switch body 344 may include lamp 345M and a corresponding sensor 345R, which transmits a signal to the control system to indicate the transition between negative lens forming regions (those imparting a concave shape to spherical plate 40) and positive lens forming regions (those imparting a convex shape to spherical plate 40).

Valve section 420 includes a fill port 422 by which fluid 570 may be introduced into the drive system and a pump port 424 communicating with the variable interior volume enclosed by piston 380 and the walls of pump body 410. Valve section 420 additionally has a cylindrical cell port 426 and spherical cell port 427 utilized to route fluid to and from a cylindrical fluid cell and/or spherical fluid cell. Valve section also includes valve port 425 selectively connectable to cylindrical cell port 426 and spherical cell port 427, and further includes a reservoir port 423 communicating with a reservoir 460 for holding makeup fluid. In the depicted embodiment, reservoir 460 is a flexible vessel attached to reservoir port 423 by a reservoir support 428, reservoir flange 429 and reservoir keeper 470. Reservoir 460 can, with the movement of the piston 380 and the presence of external pressure, be filled and emptied of fluid 570 and atmospheric gases regardless of attitude. Reservoir 460 provides make up fluid volume to pump body 410 between maintenance periods due to any losses of fluid, for example, due to leaks in the seals, fluid loss through the plastic used to form Lnzwear, evaporation, etc.

Figure 17C:
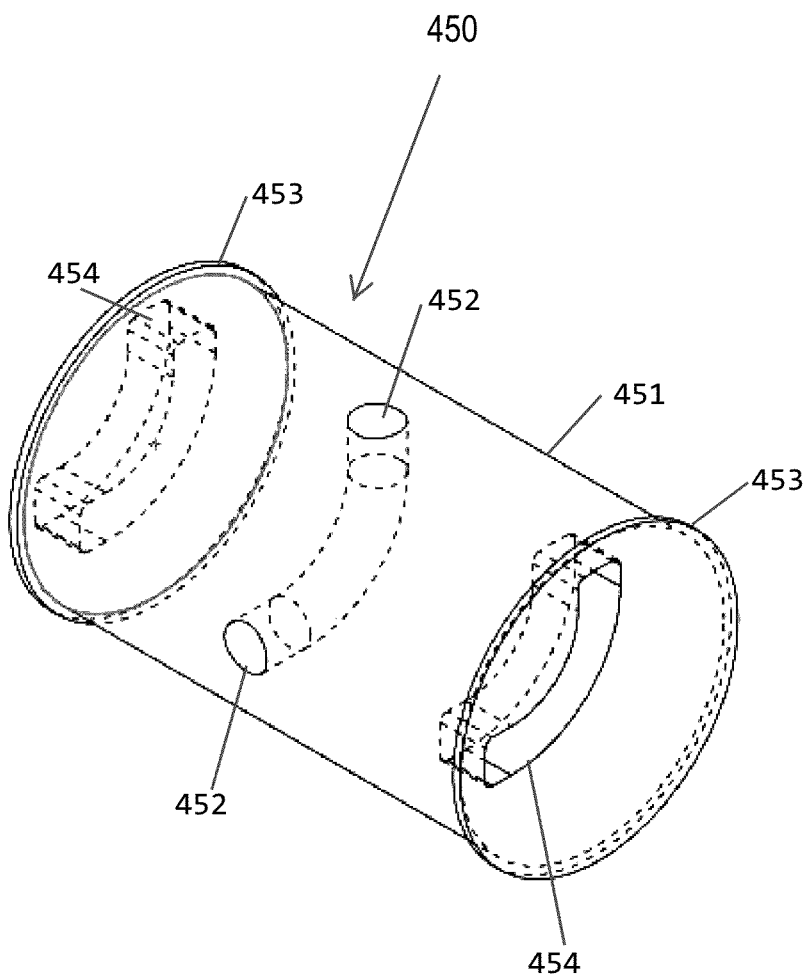
FIG. 17C is an isometric of a valve stem in an exemplary Lnzwear embodiment.

In at least one embodiment, the valve section contains two manually positioned valves, upper valve 450U and lower valve 450L. (These valves can be motor controlled in an alternative embodiment.) An exemplary valve 450 is illustrated in FIG. 17C. As shown, valve 450 includes a valve body 451 having an interior channel of valve port 452 forming an elbow therein. The sealing surfaces of the valve body 451 are preferably smooth, of high surface finish, slightly compressible, made to seal the valve ports, and maintain fluid tight integrity at all valve stem positions. The valve stems, which are retained in valve section 410 between flanges 453 at either end of the valve body 451, are preferably detented to valve body 451. FIG. 17C further illustrates that valve port 452 is aligned with an icon 454 preferably extending to the exterior of the earpiece. In at least some embodiments, icon 454 is a custom socket for a stem driver of the same profile, which allows the user to manually rotate the valve body 451. When Lnzwear is assembled, valve port 452 is not visible to the user, but the user can easily visually determine the orientation of valve port 452 by the corresponding orientation of icon 454.

Figure 18A:
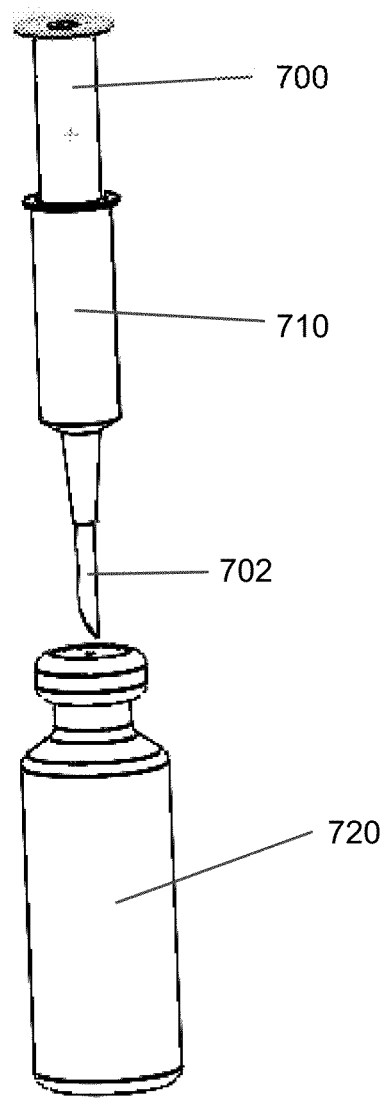
FIGS. 18A-18C are isometric views illustrating the filling of Lnzwear with fluid in an exemplary embodiment.
Figure 18B:
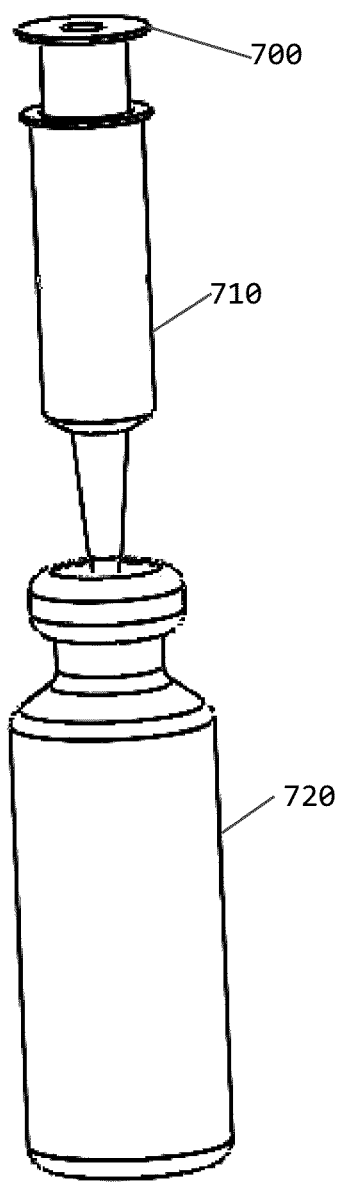
Figure 18C:
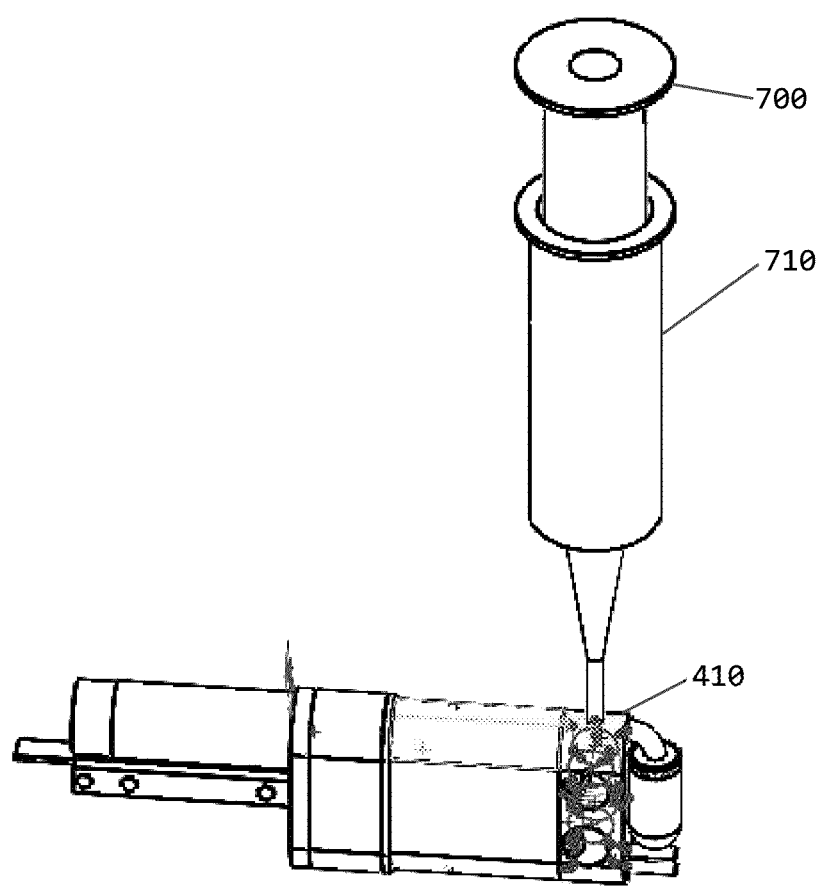

FIGS. 18A-18C illustrate filling the drive system 309 of an exemplary Lnzwear embodiment. As shown in FIG. 18A, the filling process begins with the provision of a fluid vial 720 containing clean fluid and the pump 710 that is clean and free of fluid. To extract fluid from fluid vial 720, piston 700 of pump 710 is retracted to fill pump 710 with ambient air. As depicted in FIGS. 18A-18B, a needle 702 attached or integral to the tip of pump 710 is then used to penetrate the seal of fluid vial 720, and piston 700 is engage to discharge the air within pump 720 into fluid vial 720. Piston 700 is then retracted to draw fluid from fluid vial 720 into pump 710. As depicted in FIG. 18C, needle 702 of pump 710 is thereafter inserted into fill port 422 of valve body 410, and piston 700 is partially engaged to discharge fluid from pump 710 into drive system 309. Depending on the position of upper valve 450U, fluid introduced in drive system 420 will flow to reservoir port 423 or to piston port 424.

With reference now to FIGS. 19A, 19B, 19C, 19D, 19E, 19F, and 19G, there are illustrated elevation sections through valve body 420 showing the passageways, valve stem positions, and ports necessary for the filling, purging, transferring, and pumping that serve to operate the focusing and refracting elements of one embodiment of Lnzwear.

Figure 19A:
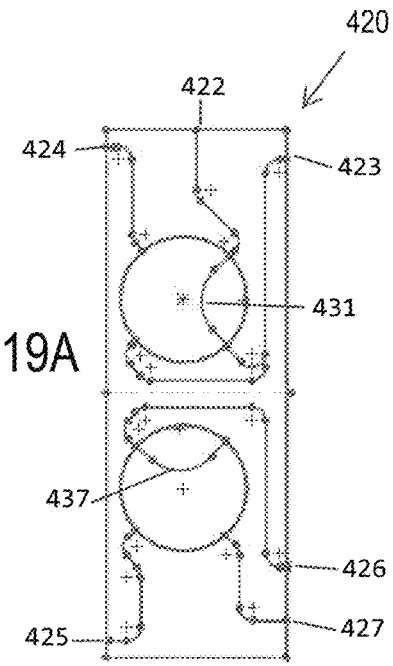
FIGS. 19A-19G are elevation sections through the valve body showing the passageways, valve stem positions, and ports necessary for filling, purging, transferring, and pumping that serve to operate the focusing and refracting elements of Lnzwear in an exemplary embodiment.

FIG. 19A shows the upper valve 450U in position 431, connecting fill port 422 to reservoir port 423 and sealing pump port 424. FIG. 19A also shows lower valve 450L in position 437, sealing off ports 425, 426, and 427. With this valve arrangement, pump 710 can fill reservoir 460 without the piston 380 moving.

Figure 19B:
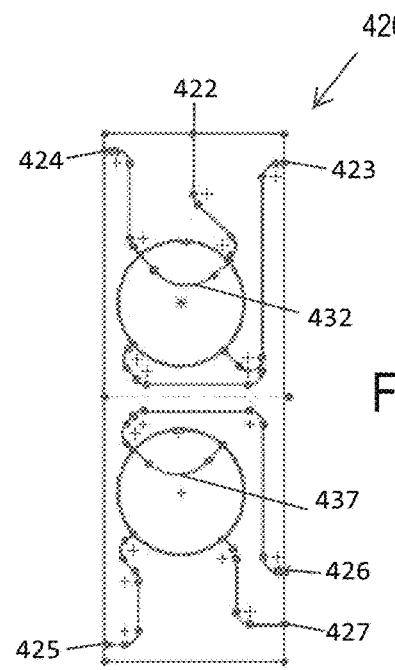

FIG. 19B shows the upper valve 450U in position 432, connecting fill port 422 to pump port 424 and sealing reservoir port 423 while lower valve 450L is in position 437, sealing ports 425, 426, and 427. Pressure from pump 710 is not needed while filling the pump 410 and moving piston 380. Pump 410 is effective when port 425 is sealed.

Figure 19C:
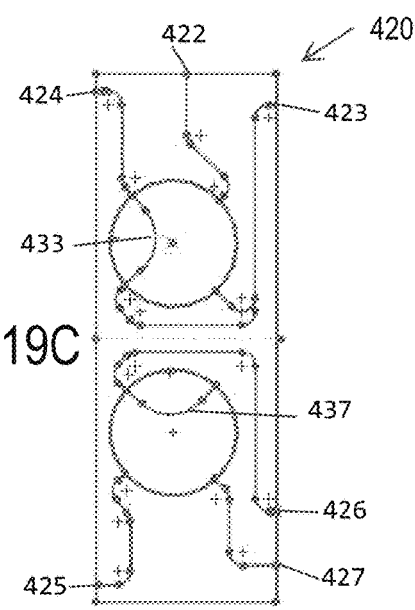

FIG. 19C shows upper valve 450U in position 433, sealing fill port 422 and connecting reservoir port 423 to pump port 424, while the lower valve 450L is in position 437, sealing ports 425, 426, and 427. While valves 450U and 450L are in positions 433 and 437, respectively, moving piston 380 will transfer fluid 570 from reservoir 460 to pump 410 and vice versa.

Figure 19D:
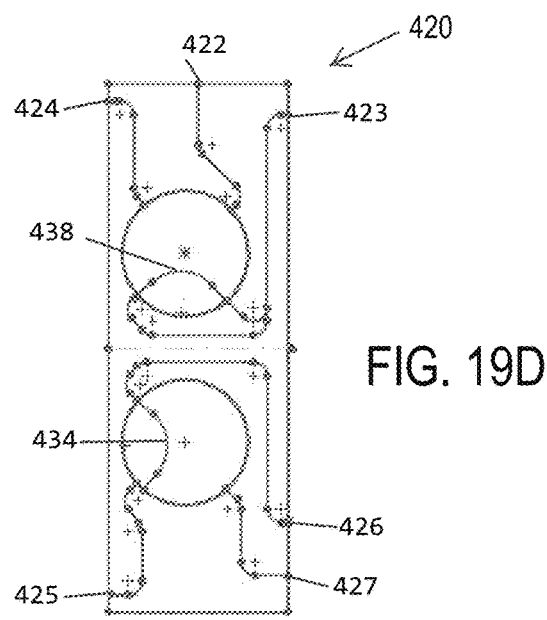

FIG. 19D shows upper valve 450U in position 438, sealing off ports 422, 423, and 424, while lower valve 450L is in position 434, connecting port 425 to port 427 while sealing port 426. Moving the piston 380 while valves 450U and 450L are in positions 438 and 434, respectively, adjusts the cylindrical power of cylindrical fluid cell.

Figure 19E:
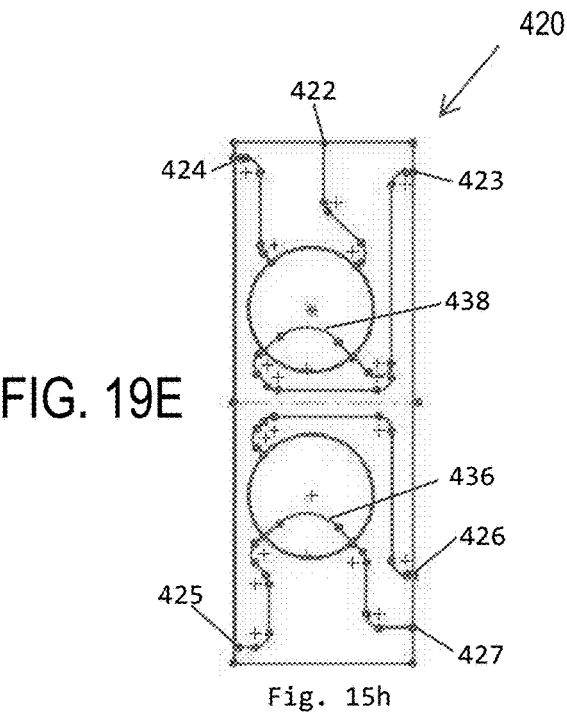

FIG. 19E shows upper valve 450U in position 438, sealing ports 422, 423, and 424, while lower valve 450L is in position 436, connecting port 425 with port 427 and sealing port 426. By moving the piston while valves 450U and 450L are in positions 438 and 434, the spherical power of the spherical fluid cell is altered.

Figure 19F:
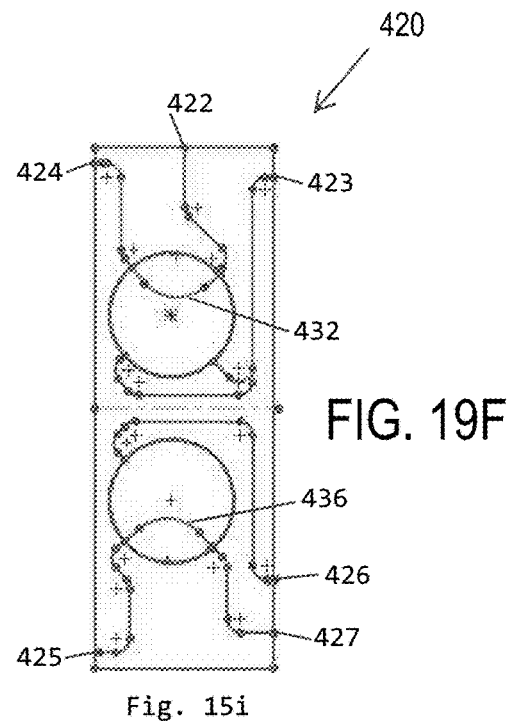

FIG. 19F shows upper valve 450U in position 432, connecting port 422 to port 424 and sealing port 423, while lower valve 450U is in position 436, connecting port 425 to port 427. This arrangement opens up the spherical fluid cell to atmospheric pressure and seals port 426. If the spherical plate 40 is deflected, the stored energy will eject fluid 570 to pump 410 or the atmosphere until spherical plate is at zero deflection. This arrangement is useful in allowing piston 380 to be moved to the neutral position at central sensor 346M, establishing a proper relationship between cylindrical plate 40 and the position of piston 380.

Figure 19G:
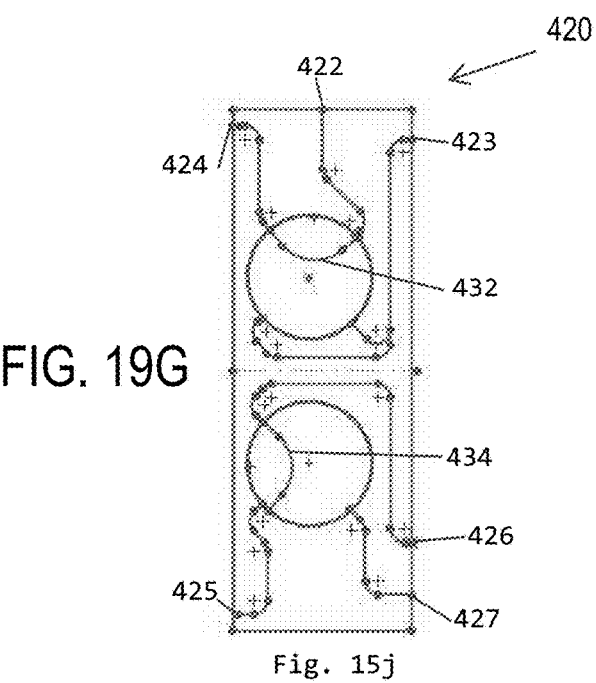

FIG. 19G shows the upper valve 450U in position 432, connecting port 422 to port 424 and sealing port 423, while lower valve 450U is in position 434, connecting port 425 to port 426 while sealing port 427. This arrangement is useful in initializing cylindrical plate 640 to be initialized to zero deflection. Gases are purged from the system to promote a monotonic relationship between the position of piston 380 and focal distance. Gas can be stored in reservoir 460, and pressure relieved on reservoir 460 as well.

Figure 20A:
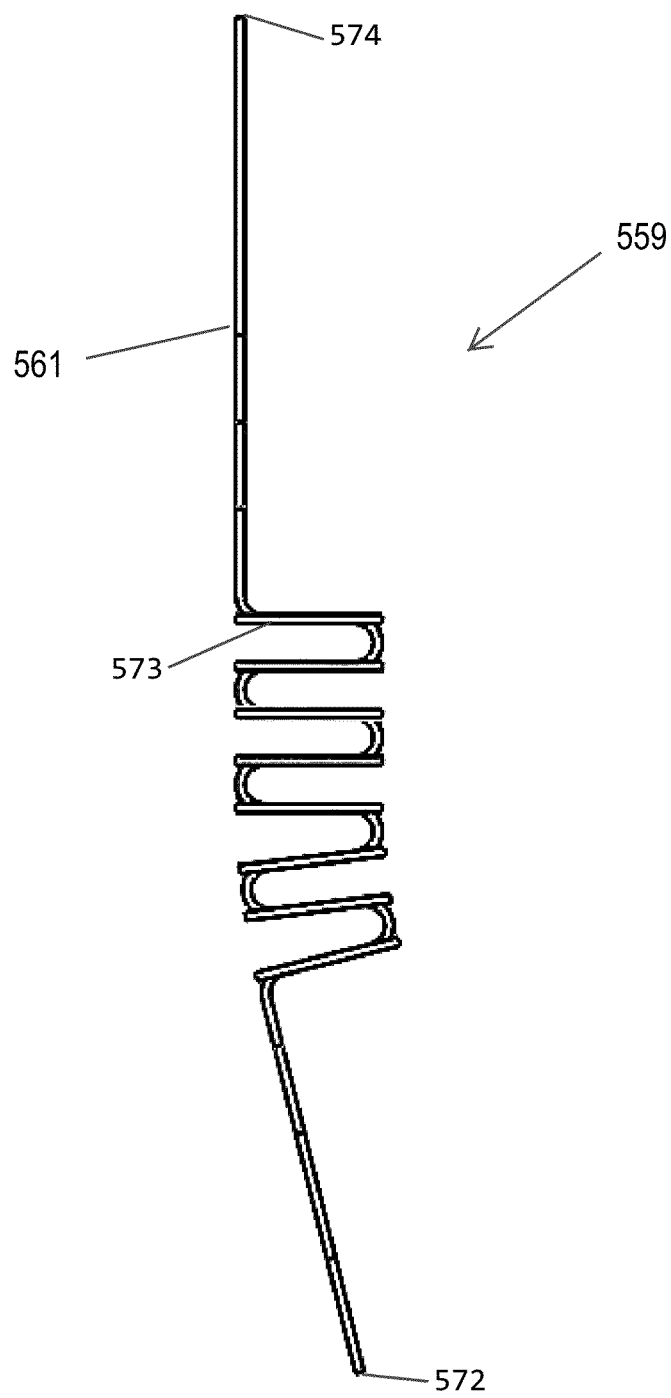
FIGS. 20A-20B are plan and isometric views of the earpiece control foundation in an exemplary Lnzwear embodiment.
Figure 20B:
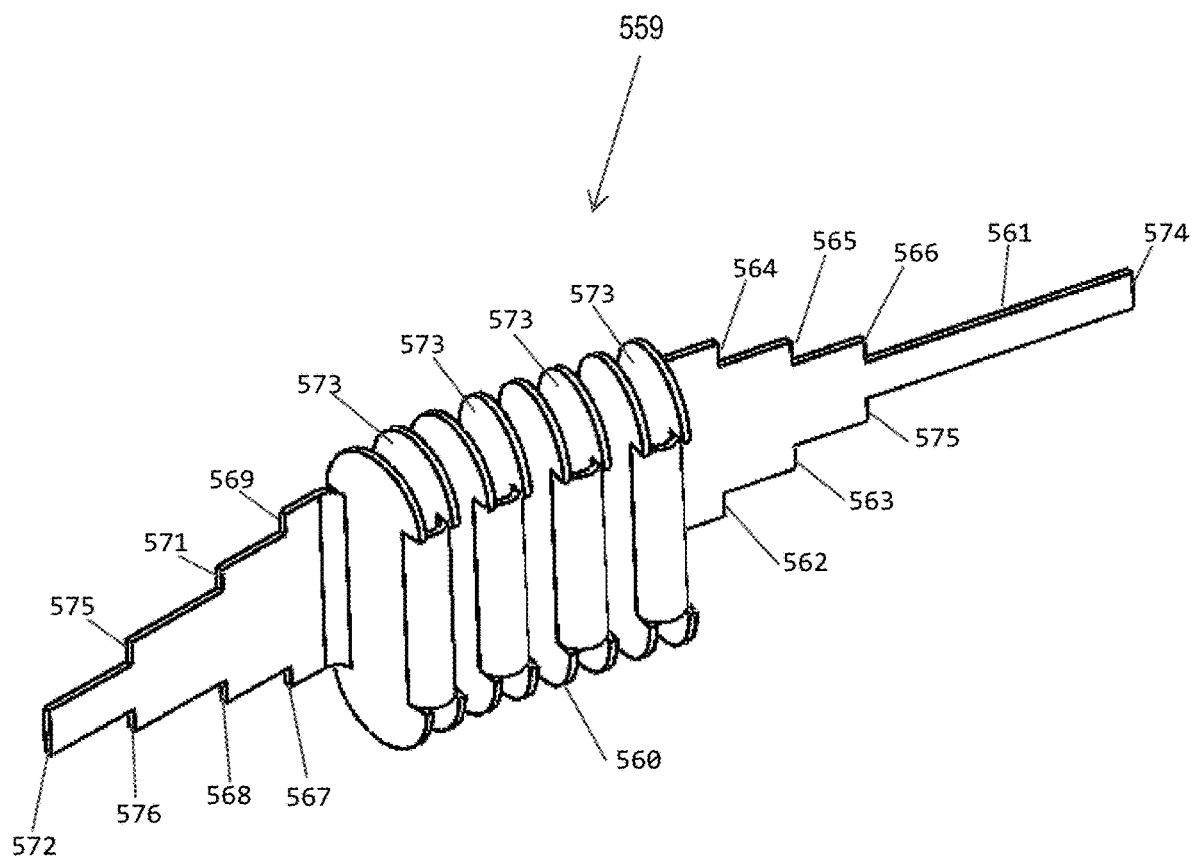

Referring now to FIGS. 20A-20F, mechanical and electrical components of an exemplary control system suitable for use in Lnzwear embodiments will now be described. With reference first to FIGS. 20A-20B, plan and isometric views of an exemplary embodiment of an earpiece control foundation 559 are given. In a preferred embodiment, earpiece control foundation 559 is sized and configured to be inserted and housed within the interior volume of earpieces 2. In the depicted example, earpiece control foundation 559 can extend between a forward end 574 proximate rotating hinge 243 of earpiece 2 and a rearward end 572 proximate to ear piece transition 270.

A best seen in FIG. 20B, in the illustrated embodiment, earpiece control foundation 559 is a flex-circuit (flexible plastic insulator (polyimide and copper) including a plurality of vertical segments 573 on which are attached or formed electronic components of the control system. These electronic components can include, for example, earpiece controller 611 described below with reference to FIGS. 22A-22B. On the exterior surface of earpiece control foundation 559, conductive patterns 577 of the man-machine interface 300 are formed (see, e.g., FIG. 20C). Forward end 574 of earpiece control foundation 559 is coupled through hinges 243 and 242 to provide power for frame PCBs 160.

In the illustrated embodiment, lead 562 is coupled to motor leads of motor and encoder leads 315; lead 563 is coupled to encoder leads of motor and encoder leads 315; leads 564, 565, and 566 are coupled to the lamps 345 and limit sensors 346; lead 567 transmits signals from an optional microphone 613 (see, e.g., FIG. 22A); lead 568 transmits signals to optional speaker 635 (see, e.g., FIG. 22A); lead 569 communicates signals to an optional radio transmitter 595 (see, e.g., FIG. 22A); lead 571 communicates signals received from radio receiver 592 (see, e.g., FIG. 22A); and lead 572 provides power from battery box 290. Leads 575 and 576 communicate outputs from an optional camera 617 (see, e.g., FIG. 22A) as inputs to the control system and transmit camera control signals to optional camera 617, respectively. Not explicitly illustrated are flex circuits disposed in battery hinge 280 and the battery box 290.

FIGS. 20C-20F depict the construction of an exemplary MMI 300, which in the illustrated embodiment includes multiple keys 301. The MMI 300 can be implemented on both left and right side earpieces 2.

Figure 20C:
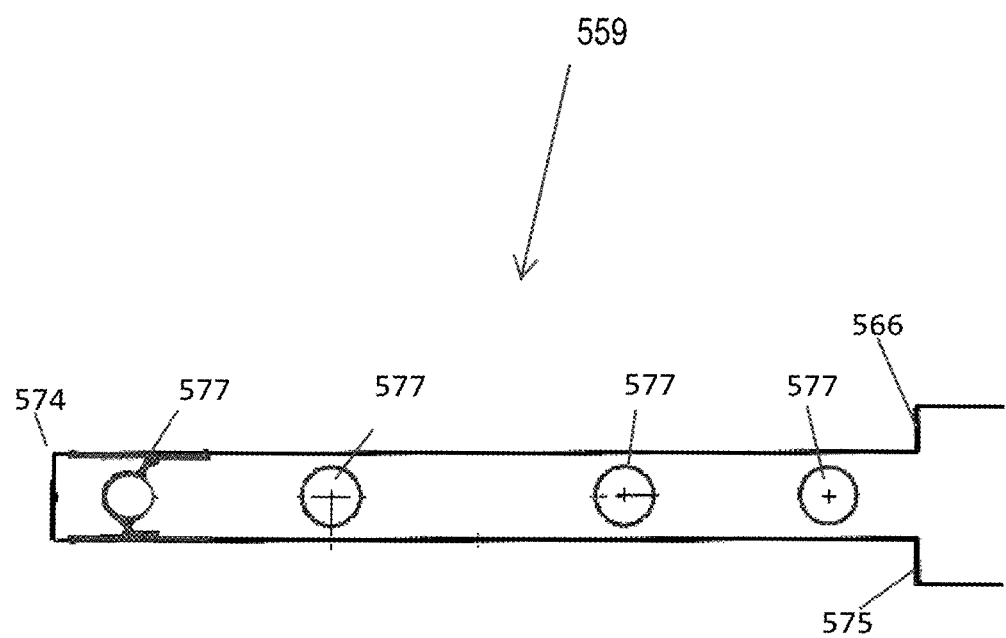
FIGS. 20C-20D are elevation views of contact patterns on the earpiece control foundation that form part of the man-machine interface (MMI) in an exemplary Lnzwear embodiment.
Figure 20D:
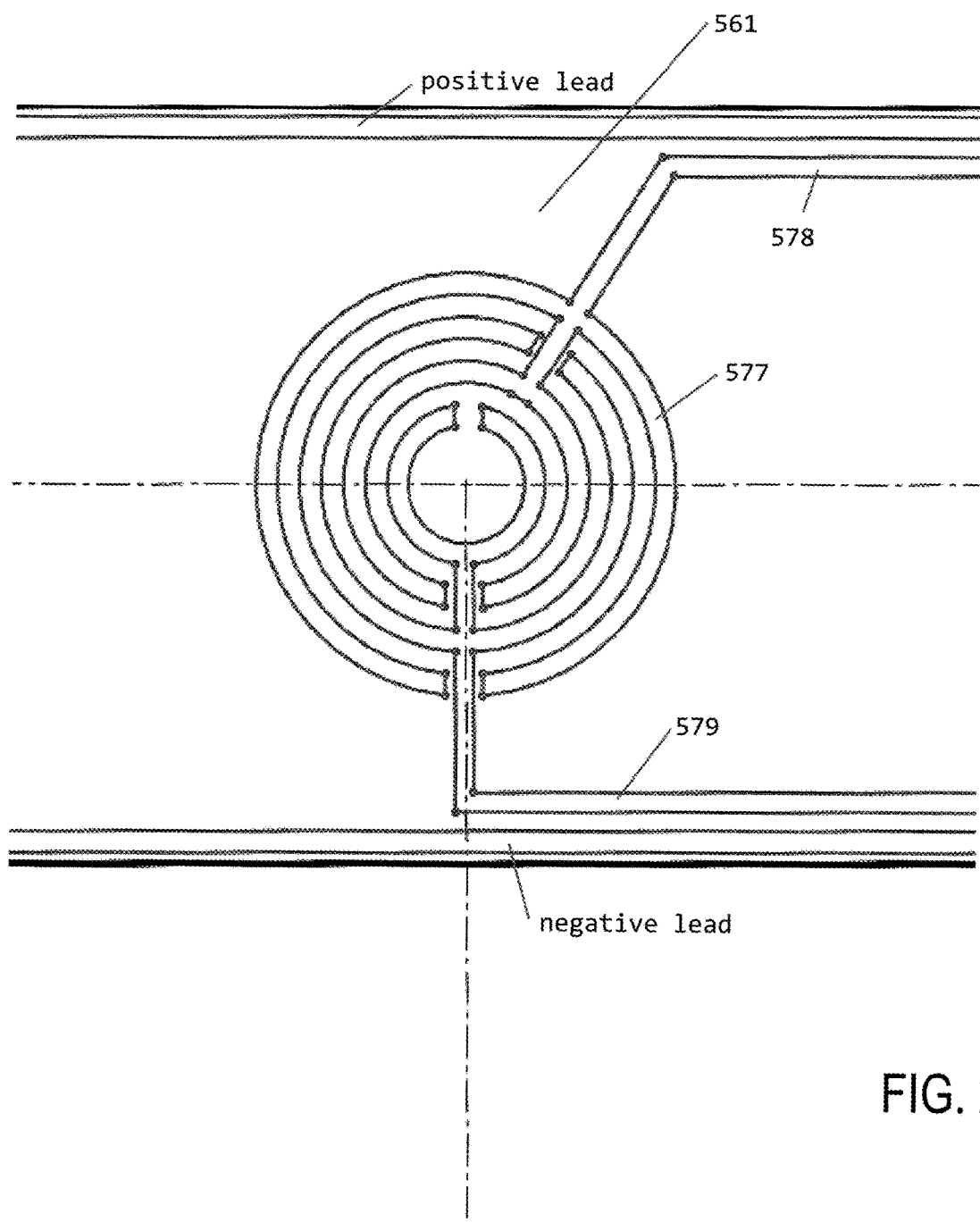

Referring first to FIGS. 20C-20D, there are depicted larger and detailed elevation views of a portion of the outer surface 561 of the earpiece control foundation 559. As shown in FIG. 20C, near forward end 574, outer surface 561 of earpiece control foundation 559 has a plurality of contact patterns 577 formed thereon corresponding to the locations of the keys 301 of MMI 300. FIG. 20D illustrates that contact patterns 577 can take the form of concentric interlaced conductive traces coupled to a switch lead 578 and a common lead 579. FIG. 20D further illustrates that positive and negative voltage conductors can also be formed on outer surface 561 in order to supply power to frame PCBs 160 via the hinges 242, 243.

Figure 20E:
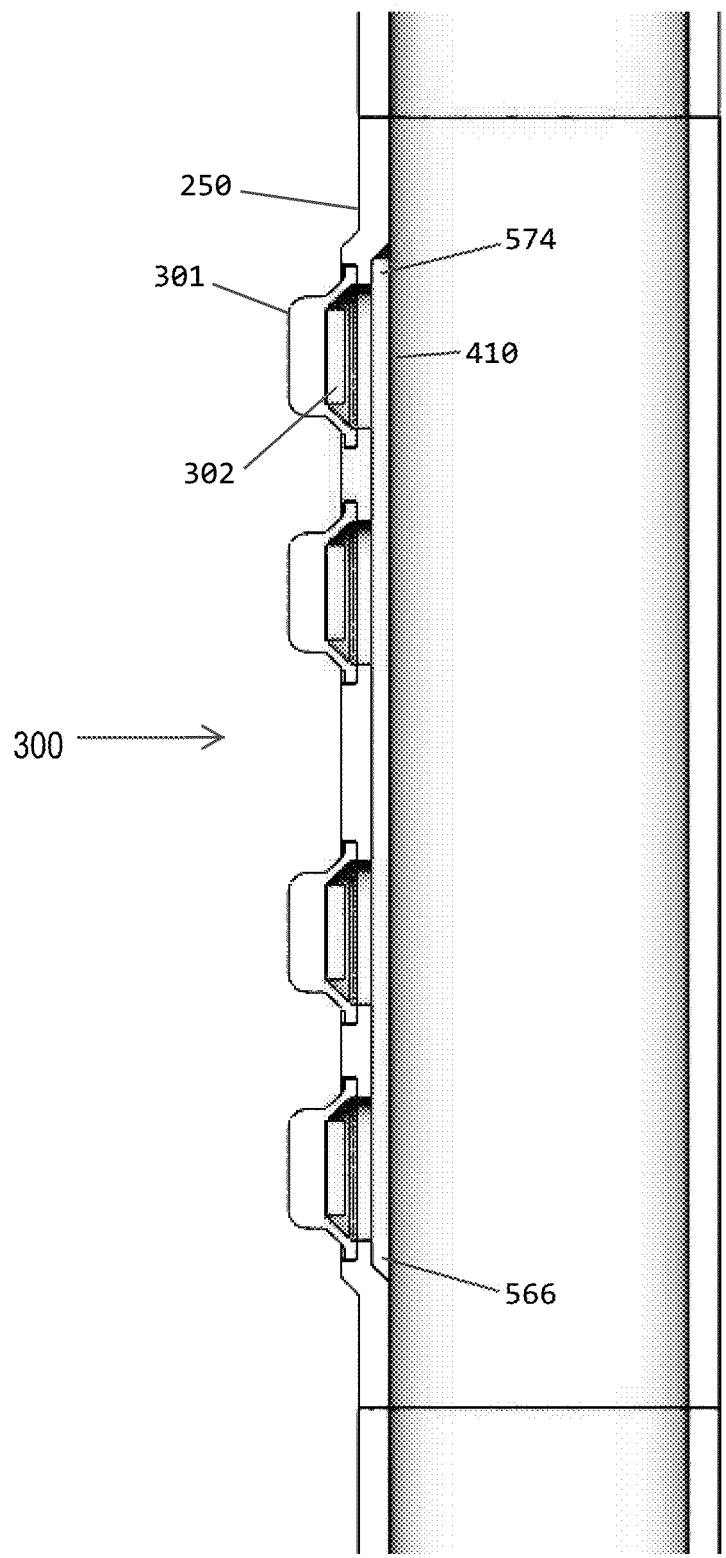
FIG. 20E is a section view of the MMI showing the keys and conductive contacts of the MMI in an exemplary Lnzwear embodiment.
Figure 20F:
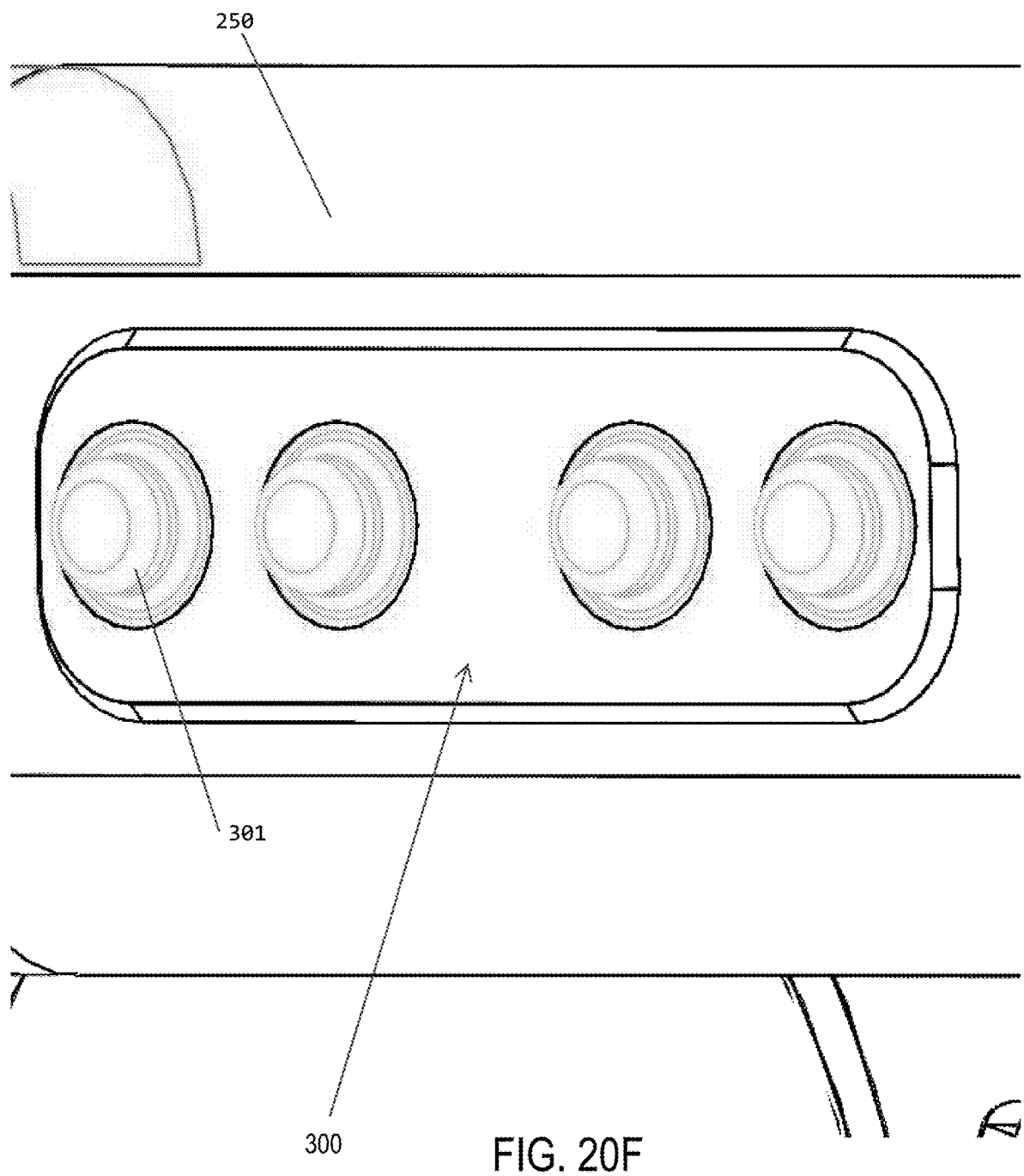
FIG. 20F is an isometric view of an MMI including a plurality of keys in an exemplary Lnzwear embodiment.

As best seen in the section view given in FIG. 20E, when the user presses on a key 301 of MMI 300 toward flex circuit 574, the walls of the key 301 collapse and produce a tactile event, and the associated contact 302 makes electrical contact with the conductive traces forming the contact pattern 577 on earpiece control foundation 559. When the key 301 is released, another tactile event occurs as the key 301 resumes its undeflected shape. Each key 301 of MMI keypads 300 can be assigned one or more input values by the earpiece controller 611, sufficient to input spherical and/or cylindrical lens correction values and to select a desired mode of operation. Modes of operation can include, for example, initialize, focus continually, fix focus at distance M, move one shaft encoder increment, move N shaft encoder increments, fill reservoir, fill pump and cells, purge reservoir, purge pump and spherical cell, purge cylindrical cell, fill cylinder cell, adjust cylinder cell, operate near side, operate far side, operate both sides, and index pump with controls, among others.

Figure 16A:
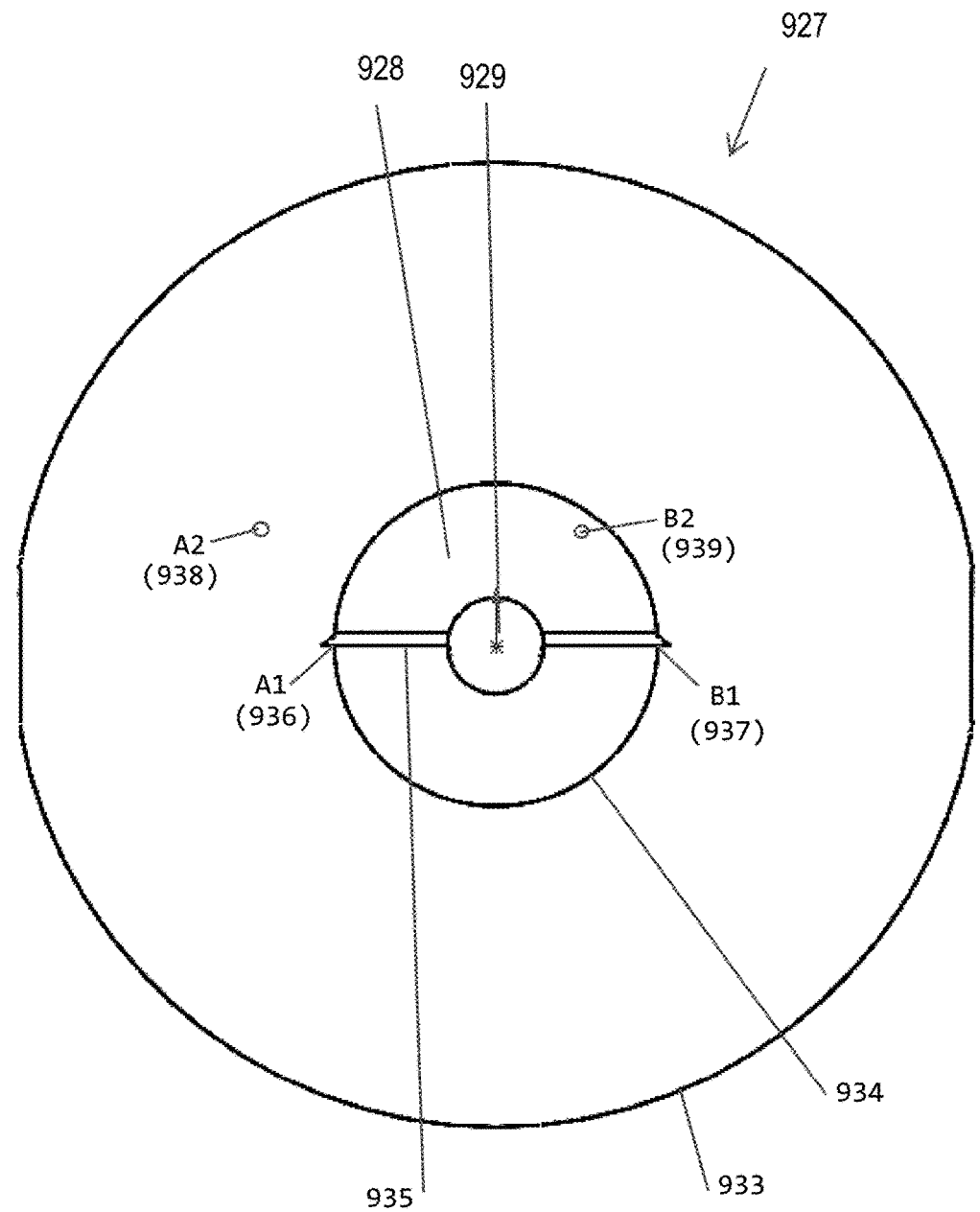
FIG. 16A is the front elevation view of a human eye illustrating the globe, iris, iris equator, and pupil.
Figure 16B:
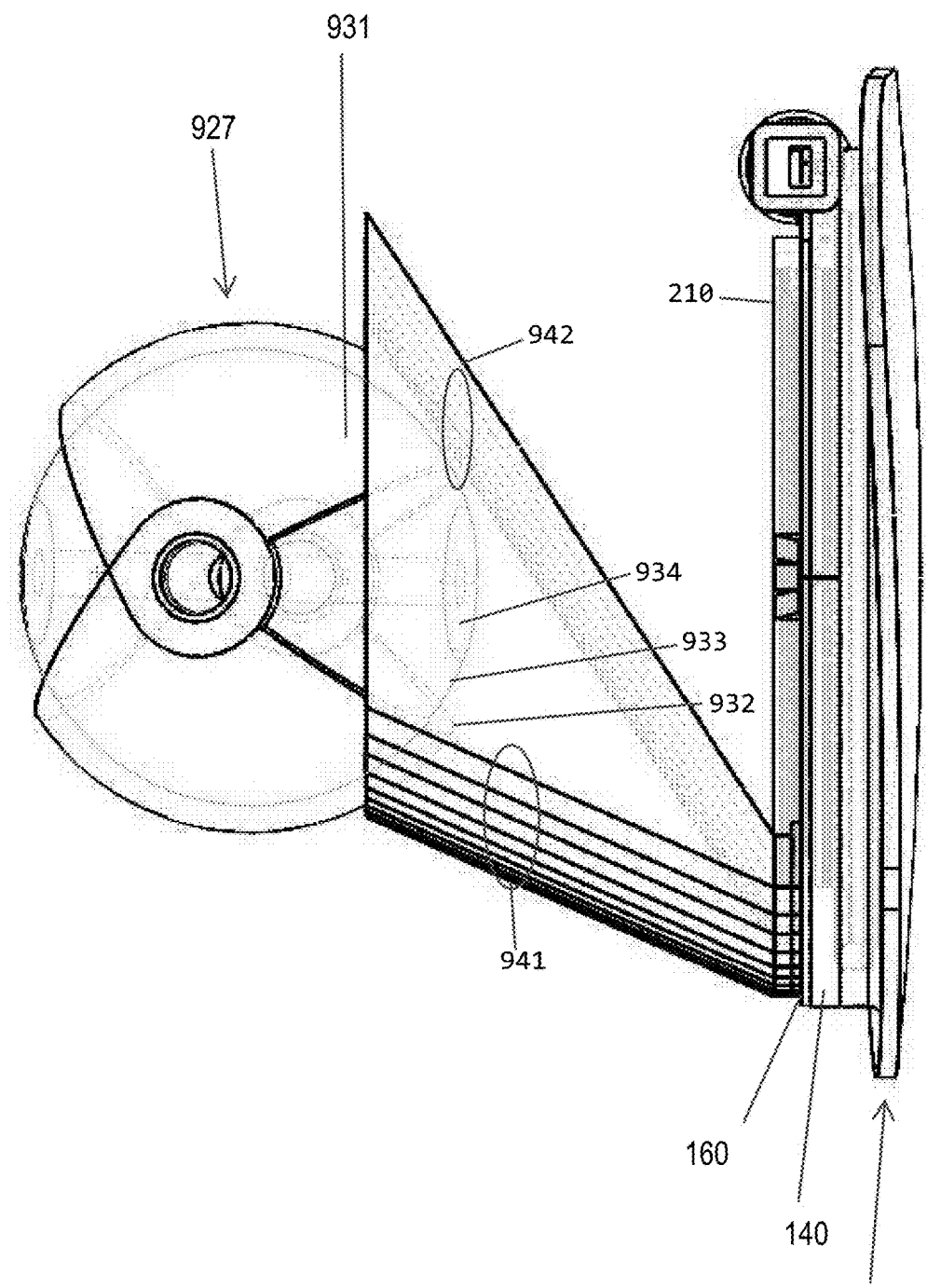
FIG. 16B is an elevation view of the human eye showing the lids, globe, and paths of light reflected from the eye to the silicon photodiode array of an exemplary Lnzwear embodiment.
Figure 16C:
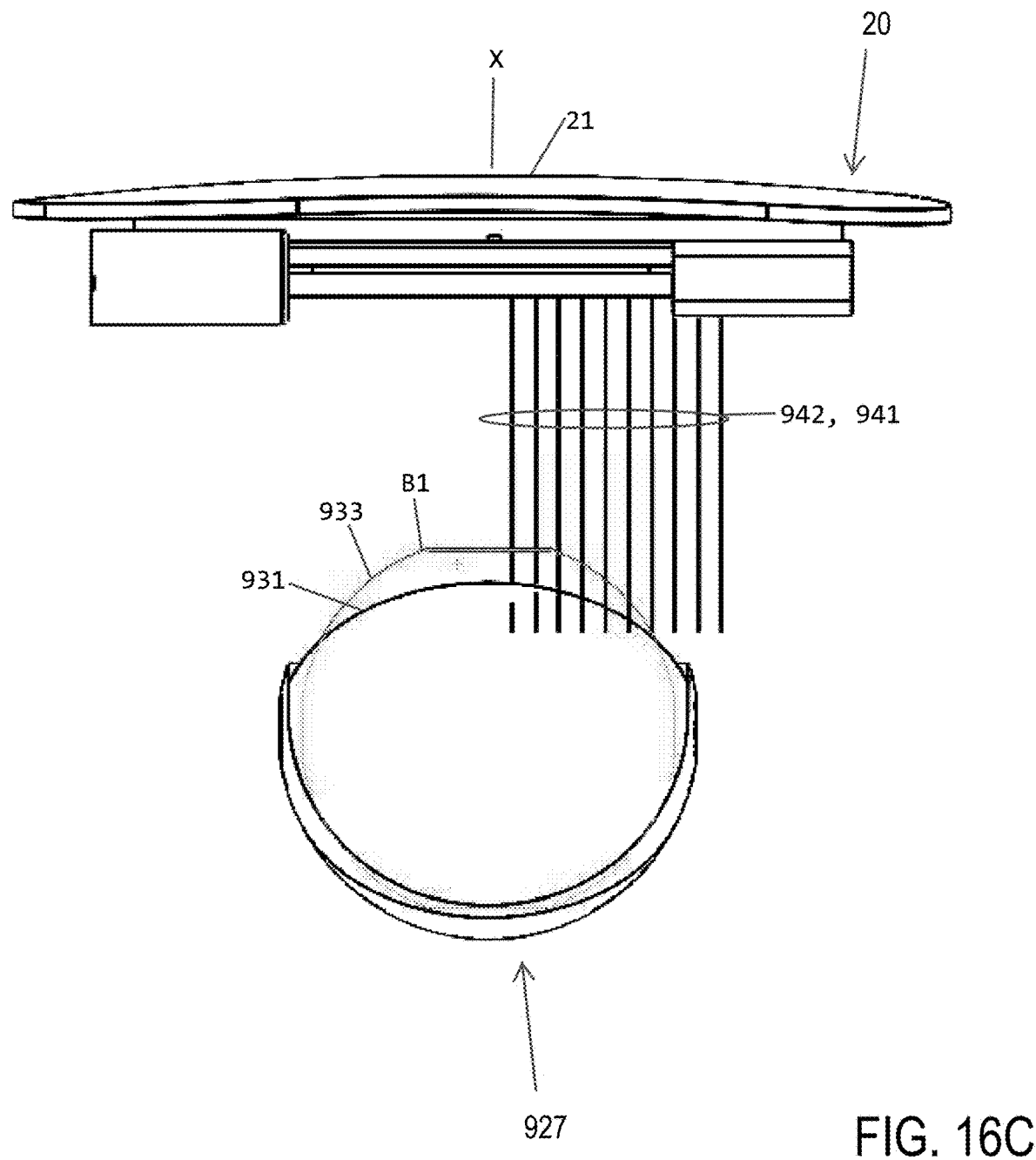
FIG. 16C is a plan view of the human eye showing the globe and lid and light rays reflected from half the eye to the silicon photodiode array of an exemplary Lnzwear embodiment.

With reference now to FIGS. 16A-16C, there are illustrated is a front elevation view, side elevation view, and top plan view of a human eye 927. Turning first to FIG. 16A, eye 927 includes globe 933, an iris 928 having an iris circumference 934 and an iris equator (diameter) 935, and a pupil 929 surrounded by iris 928. It should be appreciated that the line along iris equator 935 is not a visible feature of eye 927; instead, it is a construct whose endpoints are indicated by the boundary of the color of iris 928 and the white of globe 933, along a horizontal line thru the center of iris 928. By definition, when eye 927 is pointed straight ahead along the X axis, the ends of iris equator 935 are located at point A1 936 at the extremity of iris 936 on the nose side and point B1 937 at the extremity of iris 928 on the ear side. When the eye is pointed in any another direction, the endpoints of iris equator 935 are located at points termed A2 and B2 (e.g., A2 938 and B2 939). Since eye 927 does not rotate about the X axis, equator line 935 and its endpoints A1, B1 or A2, B2 will always be horizontal (parallel with the Y axis). The azimuthal angle defined by the relative locations of A1 and A2 or B1 and B2 defines the angular position of the eye 927 so useful in determining range. The real aspect of interest is not the points per se, but the movement in Y of A1 to A2 and B1 to B2.

FIG. 16B illustrates the geometric relationships in the XZ vertical plane between an upper eye lid 931 of eye 927, a lower eye lid 932 of eye 927, a set of upper reflected rays 942 reflected to transfer optics 180, and a set of lower reflected rays 941 reflected to transfer optics 180. In FIG. 16B, frame encapsulation 210 is shown covering all electronics and lamps 190 on frame PCB 160.

FIG. 16C shows upper and lower reflected rays 941, 942 for the right half of the left eye 927. Note that upper and lower reflected rays 941, 942 exceed in Y the zones of possible locations for points A2 and B2. Though the design of the earpieces are made to keep Lnzwear up on the nose, this additional design margin allow the line-of-sight detector system to obtain consistent data even though Lnzwear may be located lower, more forward, and rotated about the Y axis. The line-of-sight detector also obtains the highest control performance from the physical resolution of the sensor spacing.

Figure 21A:
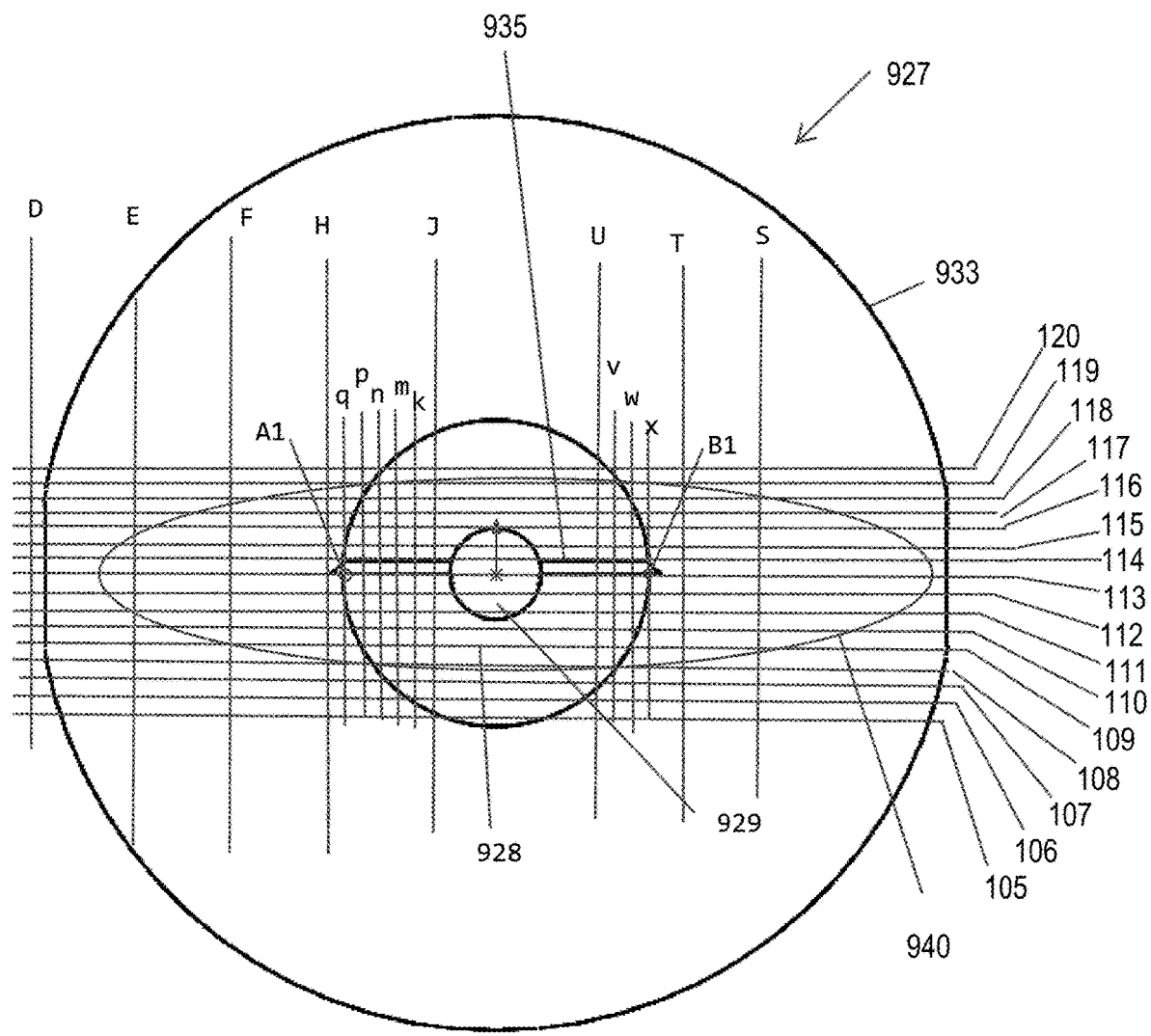
FIG. 21A is a front elevation of a human left eye showing detector columns as vertical lines and detector rows as horizontal lines.
Figure 21B:
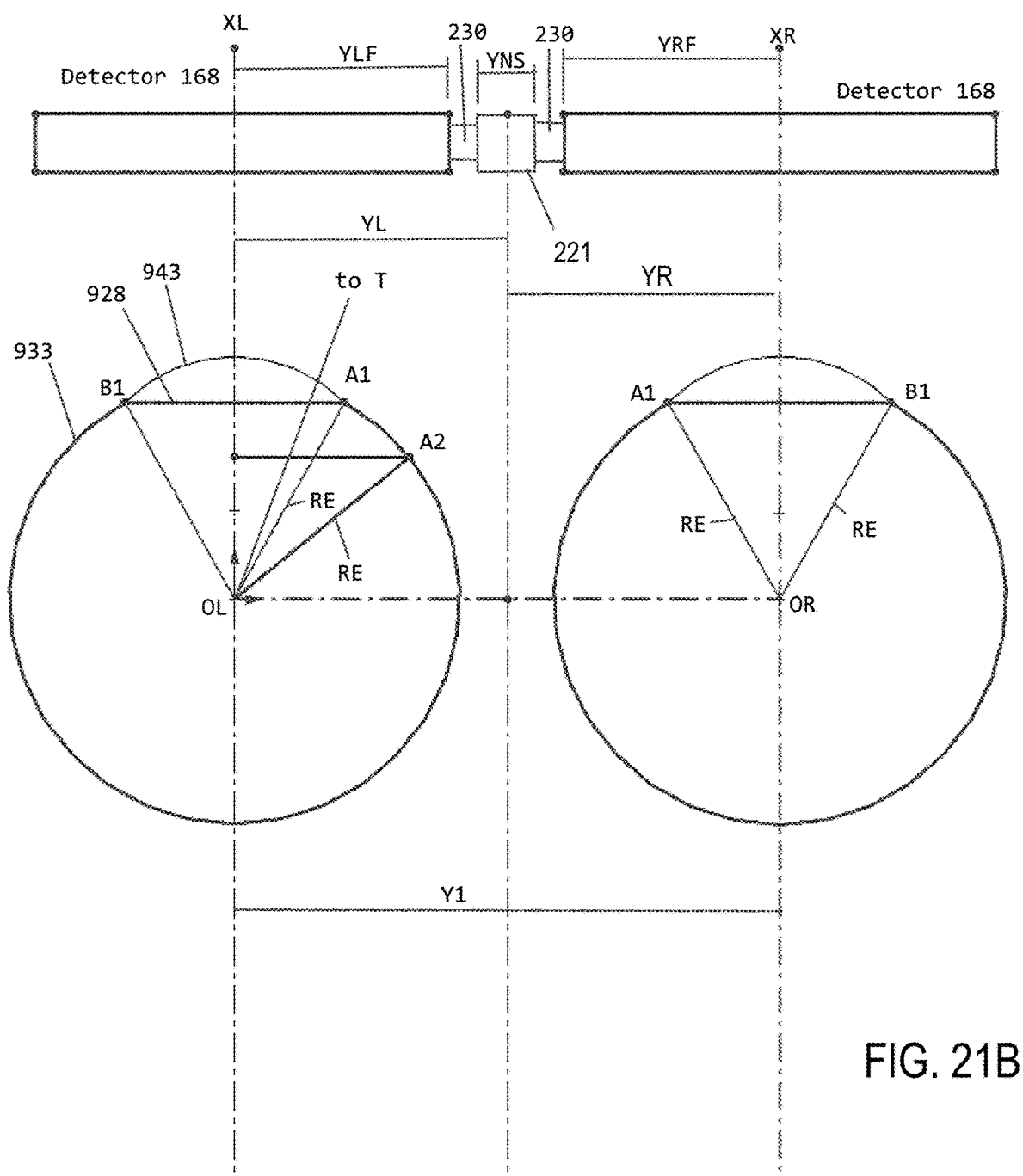
FIG. 21B is a plan view of a human user's eyes, illustrating relationships of the distances and angles involved in determining the line-of-sight of the eyes in an exemplary Lnzwear embodiment.
Figure 21C:
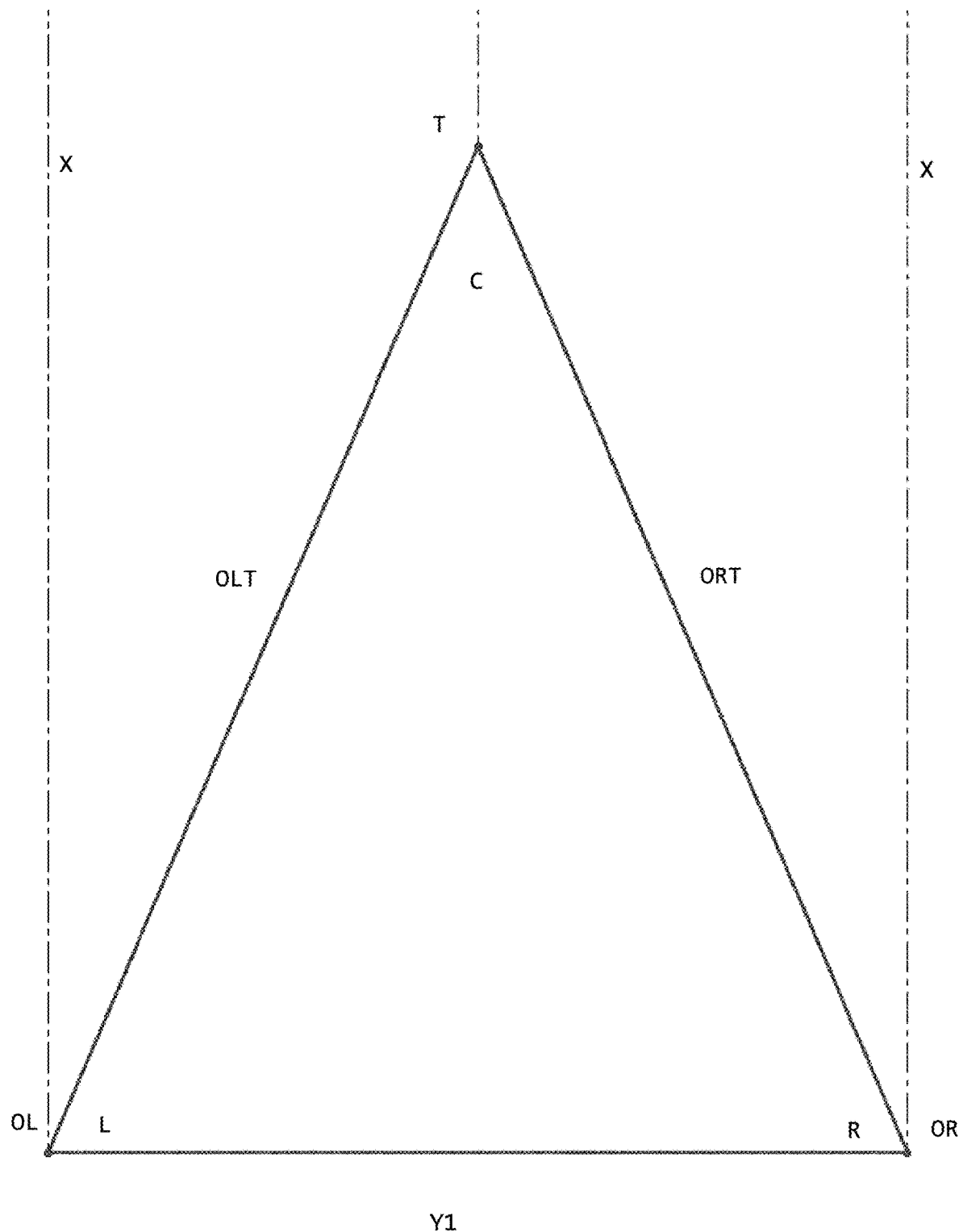
FIG. 21C is a plan view of the distances and angles involved in the determination of focal distances in an exemplary Lnzwear embodiment.

With reference now to FIGS. 21A-21C, the geometry employed to automatically determine the line-of-sight and focal distance of human eyes in one embodiment is now described. FIG. 21A is a front elevation view of a left eye 927 that illustrates the search for the position of the eye by the line-of-sight detector in some embodiments. In addition to the globe 933, iris 928, and pupil 929, FIG. 21A schematically represents the extent of eyelids 931, 932 by ellipse 940.

In FIG. 21A, a grid of vertical and horizontal lines overlays the illustration of eye 927, where the intersections in the grid are representative of sensor locations. The longer vertical lines, which are labeled left to right D, E, F, H, J, U, T and S, represent the central rays of adjacent SPDAs 170. Short vertical lines representing immediately adjacent columns of sensors within SPDAs 170 are also illustrated, where k is adjacent to J, m adjacent to k, n adjacent m, p adjacent n, q adjacent p, v adjacent U, w adjacent v, and x adjacent w. Long horizontal lines numbered 120 and downward to 105 represent the rows of the detector projected onto eye 927. In this example, the detector column planes are vertical in the XZ plane, and uniformly spaced along Y. The lowest angle row is horizontal (XY plane), and all light paths radiate from a working line anterior to the SPDA 170 as illustrated in FIG. 15. The spacings of the sensors in a row on the SPDAs 170 are preferably uniform in Y, and the spacings of the sensors in columns in the SPDAs 170 are preferably uniform in Z, but the vertical and horizontal spacings need not be equal. The rows are located between horizontal (zero degrees) and approximately 60 degrees above the horizon, but as discussed with respect to FIG. 15 those below about 30 degrees are generally not useful in this Lnzwear embodiment.

The light paths of the transfer optic 180 allow reflected light to be detected from near the eye and from the eye itself. The intensity of the reflected light arriving at SPDAs 170 is determined by the light gradient, surface curvature, color, and surface finish of the lids, globe, iris, and pupil. Herein the varying light intensities can be denoted as by "L" if reflected from the lids, "G" if reflected from the globe, "I" if reflected from the iris, and "P" if reflected from the pupil. Each ray will carry what is directed along its path to its individual SPDA 170.

Although sensors of SPDAs 170 can collect light from the entire area of the eye and its environs, typically only a small fraction of the total number of SPDAs 170 are utilized in a search for points A2 and B2, which represent the current locations of the endpoints of iris equator 935. It is possible for one or both of points A2 or B2 to be occluded by a lid 931 or 932 while eye 927 is still able to see, and therefore the search initially includes both points A2 and B2. As soon as either one of points A2 or B2 is located, the surface position determination can proceed utilizing only one point's data.

Simplistically, the search for points A2 and B2 begins in column D (near the nose) for A2 and proceeds from D to J using only the central columns from neighboring SPDAs 170. From column D outward there will be a general pattern starting at the upper ray 120 and proceeding downward of "LLL", that is, a light intensity having the signature of being received from lids 931, 932 alone. As the search proceeds from the nose to pupil 929, a pattern of LLLGGGLLL is detected, indicative of receiving reflected light from lids 931, 932 and globe 933 in columns E, F, and H. In column J, the general pattern of received light will be "LLLIIILLL", indicative of receiving light from the upper eyelid 931, iris 928, and lower eyelid 932. A multiplicity of detections from iris 928 (e.g., "III") indicates that the search row has proceeded toward the pupil beyond A2. At this point using adjacent columns of rays interrogating back toward H, one row at a time, one can expect a pattern of LLLGGGII-IGGGLLL until at column p a pattern will be LLLGGIIIG-GLLL, and finally at column q "LLLGGIGGLLL, where the single "I" indicates that the Y value of column q is the location for the Y value for point A2. (Note that it is possible to get a pattern of "LLLILLL" when lids 931, 932 are almost closed.) Searching for point B2 can follow the same process and can take place in tandem with the search for A2. In embodiments supporting automatic focus, the Y values of points A2 and B2 for both eyes are preferably transmitted to their respective control system (e.g., via RF or wired communication).

Assuming FIG. 21A illustrates the search at initialization (when points A2 and B2 are co-located with points A1 and B1, respectively), point A1 is identified at column q and row 113 and point B1 is identified at column x and row 113. In embodiments supporting automatic focus, the Y values of points A1 and B1 for both eyes are preferably transmitted to their respective control system (e.g., via RF or wired communication). A further refinement can be made by finding the median sensor of the sensors in a column that yielded the first LLLIIILLL light signature, where this sensor corresponds to the location of iris equator 935. If a LLLII-IGGGLLL pattern or LLLGGGIIILLL arises this refinement cannot be used, since a lid 931 or 932 has occluded iris 928, and the central I of the III pattern is not iris equator 935. If iris 928 is found to be not centered in Y and Z with respect to the detector system at initialization, the Lnzwear is preferably adjusted to move the detector system into better alignment with the user's eyes.

FIG. 21B is a symbolic plan view of eyes and detector systems 168 in the XY plane. In FIG. 21B, the cornea is indicated at reference numeral 943. In addition, Y1 designates the interocular distance (IOD) from the center of one eye to the center of the other eye, YLF and YRF are the respective distances from the nose end of the left and right detector systems 168 to the center of each detector system 168, and YNS is the length along the Y axis of nose slide 221 to its other end. All of these distances can be expressed as the closest whole number of millimeters of length. As discussed above, nose tube 230 is preferably engraved with small uniformly spaced lines, which can be conveniently evenly spaced by a whole numbers of millimeters. The visible engraved lines can be counted during initialization and input to the control system, for example, via MMI 300. Adding the input number of engraved lines to designed-in values allows the control system to calculate the distance Y1 from the center of the left frame to the center of the right frame, as well distances YL and YR from the midpoint of the interocular distance Y1 to the centers of the left and right eyes, respectively.

In at least one exemplary embodiment, the control system of the Lnzwear performs calculations expressed in pseudo-code as follows:

Calculate IOD: Y1=YLF+(number of engraved lines× distance between engraved lines)+YNS+YRF
Calculate: YL=YR=Y1/2
Assuming the diameter of the human eye to be 25 mm and the radius (RE) to be 12.5 mm, calculate the angle XL_OL (origin of left eye)_A1 (where A1 and A2 again represent the outer points of the iris equator):

$(YL-YA1)/RE = \text{Sin } XL\_OL\_A1$

Angle $XL\_OL\_A1 = \text{Arc Sin } (YL-YA1)/RE$

When the eye moves to point A2, use YA2 and calculate angle XL_OL_A2:

$(YL-YA2)/RE = \text{Sin } XL\_OL\_A2$

Angle $XL\_OL\_A2 = \text{Arc Sin } (YL-YA2)/RE$

Calculate the angle A1_OL_A2, the angle the eyes have moved from straight ahead, along X:

Angle $A1\_OL\_A2 = XL\_OL\_A2 - XL\_OL\_A1$

Determine the angular direction the eye has moved from line XL_OL (clockwise in the illustration provided in FIG. 21B):
For the left eye calculate the interior angle A as:

Angle $L = 90 \text{ degrees} \leq A1\_OL\_A2$

Repeat this process for the right eye and calculate the interior angle B. For this case, assume it is looking toward the left eye:

Angle $R = 90 \text{ degrees} + A1\_OR$ (origin right eye)_A2.

Given angles L and R and the inter-ocular distance Y1, point T, the point of intersection of the lines-of-sight (the point user is looking at), and the distances OLT and ORT from the centers of the left and rights eyes to the object of interest can automatically be determined by the control system, for example, using the Law of Sines. As depicted in FIG. 21C, using the Law of Sines, the distances from point OL to point T and OR to point T can be determined as follows:

Calculate the value of angle C (OL_T_OR):

Angle $C = 180 \text{ degrees} - L - R$

Calculate the distance OLT:

$OLT/\text{Sin } R = C/\text{Sin } C$ $OLT = (C*\text{Sin } R)/\text{Sin } C$

Calculate the distance ORT:

$ORT/\text{Sin } L = C/\text{Sin } C$ $ORT = (C*\text{Sin } L)/\text{Sin } C$

Based on the calculated distances OLT and ORT to the object of interest, the control system of Lnzwear can alter the focal lengths of the spherical fluid cells. To focus the left cell on T, the earpiece control considers the present position of the piston in terms of shaft encoder pulses from the index, determines how many motor encoder pulses lie between the index to the new distance, finds the difference, determines which direction the motor armature should rotate, and rotates the armature until the shaft encoder attached to the armature produces the concomitant number of pulses to cause the piston to reach the new position. As a result, the left spherical fluid cell is automatically focused on the object of interest in real time. A similar process can be concurrently performed to focus the right spherical fluid cell.

In at least some embodiments, the Lnzwear control system is capable of multiple modes of operation, which are selectable by the user, for example, using MMI 300 or voice commands. Modes can include but are not limited to: continuous focusing, fixed focus at a given distance, change distance by one or more increments, focus near for one eye and focus far for the other eye, focus according to the length of time of a continuous depression of a keypad, focus more near and/or more distant than calculated focus to act as a rehabilitative device for eye muscles, determine the instantaneous diameter of the pupil, announce the distance to the object, among others. Since the detector system cannot obtain guidance from the eye when the lids are closed, the data is predicated on light reflected when the eyes are open.

Data are preferably stored on the blinking rate and duration that is occurring, which can serve as a guide to the user that the adjustments are not serving well and notification that the user should see a medical professional. The control system allows mono-vision with either eye dominant and alterable to the other eye as needed, and by extension to a larger difference in distance, allowing a person to look at two objects in line, such as looking through rifle sights with one eye and at a target with the other.

Figure 22A:
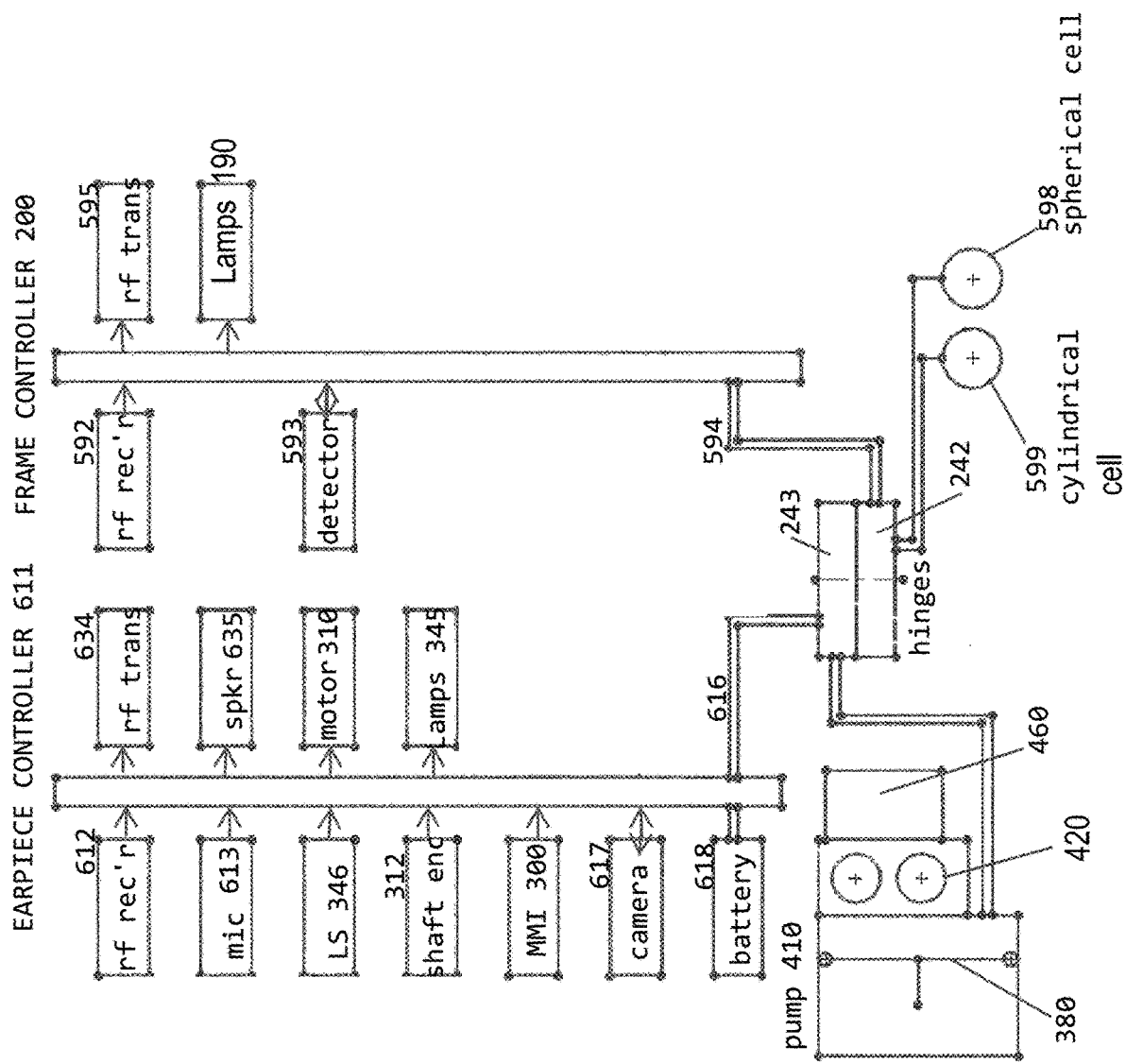
FIG. 22A is a schematic diagram of an exemplary Lnzwear Spherical Cylindrical Detector (SCD) embodiment.
Figure 22B:
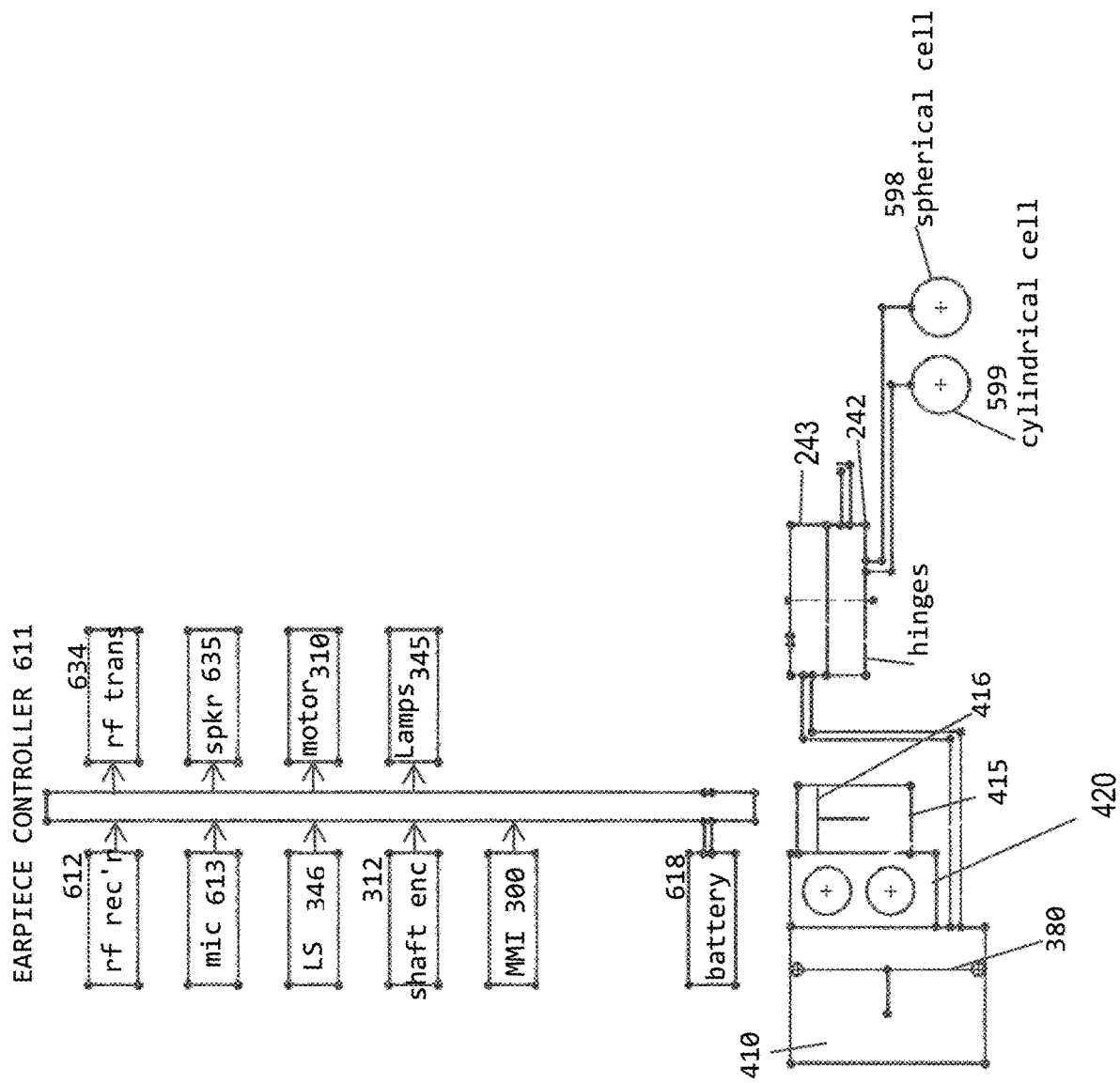
FIG. 22B is a schematic diagram of an exemplary Lnzwear Spherical Cylindrical Verbal 2 (SCV2) embodiment.
Figure 22C:
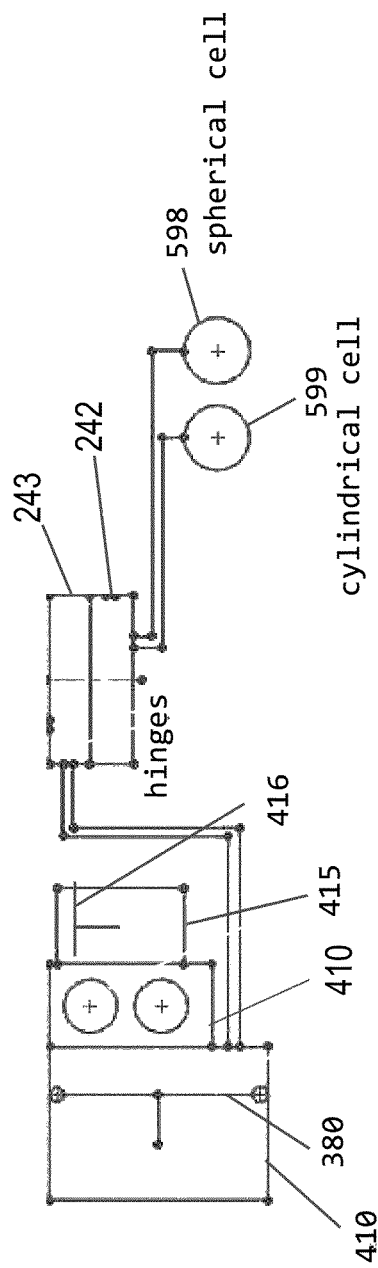
FIG. 22C is a schematic diagram of an exemplary Lnzwear Spherical Cylindrical Manual 2 (SCM2) embodiment.

Referring now to FIGS. 22A-22C, there are depicted schematic diagrams of the control system of one side (i.e., the left or right side) of three Lnzwear embodiments. It should be appreciated that these embodiments are merely exemplary and that numerous other embodiments are possible. In some embodiments, the control system includes components disposed on both of the frame PCB 160 and the earpiece control foundation 559. In other embodiments, the control system components can be disposed entirely in the earpieces 2 or on frame PCB 160. As described above, earpieces 2 and the optics sets are connected by hinges 242, 243 that permit passage of electrical conductors and fluid passages between earpieces 2 and the optics sets. In some embodiments, the control systems include electrical controllers, which may be implemented entirely in integrated circuitry or which may alternatively or additionally execute software and/or firmware to implement control functionality.

In the Lnzwear SCD embodiment shown in FIG. 22A, the control system for each side includes a earpiece controller 611 on earpiece control foundation 559 and a frame controller (e.g., microprocessor) 200 on frame PCB 160. Frame controller 200, which is powered by battery 618 via traces 616 and 594, is coupled to lamps 190 to selectively cause lamps 190 to illuminate the eye and its surrounding tissue with low power electromagnetic energy and is further coupled to detector system 593 to receive signals indicative of the reflected electromagnetic energy sensed by SPDAs 170. Frame controller 200 can further be coupled to an optional RF receiver 592 and optional RF receiver 595, which, if implemented, support wireless communication (e.g., 802.x, Bluetooth or 900 MHz) with frame controller 200 (and in some embodiments, with both frame controller 200 and earpiece controller 611).

Earpiece controller 611, which is also powered by battery 618, is coupled to receive inputs provided via MMI 300. In addition, earpiece controller 611 is coupled to receive inputs received from limit sensors 346 and to provide outputs causing the illumination of lamps 345. Based on inputs received from limit sensors 346, motor shaft encoder 312 and MMI 300, earpiece controller 611 provides outputs that control motor 310. As shown, earpiece controller 611 may be coupled to an optional RF receiver 612 and to an optional RC transmitter 634, which, if implemented, support wireless communication (e.g., 802.x, Bluetooth or 900 MHz) with earpiece controllers 611 (and in some embodiments, with both frame controllers 200 and earpiece controllers 611). Earpiece controller 611 may optionally be coupled to a microphone 613 and to a speaker 635 to support receipt of audio inputs and provision of audio outputs by earpiece controller 611. As further shown in FIG. 22A, earpiece controller 611 may optionally be equipped with one or more forward looking cameras 617, which can be utilized to supplement the range detection performed by detector system 593 if and when the range exceeds the capability of detector system 593.

Turning now to FIG. 22B, there is illustrated a schematic diagram of an exemplary Lnzwear spherical-cylindrical-verbal (SCV2) embodiment, referred to above as Embodiment Q. In this embodiment, reservoir 460 of the SCD embodiment shown in FIG. 22A is replaced by a manually driven pump 415 having a piston 416. This arrangement allows cylindrical cell 599 to be set independently from spherical cell 598. As shown, in this embodiment, the earpiece control system may include an RF receiver 612, RF transmitter 634, microphone 613, speaker 635, limit sensors 346, lamps 345, motor 310 and shaft encoder 312 as previously described. In this embodiment, no MMI 300 is required to be provided on the earpiece 2 (although it can optionally be included). Control can instead be performed by the user giving verbal commands, which are received by microphone 613 and recognized by earpiece controller 611 The command vocabulary can be very simple and limited. One advantage of this control modality is its ability to easily control spherical correction out to the limits of the spherical cell 598. In this embodiment, the astigmatic correction provided by cylindrical cell 599 is determined by a manual pump 415 having a piston 416 driven by a manually operated thumbwheel (rather than a motor). As a result, only the upper valve of valve body 410 need be implemented or utilized.

FIG. 22C illustrates a schematic diagram of an even more simplified Lnzwear spherical-cylindrical-manual (SCM2) embodiment, referred to above as Embodiment R. In this embodiment, no electronics or motors are included. Instead, both piston 380 of pump 410 and piston 416 of pump 415 are manually driven (e.g., by respective thumb wheels disposed on earpiece 2). In this embodiment, only the upper valve 450U is required, and spherical cell 598 and cylindrical cell 599 can be controlled utilizing these two pumps and one valve. One important aspect of this embodiment is the ability to reach heretofore unreachable populations around the world with a counter to astigmatism and the ability to focus at a wide range of distances. While this embodiment does not operate in a dynamic manner, its manually adjustable focus is sufficient to enable large segments of the world's population that are precluded from working due to vision impairment to resume working.

Figure 23A:
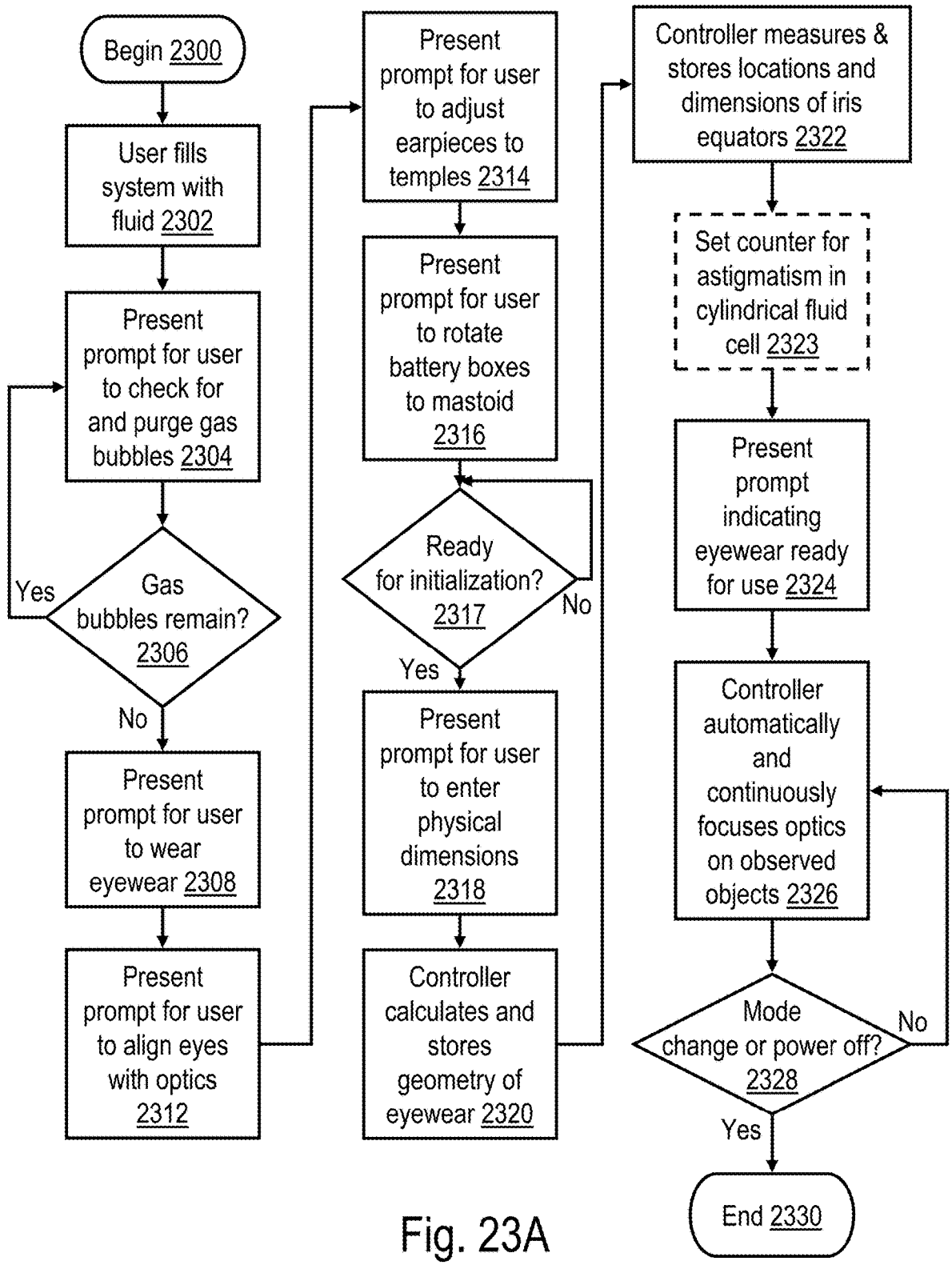
FIGS. 23A-23B are high level flowchart of the operation of an exemplary Lnzwear Spherical Cylindrical Detector (SCD) embodiment.
Figure 23B:
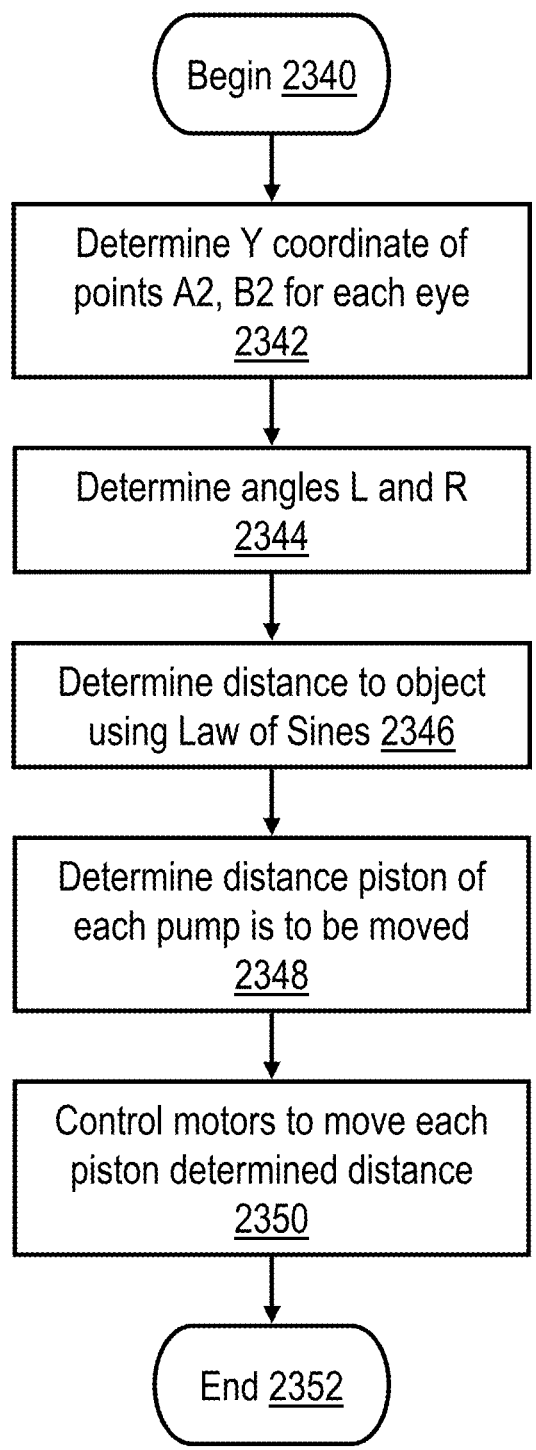

FIGS. 23A-23B are high level logical flowcharts of the operation of an exemplary Lnzwear SCD embodiment. The process shown in FIG. 23A begins at block 2200 and then proceeds to block 2202, which illustrates that, prior to using Lnzwear, its hydraulic system should be filled with fluid 570 and purged of gases as previously described with reference to FIGS. 18A-18C. Purging of gases and alignment of threaded piston rod 370 with limit sensors 346 allows piston 380 to establish a monotonic relationship with the focal distance of the spherical fluid cell. As indicated at blocks 2204-2206, earpiece controller 611 may optionally present a prompt for the user to visually check whether gas bubbles are observed through transparent valve body 420 and provide an input (e.g., via MMI 300) indicating whether gas bubbles have been successfully purged.

In response to an input indicating gas bubbles have been purged from the hydraulic system, the earpiece controller 611 commands the user (e.g., via one or more speakers 635) to wear the Lnzwear eyewear (block 2308). As shown at blocks 2312-2316, the user then preferably customizes fit of the Lnzwear to fit his or her face. In some embodiments, like that shown, the adjustment of the Lnzwear can optionally be guided by prompts presented by earpiece controller 611 via speakers 635. As depicted at block 2312, the user can adjust the placement of the optics to match the locations of the user's eyes, for example, by adjusting nose pads 224, nose slide 221, and/or the relationship between frames 140 and nose tube 230. Block 2314 additionally illustrates that the fit of Lnzwear can be customized by adjusting the tilt of frames 140 by rotating earpieces 2 with respect to frames 140 about the Y axis so frames 140 lie roughly parallel to the cheeks and forehead and earpieces 2 lie along the temple but above the ears. Earpieces 2 can also be rotated about the X axis and secured so they remain parallel to the temple. As further illustrated at block 2316, the user secures Lnzwear to the head so that the nose rest is held on the slope of the nose by rotating battery boxes 290 against the mastoid area of the skull and detenting them in place. Once the fit of Lnzwear is appropriately customized, the user provides an input (e.g., via MMI 300) indicating that Lnzwear is ready for initialization.

The initialization process is depicted at blocks 2320-2324. At block 2320, earpiece controller 611 prompts the user to enter, and the user enters (e.g., via MMI 300), the dimension of nose tube 230 as expressed, for example, in the number of engraved lines visible on nose tube 230 following any adjustment made at block 2312. As explained above, the number of engraved lines observed on nose tube 230 plus the manufactured widths in Y of frame edge-to-center-of-frame establishes the inter-ocular distance Y1. With the user wearing Lnzwear and staring straight ahead (i.e., along the X axis), frame controllers 200 measure and record the locations of points A1 to B1 and the length of iris equator 928 of each eye (block 2322). Knowing the length of iris equator 928 allows the determination in Y of any other position of the iris to be calculated. If needed, the user may also establish a counter to astigmatism in either or both eyes, as described above (block 2323). At the conclusion of the initialization process, the earpiece controller 611 may optionally present an audio prompt indicating the Lnzwear is ready for use (block 2324).

Thereafter, during the regular continuous focus mode of operation of Lnzwear, the control systems (e.g., frame controllers 200 and/or earpiece controllers 611) cooperate to automatically and continuously focus the spherical optics of the Lnzwear in real time on objects observed by the user (block 2326). As indicated at block 2328 and 2330, this continuous focus mode of operation continues until the user changes the mode of operation (e.g., using a command input via microphone 613 or MMI 300) or the Lnzwear is powered off.

Referring now to FIG. 23B, the continuous focus mode of operation shown in block 2326 of FIG. 23A is depicted in greater detail. The process of FIG. 23B begins at block 2340 and then proceeds to block 2342, which illustrates frame controllers 200 determining the Y coordinates of points A2, B2 for each eye while the user is observing an object of interest (block 2342). At blocks 2344-2346, frame controllers 200 determine the angles L and R at which the eyes are directed (i.e., the lines-of-sight) and applies the Law of Sines to determine the distance to the object. Based on this distance, which can be reported by frame controllers 200 to the associated earpiece controllers 611, earpiece controllers 611 then determine the required direction and distance each piston 380 is to be moved to change focus from the present focal distance to the appropriate focal distance to the object of interest (block 2348). Earpiece controller 611 then control motors 310 to move each piston and appropriate distance and direction to achieve focus on the object of interest (block 2350). The process thereafter ends at block 2352 until an new object of interest is established.

Figure 24:
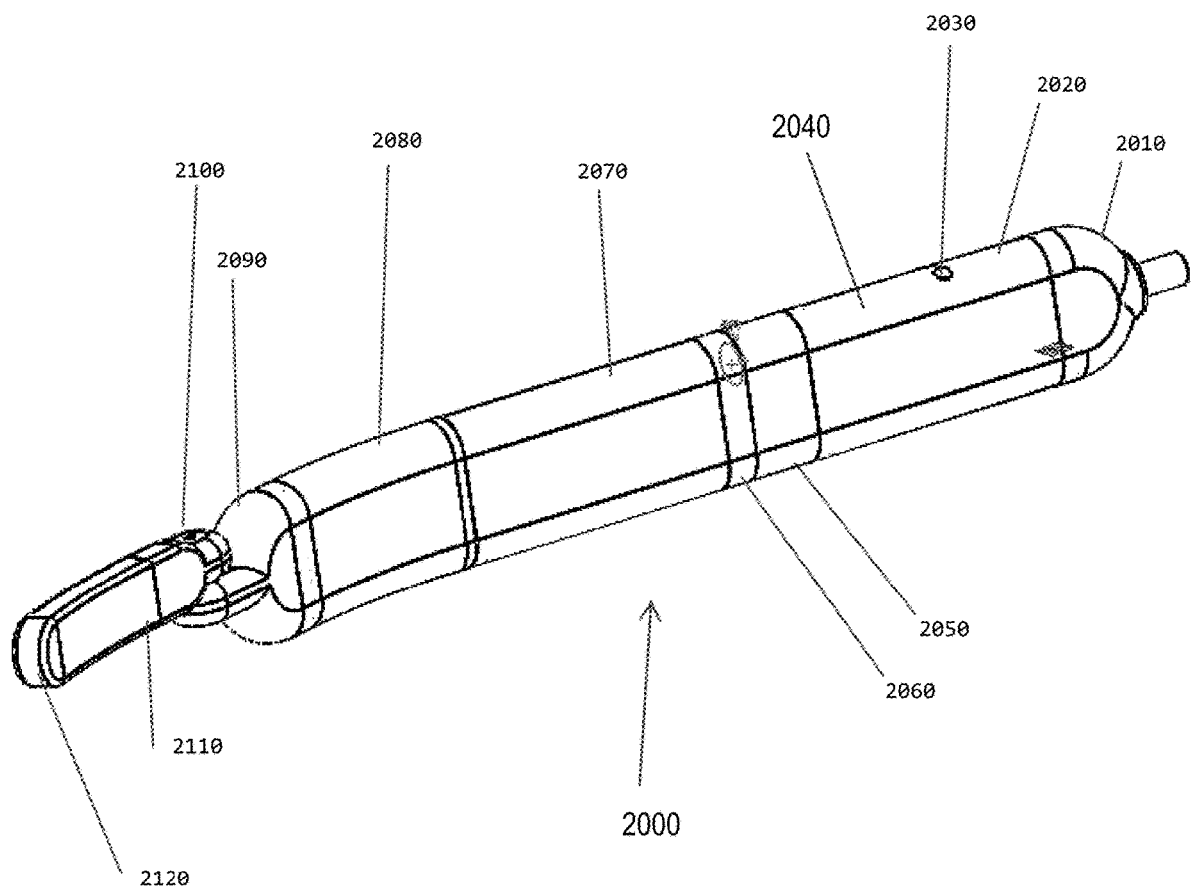
FIG. 24 is an isometric view an exemplary earpiece formed of sub-assemblies in accordance with one embodiment.
Figure 25:
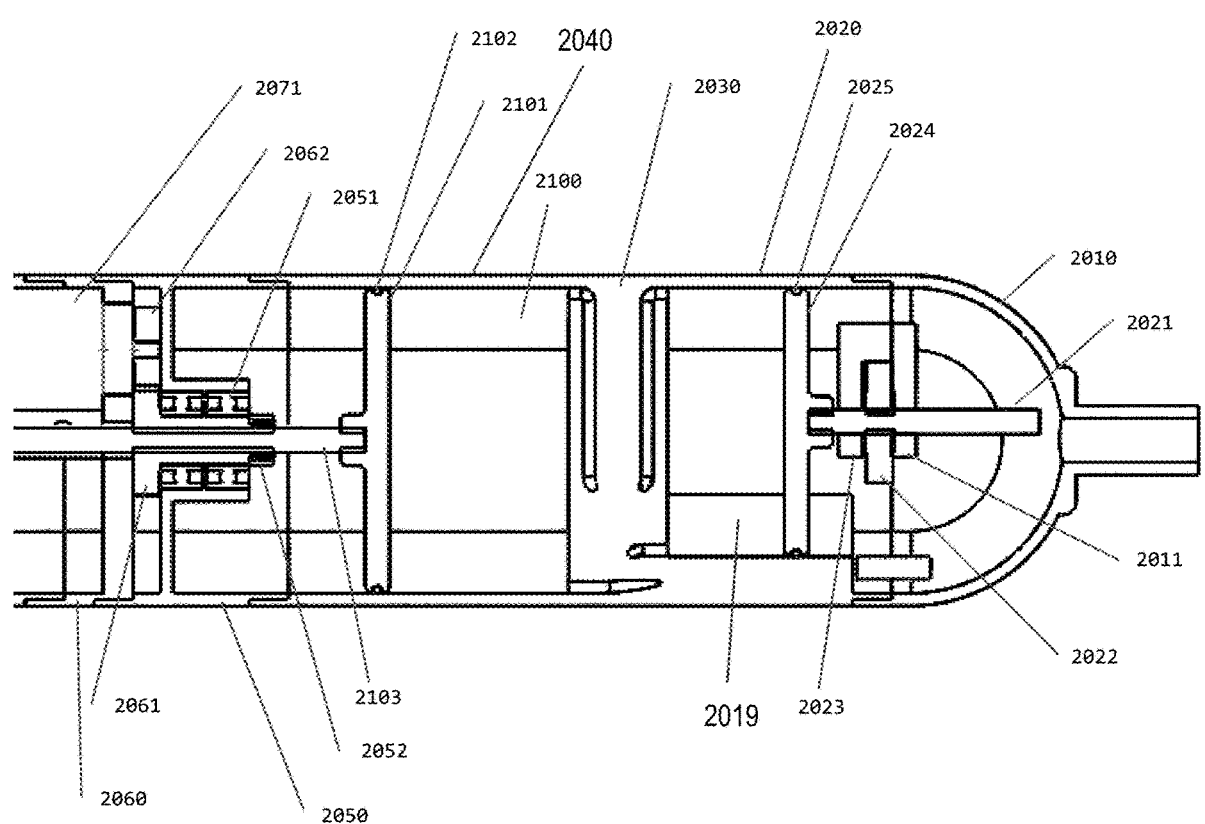
FIG. 25 is an detailed section view of a portion of the earpiece of FIG. 24.

Referring now to FIGS. 24-25, isometric and section views of an alternative embodiment of an earpiece for use in Lnzwear are depicted. In contrast to previously described embodiments in which the earpieces are unitary housings for control and drive components, in the depicted embodiment each earpiece is formed of a series of individual components (including control and/or drive components) that are assembled (e.g., via snap fit or sonic welding) to form the earpieces. For example, these earpieces can be constructed from appropriate components for use in SCD, SCV or SCM (Spherical-Cylindrical-Manual) embodiments. As described above, the SCV embodiment is capable of independently changing via voice commands (or optionally, a MMI 300): 1) focal distance by electric motor drive and hydraulic pressure, 2) astigmatic power by manual drive and hydraulic pressure, and 3) astigmatic angle by manual rotation of the cylindrical housing. The SCM embodiment is similar, but substitutes a second manually driven pump in place of the electric motor driven pump employed in the SCV embodiment.

FIG. 24 is an isometric view illustrating the external surfaces of the functional components of an earpiece 2000 and the order in which they are assembled. In a preferred embodiment, the external surfaces are integrally attached to (i.e., unitary with) the internal functional components. In this example, the components include in order from anterior to posterior: earpiece forward 2010, pump body including a cylindrical cell pump 2020, valve 2030, and spherical cell pump 2040, bulkheads 2050 and 2060, earpiece control 2070, curved section 2080, earpiece transition 2090, battery box hinge 2100, battery box 2110, and battery box cap 2120. These components preferably include corresponding surfaces which are interlocked at assembly.

FIG. 25 is a detailed section view depicting a portion of the components of earpiece 2000. As shown, the pump body includes two pumps: a spherical cell pump and a manually-driven cylindrical cell pump. In the depicted SCV embodiment, the spherical cell pump is driven by an electric motor; in an alternative SCM embodiment, both the spherical cell pump and cylindrical cell pump are manually controlled.

In the depicted embodiment, cylindrical cell pump 2020 includes a cylinder 2019 housing a piston 2024 sealed against the interior wall of cylinder by piston seal 2025. Piston 2024 has an attached screw 2021, which in turn has a nut 2022 that engages a manual thumbwheel (not shown) coupled thereto. As nut 2022 is rotated by the manual thumbwheel, screw 2021, which is supported by thrust bushings 2011 and 2023, travels backward and forward within earpiece forward 2010 to supply fluid 570 from cylinder 2019 to the cylindrical fluid cell 599 or to withdraw fluid 570 from cylindrical fluid cell 599 via valve 2030.

FIG. 25 further illustrates spherical cell pump 2040. In the depicted embodiment, spherical cell pump 2040 has an associated electric motor 2071. Motor 2071 has a motor shaft on which a pinion 2062 is mounted. Pinion 2062 mates with gear nut 2061, which is rotatable in bearings 2051 mounted in bulkhead 2050 and retained there by bearing keeper 2052. Gear nut 2061 has a threaded central bore that engages threaded piston screw 2103. With this arrangement, a piston 2101, which is attached to piston screw 2103 and sealed against the interior of cylinder 2100 by a seal 2102, can be driven forward and backward in the interior of cylinder 2100. The location of piston 2101 can be determined from a motor encoder, and range of motion of piston 2101 can be limited utilizing limit sensors as previously described.

Figure 26:
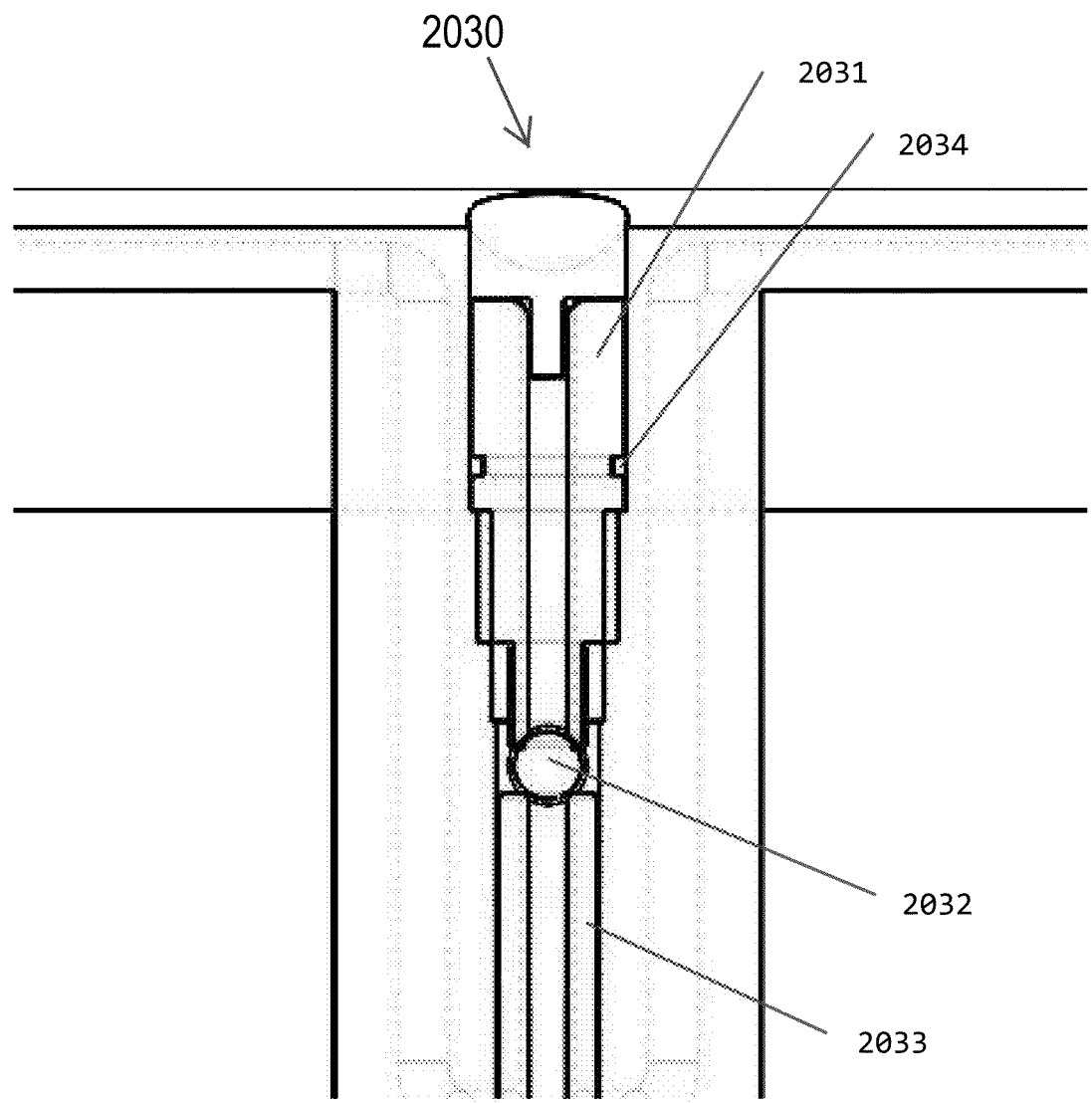
FIG. 26 is a section view of an exemplary valve.

FIG. 26 is a section view of an exemplary embodiment of valve 2030 of earpiece 2000. Valve includes a valve stem 2031 sealed against an interior wall of earpiece 2000 by a valve seal 2034. Valve stem 2031 has a central bore sealed by a ball 2032 that is biased to a closed position by a valve spring 2033.

Figure 27:
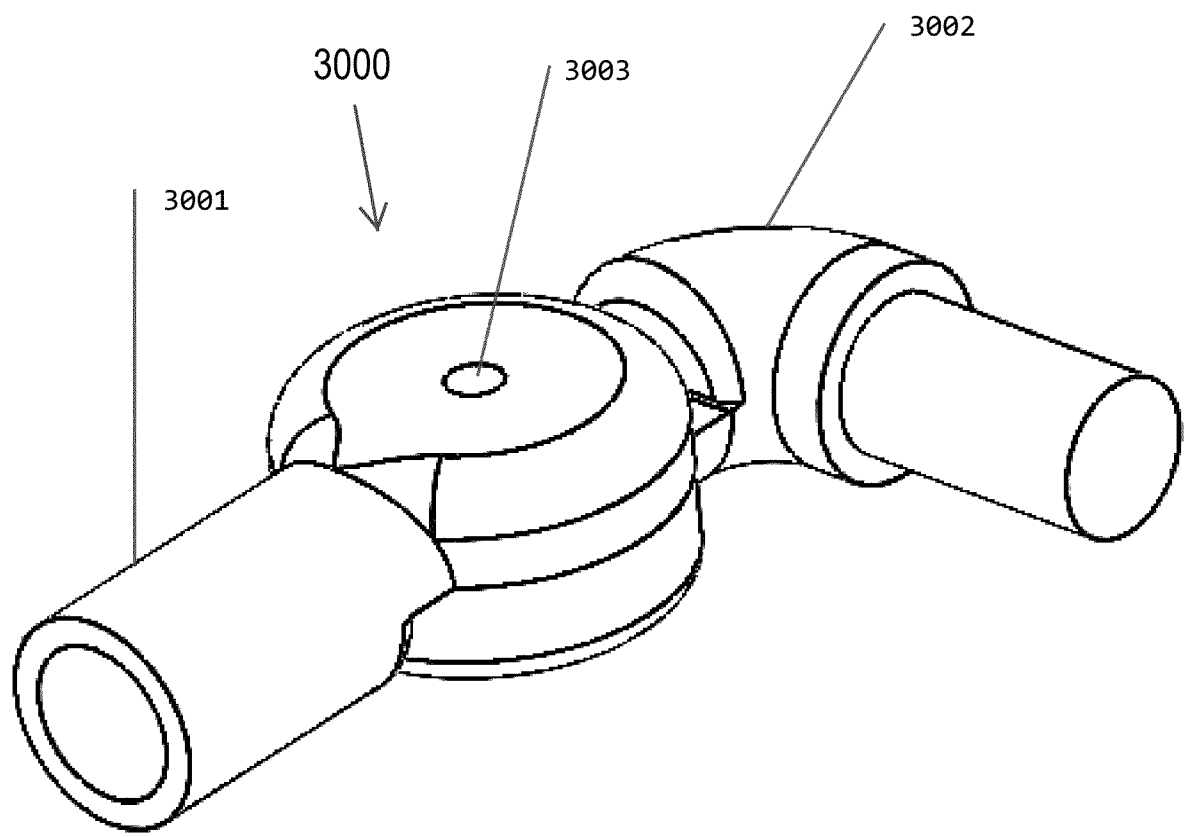
FIG. 27 is an isometric view an exemplary embodiment of a hinge assembly including a stationary hinge and a rotating hinge.

FIG. 27 is an isometric view of an exemplary hinge assembly 3000 suitable for coupling the earpieces and optics in various Lnzwear embodiments. Hinge assembly 3000 includes an interior passage that permits fluid flow (and in some embodiments, electrical signal communication), while still allowing the earpieces to be folded for storage. In this example, hinge assembly 3000 includes a rotating hinge 3001, a stationary hinge 3002, and a central retainer 3003 that couples rotating hinge 3001 and stationary hinge 3002.

The present application discloses a number of optical assemblies and improvements thereto. The optical assemblies can include fluid optical cells that counter refractive and/or astigmatic errors. In some embodiments, the optical assemblies can also include one or more other prescription or bias lenses in combination with one or more fluid cells. In one set of eyewear embodiments referred to herein as Lnzwear, fluid optical cells can be mounted on a frame, and the spherical and/or cylindrical power of the fluid optical cells can be varied in real time. In at least some embodiments, the spherical and/or cylindrical power of the optics set of each eye can be varied independently. In various embodiments, the spherical and/or cylindrical power can be controlled automatically by a controller (e.g., within the eyewear) and/or manually by the user. In various embodiments, the user can direct operation of the controller via spoken commands, manually keyed inputs, and/or eye movement. In one embodiment, Lnzwear automatically maintains continuous focus for each eye on an object of interest in real time by detecting a line-of-sight to the object of interest, determining a distance to the object of interest, and adjusting the optics set for each eye accordingly. The optical assemblies disclosed herein can additionally provide in various embodiments: comfort through the full height and width of the field of view without lines or unproductive zones, more precise offset of refractive errors due to the analog nature of the fluid cells, digital control, a built-in phoropter, variable focus over a greater dynamic range, the ability of a user to maintain focus on moving objects and for a greater amount of time. The optical assemblies disclosed herein can be mass produced, thus obviating the processes of professional fitting by medical personnel and requiring less inventory in the supply chain at all locations and levels of supply. The optical assemblies disclosed herein can address presbyopia, astigmatism, hyperopia, myopia, and monovision, either eye dominant, without re-manufacturing. The optical assemblies disclosed herein are useful in eye muscle rehabilitation and other special circumstances where it would be desirable to offer different optical performance to the left and right eyes.

In the present application, the terms "spherical" and "cylindrical" have been used in their ophthalmic senses to describe known types of lenses. It should be appreciated that these terms as used in this sense do not require geometrically perfect spherical or cylindrical surfaces. It should also be emphasized that although various embodiments have been described that employ fluid cells lenses in eyewear, that the appended claims, unless specifically limited to eyewear embodiments, are applicable to wide variety of optical assemblies as noted herein.

While various embodiments have been particularly shown and described, it will be understood by those skilled in the art that various changes in form and detail may be made therein without departing from the spirit and scope of the appended claims and these alternate implementations all fall within the scope of the appended claims. For example, although some aspects have been described with respect to a controller executing program code that directs the functions of the present invention, it should be understood that present invention may alternatively be implemented as a program product including a storage device storing program code that can be processed by a controller to perform the described functions. The storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

What is claimed is:

1. An optical assembly, comprising:
   an optical cell including:
      a base optic including a wall defining a periphery of the optical cell;
      a flexible plate having a peripheral edge disposed within and adjacent the wall;
      a ring coupled to the base optic, the ring including a shoulder projecting toward the base optic; and
      a single circumferential wall plate seal in contact with the wall, the flexible plate, and the shoulder of the ring, wherein the circumferential wall plate seal is retained in contact with the wall by the shoulder such that the circumferential wall plate seal provides a fluid-tight seal for the optical cell along that seals the peripheral edge of the flexible plate; and
   wherein the base optic includes a fluid passageway formed therein communicating with a volume between the flexible plate and the base optic, such that an optical focal length of the optical cell can be changed by introducing fluid into the volume under sufficient hydraulic pressure to deform the flexible plate to shape the fluid into a substantially spherical lens.

2. The optical assembly of claim 1, wherein the base optic has a concave surface adjacent the flexible plate.

3. The optical assembly of claim 1, and further comprising a lens disposed within the ring, wherein the lens disposed within the ring provides at least one of a set including spherical correction and cylindrical correction.

4. The optical assembly of claim 1, wherein the base optic includes a torus that contacts the peripheral edge of the flexible plate.

5. The optical assembly of claim 1, wherein the optical cell produces an ophthalmic image free from any aberration detectable by unaided human vision.

6. The optical assembly of claim 1, wherein the optical cell is a null optic when the flexible plate is not deformed by hydraulic pressure.

7. The optical assembly of claim 1, wherein the circumferential wall plate seal is constrained such that the optical cell has a monotonic relationship between fluid volume within the volume and deflection of the flexible plate.

8. The optical assembly of claim 1, wherein:
   the optical cell comprises a first optical cell; and
   the optical assembly comprises eyewear and further includes:
      a second optical cell; and
      a frame coupled to the first and second optical cells, wherein the frame is configured to hold the first and second optical cells in side-by-side relation.

9. The optical assembly of claim 8, wherein the frame is reconfigurable such that a spacing of the first and second optical cells can be user selected.

10. The optical assembly of claim 1, wherein:
the optical cell comprises a first optical cell, the flexible plate is a flexible first plate, the circumferential wall plate seal is a first circumferential wall plate seal, the volume is first volume, and the wall is a first wall; and
the apparatus further comprises a second optical cell including:
 a housing having a second wall,
 a flexible second plate having an peripheral edge disposed within and adjacent the second wall;
 a second circumferential wall plate seal that seals the peripheral edge of the flexible second plate against the second wall; and
 a set of pivots disposed at the peripheral edge of the flexible second plate that restrains a central portion of the flexible second plate and that allows non-central peripheral portions of the flexible second plate to deflect about the set of pivots;
 wherein the housing includes a fluid passageway formed therein communicating with a second volume between the flexible second plate and the housing, wherein, by introducing fluid into the second volume under sufficient hydraulic pressure, the flexible second plate is deformed about the set of pivots to shape the fluid within the second volume into a substantially cylindrical lens.

11. The optical assembly of claim 10, and further comprising a frame in which the housing is rotatably mounted.

12. The optical assembly of claim 11, and further comprising:
 a circumferential fluid channel formed between the housing and the frame; and
 a pair of housing seals that seal the circumferential fluid channel.

13. The optical assembly of claim 10, wherein the set of pivots include an internal pivot and an external pivot on opposing surfaces of the flexible second plate.

14. The optical assembly of claim 1, and further comprising a drive system that selectively applies hydraulic pressure to the optical cell.

15. The optical assembly of claim 14, wherein:
the optical assembly comprises eyewear; and
the optical assembly further includes at least one earpiece housing the drive system.

16. The optical assembly of claim 14, and further comprising:
 a control system that detects a line-of-sight of an eye of a human user of the optical assembly through the optical cell, determines a distance to an observed object along the line-of-sight, and controls the drive system to modify hydraulic pressure applied to the optical cell such that the optical cell is focused on the observed object.

17. The optical assembly of claim 16, wherein the control system includes a detector system including a plurality of sensors that sense electromagnetic energy reflected from a user's eye.

18. The optical assembly of claim 17, wherein the detector system further includes an energy source that irradiates the eye with electromagnetic energy.

19. An optical assembly, comprising:
an optical cell including:
 a housing having a wall,
 a flexible plate having an peripheral edge disposed within and adjacent the wall;
 a circumferential seal that seals the peripheral edge of the flexible plate against the wall; and
 a set of pivots disposed at the peripheral edge of the flexible plate that restrains a central portion of the flexible plate and that allows non-central peripheral portions of the flexible second plate to deflect about the set of pivots;
wherein the housing includes a fluid passageway formed therein communicating with a volume between the flexible plate and the housing, wherein, by introducing fluid into the volume under sufficient hydraulic pressure, the flexible plate is deformed about the set of pivots to shape the fluid within the volume into a substantially cylindrical lens.

20. A method of using an optical assembly, comprising:
providing an optical cell including:
 a base optic including a wall defining a periphery of the optical cell;
 a flexible plate having a peripheral edge disposed within and adjacent the wall;
 a ring coupled to the base optic, the ring including a shoulder projecting toward the base optic; and
 a single circumferential wall plate seal in contact with the wall, the flexible plate, and the shoulder of the ring, wherein the circumferential wall plate seal is retained in contact with the wall by the shoulder such that the circumferential wall plate seal provides a fluid-tight seal for the optical cell along the peripheral edge of the flexible plate;
 wherein the base optic includes a fluid passageway formed therein communicating with a volume between the flexible plate and the base optic;
placing fluid in the volume under sufficient hydraulic pressure to deform the flexible plate to shape the fluid into a substantially spherical lens, such that an optical focal length of the optical cell is changed.

* * * * *